United States Patent
Sone et al.

(10) Patent No.: US 7,961,644 B2
(45) Date of Patent: Jun. 14, 2011

(54) COMMUNICATION NODE APPARATUS, COMMUNICATION SYSTEM, AND PATH RESOURCE ASSIGNMENT METHOD

(75) Inventors: Yoshiaki Sone, Yokosuka (JP); Wataru Imajyuku, Yokosuka (JP); Naohide Nagatsu, Yokosuka (JP); Yukio Tsukishima, Yokosuka (JP); Kazuhisa Yamada, Yokosuka (JP); Atsushi Taniguchi, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 155 days.

(21) Appl. No.: 12/443,917

(22) PCT Filed: Oct. 5, 2007

(86) PCT No.: PCT/JP2007/069595
§ 371 (c)(1),
(2), (4) Date: Apr. 1, 2009

(87) PCT Pub. No.: WO2008/044646
PCT Pub. Date: Apr. 17, 2008

(65) Prior Publication Data
US 2010/0208584 A1 Aug. 19, 2010

(30) Foreign Application Priority Data
Oct. 6, 2006 (JP) .................... 2006-274592

(51) Int. Cl.
*G01R 31/08* (2006.01)
(52) U.S. Cl. ........ 370/252; 370/401; 370/216; 370/468; 370/392
(58) Field of Classification Search .......................... None
See application file for complete search history.

(56) References Cited

U.S. PATENT DOCUMENTS

| | | | |
|---|---|---|---|
| 7,710,860 B2 * | 5/2010 | Kano | 370/216 |
| 2005/0237927 A1 * | 10/2005 | Kano et al. | 370/216 |
| 2007/0291790 A1 * | 12/2007 | Ue et al. | 370/468 |

FOREIGN PATENT DOCUMENTS

EP 0714192 A1 5/1996
(Continued)

OTHER PUBLICATIONS

Sawada, Y. et al., "Survivability of GMPLS Controlled Mesh Networks", The Institute of Electronics, Information and Communication Engineers, vol. 102, No. 102, pp. 65-70 (2002).

(Continued)

*Primary Examiner* — Duc C Ho
(74) *Attorney, Agent, or Firm* — Oblon, Spivak, McClelland, Maier & Neustadt, L.L.P.

(57) ABSTRACT

In a communication system, including a plurality of communication node apparatuses, for establishing a path for communication by exchanging a message among the plurality of communication node apparatuses, before establishing a path, an identifier of a path for which reuse of resources of the path to be established is permitted or inhibited is determined, and the determined identification information is included in a control message so that the path is established. A communication node apparatus in which the path has been established determines availability of reuse of resources the path based on the identification information in the control message. When an event such as failure occurrence, occurrence of resource reuse or dissolution of resource reuse occurs, the communication node apparatus executes path priority change processing, so that priority can be changed such that resource reuse can be performed most efficiently.

22 Claims, 69 Drawing Sheets

FOREIGN PATENT DOCUMENTS

| | | |
|---|---|---|
| EP | 1289208 A2 | 3/2003 |
| JP | 4 256246 | 9/1992 |
| JP | 2001 268122 | 9/2001 |
| JP | 2002-261803 | 9/2002 |
| JP | 2003 229902 | 8/2003 |
| JP | 2005 269377 | 9/2005 |

OTHER PUBLICATIONS

Rosen, E. et al.,"Multiprotocol Label Switching Architecture", IETF RFC 3031, pp. 1-61 (2001).

Berger, L.,"Generalized Mutli-Protocol Label Switching (GMPLS) Signaling Functional Description", IETF RFC 3471, pp. 1-34 (2003).

Berger, L., ,"Generalized Multi-Protocol Label Switching (GMPLS) Signaling Resource Reservation Protocol-Traffic Engineering (RSVP-TE) Extensions", IETF RFC 3473, pp. 1-42 (2003).

Awduche, D. et al.,"RSVP-TE: Extensions To RSVP For LSP Tunnels", IETF RFC 3209, pp. 1-61 (2001).

Katz, D. et al.,"Traffic Engineering (TE) Extensions To OSPF Version 2", IETF RFC 3630, pp. 1-14 (2003).

Doria, A. et al.,"General Switch Management Protocol (GSMP) V3", IETF RFC 3292, pp. 1-137 (2002).

Mohammad Peyravian, et al. "Connection Preemption: Issues, Algorithms, and a Simulation Study." IEEE, 1997. pp. 143-151.

Japanese Office Action issued Oct. 5, 2010, in Japanese Patent Application No. 2008-538707 with English Translation.

* cited by examiner

FIG.9

| LINK ID | RESOURCE ID | IN-USE PATH ID | IN-USE PATH GROUP ID | REUSE AVAIL-ABLE PATH ID | REUSE AVAIL-ABLE GROUP ID | REUSE INHIB-ITED PATH ID | REUSE INHIB-ITED GROUP ID | PRESENCE OR ABSENCE OF OCCURRENCE OF REUSE | REUSED PATH ID | REUSED GROUP ID | SET UP PRIORITY | HOLDING PRIORITY |
|---|---|---|---|---|---|---|---|---|---|---|---|---|
| LINK α | RESOURCE a | PATH d | GROUP g | PATH j | GROUP m | PATH p | GROUP s | TRUE/FALSE | PATH v | GROUP y | ab | ae |
| LINK β | RESOURCE b | PATH e | GROUP h | PATH k | GROUP n | PATH q | GROUP t | TRUE/FALSE | PATH w | GROUP z | ac | af |
| LINK γ | RESOURCE c | PATH f | GROUP i | PATH l | GROUP o | PATH r | GROUP u | TRUE/FALSE | PATH x | GROUP aa | ad | ag |

FIG.15

| LINK ID | RESOURCE ID | IN-USE PATH ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|
| 45 | WAVELENGTH 1 | 1 | 3 | NOT DESIGNATED | NOT DESIGNATED | NOT DESIGNATED | FALSE | NONE |

FIG.16

| LINK ID | RESOURCE ID | IN-USE PATH ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|
| 45 | WAVELENGTH 1 | 1 | 3 | NOT DESIGNATED | NOT DESIGNATED | NOT DESIGNATED | FALSE | NONE |
| 45 | WAVELENGTH 2 | 2 | 3 | NOT DESIGNATED | NOT DESIGNATED | NOT DESIGNATED | FALSE | NONE |

FIG.17

| LINK ID | RESOURCE ID | IN-USE PATH ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|
| 45 | WAVELENGTH 1 | 3 | NOT DESIGNATED | NOT DESIGNATED | NOT DESIGNATED | NOT DESIGNATED | TRUE | 1 |
| 45 | WAVELENGTH 2 | 2 | 3 | NOT DESIGNATED | NOT DESIGNATED | NOT DESIGNATED | FALSE | NONE |

FIG.18

| LINK ID | RESOURCE ID | IN-USE PATH ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|
| 45 | WAVELENGTH 1 | NONE | NOT DESIGNATED | NOT DESIGNATED | NOT DESIGNATED | NOT DESIGNATED | FALSE | 1 |
| 45 | WAVELENGTH 2 | 2 | 3 | NOT DESIGNATED | NOT DESIGNATED | NOT DESIGNATED | FALSE | NONE |

FIG.19

| LINK ID | RESOURCE ID | IN-USE PATH ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|
| 45 | WAVELENGTH 1 | 1 | 3 | NOT DESIGNATED | NOT DESIGNATED | NOT DESIGNATED | FALSE | NONE |
| 45 | WAVELENGTH 2 | 2 | 3 | NOT DESIGNATED | NOT DESIGNATED | NOT DESIGNATED | FALSE | NONE |

FIG.20

| LINK ID | RESOURCE ID | IN-USE PATH ID | IN-USE GROUP ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|---|
| 45 | WAVELENGTH 1 | 1 | 100 | NOT DESIGNATED | 300 | NOT DESIGNATED | NOT DESIGNATED | FALSE | NONE |

FIG.21

| LINK ID | RESOURCE ID | IN-USE PATH ID | IN-USE GROUP ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|---|
| 45 | WAVELENGTH 1 | 1 | 100 | NOT DESIGNATED | 300 | NOT DESIGNATED | NOT DESIGNATED | FALSE | NOT DESIGNATED |
| 45 | WAVELENGTH 2 | 2 | 200 | NOT DESIGNATED | 300 | NOT DESIGNATED | NOT DESIGNATED | FALSE | NOT DESIGNATED |

FIG.22

| LINK ID | RESOURCE ID | IN-USE PATH ID | IN-USE GROUP ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|---|
| 45 | WAVELENGTH 1 | 3 | 300 | NOT DESIGNATED | NOT DESIGNATED | NOT DESIGNATED | NOT DESIGNATED | TRUE | 1 |
| 45 | WAVELENGTH 2 | 2 | 200 | NOT DESIGNATED | 300 | NOT DESIGNATED | NOT DESIGNATED | FALSE | NOT DESIGNATED |

FIG.23

| LINK ID | RESOURCE ID | IN-USE PATH ID | IN-USE GROUP ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|---|
| 45 | WAVELENGTH 1 | NONE | NONE | NOT DESIGNATED | NOT DESIGNATED | NOT DESIGNATED | NOT DESIGNATED | FALSE | 1 |
| 45 | WAVELENGTH 2 | 2 | 200 | NOT DESIGNATED | 300 | NOT DESIGNATED | NOT DESIGNATED | FALSE | NONE |

FIG.24

| LINK ID | RESOURCE ID | IN-USE PATH ID | IN-USE GROUP ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|---|
| 45 | WAVELENGTH 1 | 1 | 100 | NOT DESIGNATED | 300 | NOT DESIGNATED | NOT DESIGNATED | FALSE | NONE |
| 45 | WAVELENGTH 2 | 2 | 200 | NOT DESIGNATED | 300 | NOT DESIGNATED | NOT DESIGNATED | FALSE | NONE |

FIG.25

| LINK ID | RESOURCE ID | IN-USE PATH ID | IN-USE GROUP ID | REUSE INHIBITED PATH ID | REUSE INHIBITED GROUP ID | PRESENCE OR ABSENCE OF OCCURRENCE OF REUSE | REUSED PATH ID | SET UP PRIORITY | HOLDING PRIORITY |
|---|---|---|---|---|---|---|---|---|---|
| 45 | WAVELENGTH 1 | 1 | 100 | NOT DESIGNATED | NOT DESIGNATED | FALSE | NONE | 8 | 4 |

FIG.26

| LINK ID | RESOURCE ID | IN-USE PATH ID | IN-USE GROUP ID | REUSE INHIBITED PATH ID | REUSE INHIBITED GROUP ID | PRESENCE OR ABSENCE OF OCCURRENCE OF REUSE | REUSED PATH ID | SET UP PRIORITY | HOLDING PRIORITY |
|---|---|---|---|---|---|---|---|---|---|
| 45 | WAVELENGTH 1 | 1 | 100 | NOT DESIGNATED | NOT DESIGNATED | FALSE | NONE | 8 | 4 |
| 45 | WAVELENGTH 2 | 2 | 200 | NOT DESIGNATED | 300 | FALSE | NONE | 8 | 5 |

FIG.27

| LINK ID | RESOURCE ID | IN-USE PATH ID | IN-USE GROUP ID | REUSE INHIBITED PATH ID | REUSE INHIBITED GROUP ID | PRESENCE OR ABSENCE OF OCCURRENCE OF REUSE | REUSED PATH ID | SET UP PRIORITY | HOLDING PRIORITY |
|---|---|---|---|---|---|---|---|---|---|
| 45 | WAVELENGTH 1 | 3 | 300 | NOT DESIGNATED | NOT DESIGNATED | TRUE | 1 | 3 | 1 |
| 45 | WAVELENGTH 2 | 2 | 200 | NOT DESIGNATED | 300 | FALSE | NONE | 8 | 5 |

FIG.28

| LINK ID | RESOURCE ID | IN-USE PATH ID | IN-USE GROUP ID | REUSE INHIBITED PATH ID | REUSE INHIBITED GROUP ID | PRESENCE OR ABSENCE OCCURRENCE OF REUSE | REUSED PATH ID | SET UP PRIORITY | HOLDING PRIORITY |
|---|---|---|---|---|---|---|---|---|---|
| 45 | WAVELENGTH 1 | NONE | NONE | NOT DESIGNATED | NOT DESIGNATED | FALSE | 1 | NOT DESIGNATED | NOT DESIGNATED |
| 45 | WAVELENGTH 2 | 2 | 200 | NOT DESIGNATED | 300 | FALSE | NONE | 8 | 5 |

FIG.29

| LINK ID | RESOURCE ID | IN-USE PATH ID | IN-USE GROUP ID | REUSE INHIBITED PATH ID | REUSE INHIBITED GROUP ID | PRESENCE OR ABSENCE OF OCCURRENCE OF REUSE | REUSED PATH ID | SET UP PRIORITY | HOLDING PRIORITY |
|---|---|---|---|---|---|---|---|---|---|
| 45 | WAVELENGTH 1 | 1 | 100 | NOT DESIGNATED | NOT DESIGNATED | FALSE | NONE | 8 | 4 |
| 45 | WAVELENGTH 2 | 2 | 200 | NOT DESIGNATED | 300 | FALSE | NONE | 8 | 5 |

FIG.31

| LINK ID | RESOURCE ID | IN-USE PATH ID | IN-USE GROUP ID | REUSE AVAILABLE PATH ID | REUSE AVAILABLE GROUP ID | REUSE INHIBITED PATH ID | REUSE INHIBITED GROUP ID | HOLDING PRIORITY |
|---|---|---|---|---|---|---|---|---|
| 45 | WAVELENGTH 1 | 2 | 200 | 3 | 300 | 4 | 400 | 5 |

FIG.32

| PATH ID | REUSE SUBJECT PATH ID | REUSE SUBJECT GROUP ID |
|---|---|---|
| 2 | 5 | 500 |

FIG.33

| LINK ID | RESOURCE ID | IN-USE PATH ID | IN-USE GROUP ID | REUSE AVAILABLE PATH ID | REUSE AVAILABLE GROUP ID | REUSE INHIBITED PATH ID | REUSE INHIBITED GROUP ID | HOLDING PRIORITY |
|---|---|---|---|---|---|---|---|---|
| 45 | WAVELENGTH 1 | 2 | 2000 | 30 | 3000 | 40 | 4000 | 1 |

FIG.34

| PATH ID | REUSE SUBJECT PATH ID | REUSE SUBJECT GROUP ID |
|---------|----------------------|------------------------|
| 2 | 50 | 5000 |

FIG.39

| LINK ID | RESOURCE ID | IN-USE PATH ID | IN-USE GROUP ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|---|
| 45 | WAVELENGTH 1 | 1 | 100 | NOT DESIGNATED | NOT DESIGNATED | NOT DESIGNATED | 300 | FALSE | NONE |

FIG.40

| LINK ID | RESOURCE ID | IN-USE PATH ID | IN-USE GROUP ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|---|
| 45 | WAVELENGTH 1 | 1 | 100 | NOT DESIGNATED | NOT DESIGNATED | NOT DESIGNATED | 300 | FALSE | NONE |
| 45 | WAVELENGTH 2 | 2 | 100 | NOT DESIGNATED | NOT DESIGNATED | NOT DESIGNATED | 320 | FALSE | NONE |

FIG.41

| LINK ID | RESOURCE ID | IN-USE PATH ID | IN-USE PATH GROUP ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|---|
| 45 | WAVELENGTH 1 | 3 | 320 | NOT DESIGNATED | NOT DESIGNATED | NOT DESIGNATED | NOT DESIGNATED | TRUE | 1 |
| 45 | WAVELENGTH 2 | 2 | 100 | NOT DESIGNATED | NOT DESIGNATED | NOT DESIGNATED | 320 | FALSE | NONE |

FIG.42

| LINK ID | RESOURCE ID | IN-USE PATH ID | IN-USE PATH GROUP ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|---|
| 45 | WAVELENGTH 1 | NONE | NONE | NOT DESIGNATED | NOT DESIGNATED | NOT DESIGNATED | NOT DESIGNATED | FALSE | 1 |
| 45 | WAVELENGTH 2 | 3 | 300 | NOT DESIGNATED | NOT DESIGNATED | NOT DESIGNATED | NOT DESIGNATED | TRUE | 2 |

FIG.43

| LINK ID | RESOURCE ID | IN-USE PATH ID | IN-USE PATH GROUP ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|---|
| 45 | WAVELENGTH 1 | 1 | 100 | NOT DESIGNATED | NOT DESIGNATED | NOT DESIGNATED | 300 | FALSE | NONE |
| 45 | WAVELENGTH 2 | 3 | 300 | NOT DESIGNATED | NOT DESIGNATED | NOT DESIGNATED | NOT DESIGNATED | TRUE | 2 |

FIG.45

```
— —INFORMATION ADVERTISED BY NODE-1— —
ADVERTISEMENT SOURCE ROUTER
    NODE ID : 192.168.1.1
LINK INFORMATION OF ADVERTISEMENT SOURCE ROUTER
    LINK ID : 10.10.10.10
        AVAILABLE BANDWIDTH : 0
        USING BANDWIDTH : 10Gbps
            USING PATH
                PATH ID : 1
                GROUP ID : 100
            REUSE AVAILABLE PATH
                PATH ID : 500
                GROUP ID : 50000
            REUSE INHIBITED PATH
                PATH ID : 600
                GROUP ID : 60000
    LINK ID : 20.20.20.20
        AVAILABLE BANDWIDTH : 10Gbps
        USING BANDWIDTH : 0
    LINK ID : 30.30.30.30
        AVAILABLE BANDWIDTH : 0
        USING BANDWIDTH : 10Gbps
            USING PATH
                PATH ID : 2
                GROUP ID : 200
            REUSE AVAILABLE PATH
                PATH ID : 700
                GROUP ID : 70000
            REUSE INHIBITED PATH
                PATH ID : 700
                GROUP ID : 70000
```

FIG.46

```
— —INFORMATION ADVERTISED BY NODE-2— —
ADVERTISEMENT SOURCE ROUTER
    NODE ID: 192.168.1.2
LINK INFORMATION OF ADVERTISEMENT SOURCE ROUTER
    LINK ID: 10.10.10.10
        AVAILABLE BANDWIDTH: 0
        USING BANDWIDTH: 10Gbps
            USING PATH
                PATH ID: 1
                GROUP ID: 100
            REUSE AVAILABLE PATH
                PATH ID: 500
                GROUP ID: 50000
            REUSE INHIBITED PATH
                PATH ID: 600
                GROUP ID: 60000
    LINK ID: 20.20.20.20
        AVAILABLE BANDWIDTH: 10Gbps
        USING BANDWIDTH: 0
    LINK ID: 30.30.30.30
        AVAILABLE BANDWIDTH: 0
        USING BANDWIDTH: 10Gbps
            USING PATH
                PATH ID: 2
                GROUP ID: 200
            REUSE AVAILABLE PATH
                PATH ID: 700
                GROUP ID: 70000
            REUSE INHIBITED PATH
                PATH ID: 700
                GROUP ID: 70000
```

FIG.49

| LINK ID | RESOURCE ID | IN-USE PATH ID | REUSE AVAILABLE PATH ID | REUSE AVAILABLE GROUP ID | PRESENCE OR ABSENCE OF OCCURRENCE OF REUSE | REUSED PATH ID |
|---|---|---|---|---|---|---|
| 45 | WAVELENGTH 1 | 1 | NOT DESIGNATED | 200 | FALSE | NONE |

FIG.51

| LINK ID | RESOURCE ID | IN-USE PATH ID | REUSE AVAILABLE PATH ID | REUSE AVAILABLE GROUP ID | PRESENCE OR ABSENCE OF OCCURRENCE OF REUSE | REUSED PATH ID |
|---|---|---|---|---|---|---|
| 45 | WAVELENGTH 1 | 2 | 1 | NOT DESIGNATED | TRUE | 1 |

FIG.52

| LINK ID | RESOURCE ID | IN-USE PATH ID | REUSE AVAILABLE PATH ID | REUSE AVAILABLE GROUP ID | PRESENCE OR ABSENCE OF OCCURRENCE OF REUSE | REUSED PATH ID |
|---|---|---|---|---|---|---|
| 45 | WAVELENGTH 1 | 1 | NOT DESIGNATED | 200 | FALSE | NONE |

FIG.54

| LINK ID | RESOURCE ID | IN-USE PATH ID | IN-USE PATH GROUP ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|---|
| 45 | WAVELENGTH 1 | 1 | 100 | NOT DESIGNATED | NOT DESIGNATED | NOT DESIGNATED | 300 | FALSE | NONE |

FIG.55

| LINK ID | RESOURCE ID | IN-USE PATH ID | IN-USE PATH GROUP ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|---|
| 45 | WAVELENGTH 1 | 1 | 100 | NOT DESIGNATED | NOT DESIGNATED | NOT DESIGNATED | 300 | FALSE | NONE |
| 45 | WAVELENGTH 2 | 2 | 100 | NOT DESIGNATED | NOT DESIGNATED | NOT DESIGNATED | 320 | FALSE | NONE |

FIG.56

| LINK ID | RESOURCE ID | IN-USE PATH ID | IN-USE PATH GROUP ID | REUSE AVAILABLE PATH ID | REUSE AVAILABLE GROUP ID | REUSE INHIBITED PATH ID | REUSE INHIBITED GROUP ID | PRESENCE OR ABSENCE OF OCCURRENCE OF REUSE | REUSED PATH ID |
|---|---|---|---|---|---|---|---|---|---|
| 45 | WAVELENGTH 1 | 3 | 320 | NOT DESIGNATED | NOT DESIGNATED | NOT DESIGNATED | NOT DESIGNATED | TRUE | 1 |
| 45 | WAVELENGTH 2 | 2 | 100 | NOT DESIGNATED | NOT DESIGNATED | NOT DESIGNATED | 320 | FALSE | NONE |

FIG.61

| USER ID | ASSIGNABLE PATH ID | ASSIGNABLE GROUP ID |
|---|---|---|
| A | 1 | 100 |
| B | 2~7 | 200 |

FIG.62

| USER ID | USER THAT CAN BE REUSE SUBJECT | REUSE INHIBITED USER | REUSE PERMITTED USER | SET UP PRIORITY | HOLDING PRIORITY |
|---|---|---|---|---|---|
| A | B | B | NONE | 8 | 1 |
| B | NONE | NOT DESIGNATED | B | 8 | 1 |

CABLE FOR BOTH CONTROL INFORMATION
TRANSFER AND DATA TRANSFER

COMMUNICATION NODE APPARATUS, COMMUNICATION SYSTEM, AND PATH RESOURCE ASSIGNMENT METHOD

TECHNICAL FIELD

The present invention relates to a communication network for establishing and operating paths using resources such as wavelengths, optical fibers and the like based on GMPLS (Generalized Multi Protocol Label Switching) and MPLS (Multi Protocol Label Switching) and the like. More particularly, the present invention relates to reduction of the amount of necessary resources for establishing a new path by reusing resources of an established path based on priority information provided to the paths

BACKGROUND ART

As conventional technologies for realizing path operation, there are MPLS (refer to non-patent document 1), GMPLS (refer to non-patent document 2 or 3), and the like. Path establishment function for these techniques, that is, signaling techniques are realized by using RSVP-TE (Resource Reservation Protocol for Traffic Engineering) which is a signaling protocol (refer to non-patent document 3 or 4).

In the signaling technique such as the RSVP-TE, a numeric value relating to path setup priority is provided to individual paths, and a function is provided in which a path having high priority reuses resources of a path of low priority.

In the standard specification of RSVP-TE, two values that are holding priority and set-up priority are defined as priority information of path establishment, and a function is provided in which, when setup priority of a path to be newly established is higher than holding priority of an already established path, reuse of resources occur, and the originally established path is deleted.

There are following documents as related art documents,
[Non-patent document 1] IETF RFC3031
[Non-patent document 2] IETF RFC3471
[Non-patent document 3] IETF RFC3473
[Non-patent document 4] IETF RFC3209
[Non-patent document 5] IETF RFC3630
[Non-patent document 6] IETF RFC3292
[Patent document 1] Japanese Laid-Open Patent Application No. 2005-269377
[Patent document 2] Japanese Laid-Open Patent Application No. 2003-229902
[Patent document 3] Japanese Laid-Open Patent Application No. 4-256246

DISCLOSURE OF THE INVENTION

Problem to be Solved by the Invention

In the conventional techniques, the value of the priority set for the path as a criterion for determining the order of resource assignment when performing resource reuse is normally determined based on long term operation policy or service level accommodated in the path or the like.

However, there may be a case in which resource reuse needs to be performed between same priority values for specific paths because the space of values assigned to priority values is limited and because there are other circumstances on operation policy of communication networks.

For example, when a path fails so that an alternative path is to be established for the failed path, it may become necessary to reuse only resources of a failed path without reusing resources of a path that is normally operated. This case corresponds to the above-mentioned case.

However, in the framework of the conventional techniques, since a path from which resources are reused is determined based on only the priority values, a path for which resource reuse is performed cannot be specified between paths having the same priority. Thus, it may become necessary to newly allocate resources.

FIG. 1 shows an example 1 in which efficient resource operation cannot be performed. As an example, FIG. 1 shows a case for trying to establish a path 3 by reusing resources of a link connecting between a node-2 and a node-3. In this example, it is assumed that the lower the value of "priority" is, the higher the degree of priority is, and that establishment of the path 1 and the path 2 has completed before the path 3 is established, and the path 2 is failed. In this case, when the path 3 tries to reuse resources between the node-2 and the node-3 for its use, the path 3 determines resources to use based on provided priority values, and reuses resources of the path 1 having low priority (the value is large) so as to establish a path.

However, in this case, it is more efficient to reuse resources of the failed path 2 and assign the resources to the path 3 for use by the path 3. But, there is no method to designate a failed path to perform resource reuse in such a case. Therefore, in order to avoid reuse of resources of the normal path 1 and to avoid service interruption, it becomes necessary to stop execution of resource reuse and to newly prepare separate resources. Thus, necessary amount of equipment increases.

In addition, FIG. 2 shows an example 2 in which efficient resource operation cannot be performed. As shown in FIG. 2, a case is considered in which failures occur at two points in a communication network, and a detour path (backup path is FIG. 2) is established for the working path that passes through the failure section. In this example, values of priorities of the working path and the detour path for failure are X and Y respectively. In this case, since the route of the detour path overlaps with the route of the working path, it is efficient to establish the detour path by re-using resources of normal section of the working path since necessary resource amount can be reduced.

However, for the reason of operation, if priority is determined such that X>=Y, the detour path cannot reuse the normal section of the failed path, so that it becomes necessary to prepare separate resources for the section that can be substantially reused.

Therefore, it becomes necessary to reserve new resources by preparing equipment the amount of which is greater than actually required resource amount. (This example assumes operation policy in which settings are maintained even in failure in order that a failed path is switched back after the failure is eliminated. It is essential in actual operation to keep equipment of the failed path for use after the failure is recovered.)

In the above-example, when the amount of resources to be newly kept increases, there occurs a problem in that the number of interfaces necessary for node apparatuses and the number of links increases, and that equipment cost increases. In addition, amount of resource requests for path detouring necessary when failure occurs increase. In addition, since the number of paths that can be recovered decreases due to detouring, reliability decreases.

Meaning of "resources" described here includes interfaces of a communication node, wavelengths of an optical path, slots in TDM, packet transfer bandwidths, CPU processing time and the like, and includes scheduled use authority of these in the future. In addition, meaning of "path" includes path of MPLS, TDM path, wavelength path of GMPLS, fiber switching path, or path realized by combination of these.

The present invention is contrived under this background, and an object of the present invention is to provide a technique for decreasing a resource amount necessary for path operation and for decreasing an apparatus or equipment amount necessary for path operation by realizing efficient path resource reuse scheme.

Means for Solving the Problem

According to an embodiment of the present invention, a communication node apparatus for establishing a path for communication in a communication network by exchanging a control message between the communication node apparatus and another communication node apparatus and by setting switching information, including: means configured to include, into a control message to be sent to the other communication node for establishing a path, path identification information or group identification information of a path for which reusing resources of the path to be established is permitted or inhibited, or to include, into the control message, path identification information or group identification information of a path from which resources can be reused to the path to be established, and to send the control message, is provided.

In addition, according to an embodiment of the present invention, a communication node apparatus for establishing a path for communication in a communication network by exchanging a control message between the communication node apparatus and another communication node apparatus and setting switching information, including: means configured to receive a control message from the other communication apparatus for establishing a path, and storing, into a resource reuse availability information table, path identification information or group identification information of a path for which reusing resources of the path to be established is permitted or inhibited, or path identification information or group identification information of a path from which resources can be reused to the path to be established, which are included in the control message; and means configured to retrieve a path from which resources can be reused or to retrieve a path belonging to a group from which resources can be reused from paths set in the communication node apparatus, and to reuse and assign resources of the retrieved path as resources for establishing a new path, and to establish the new path, is provided.

In addition, according to an embodiment of the present invention, a path resource assignment method in a communication system, including a plurality of communication node apparatuses, for establishing a path for communication by exchanging a message among the plurality of communication node apparatuses, including: a step in which a first communication node apparatus sends path control information including use right information of path resources to a second communication node apparatus; and a step in which the second communication node assigns path resources being assigned to a group to another group based on the use right information of the path resources, is provided. The use right information of the path resources is resource reuse availability information described in the embodiments, for example.

Effect of the Invention

According to the present invention, a technique for decreasing a resource amount necessary for path operation and for decreasing an apparatus or equipment amount necessary for path operation can be provided by realizing an efficient path resource reuse scheme.

BRIEF DESCRIPTION OF THE DRAWINGS

FIG. 9 is a diagram showing an example of resource reuse availability data;

FIG. 15 is a diagram showing a part of reuse availability information of node-4 in the first embodiment;

FIG. 16 is a diagram showing a part of reuse availability information of node-4 in the first embodiment;

FIG. 17 is a diagram showing a part of reuse availability information of node-4 in the first embodiment;

FIG. 18 is a diagram showing a part of reuse availability information of node-4 in the first embodiment;

FIG. 19 is a diagram showing a part of reuse availability information of node-4 in the first embodiment;

FIG. 20 is a diagram showing a part of reuse availability information of node-4 in the second embodiment;

FIG. 21 is a diagram showing a part of reuse availability information of node-4 in the second embodiment;

FIG. 22 is a diagram showing a part of reuse availability information of node-4 in the second embodiment;

FIG. 23 is a diagram showing a part of reuse availability information of node-4 in the second embodiment;

FIG. 24 is a diagram showing a part of reuse availability information of node-4 in the second embodiment;

FIG. 25 is a diagram showing a part of reuse availability information of node-4 in the second embodiment;

FIG. 26 is a diagram showing a part of reuse availability information of node-4 in the third embodiment;

FIG. 27 is a diagram showing a part of reuse availability information of node-4 in the third embodiment;

FIG. 28 is a diagram showing a part of reuse availability information of node-4 in the third embodiment;

FIG. 29 is a diagram showing a part of reuse availability information of node-4 in the third embodiment;

FIG. 31 is a diagram showing a part of reuse availability information of node-4 in the fourth embodiment;

FIG. 32 is a diagram showing path ID and group ID of reuse subject for path 2 stored in resource information data 75;

FIG. 33 is a diagram showing a part of reuse availability information of node-4 in the fourth embodiment;

FIG. 34 is a diagram showing path ID and group ID of reuse subject for path 2 stored in resource information data 75;

FIG. 39 is a diagram showing a part of reuse availability information of node-4 in the seventh embodiment;

FIG. 40 is a diagram showing a part of reuse availability information of node-4 in the seventh embodiment;

FIG. 41 is a diagram showing a part of reuse availability information of node-4 in the seventh embodiment;

FIG. 42 is a diagram showing a part of reuse availability information of node-4 in the seventh embodiment;

FIG. 43 is a diagram showing a part of reuse availability information of node-4 in the seventh embodiment;

FIG. 45 is a diagram showing information advertised by the node-1 in the eighth embodiment;

FIG. 46 is a diagram showing information advertised by the node-1 in the eighth embodiment;

FIG. 49 is a diagram showing resource information data of the node-5 in the ninth embodiment;

FIG. 51 is a diagram showing resource information data of the node-5 in the ninth embodiment;

FIG. 52 is a diagram showing resource information data of the node-5 in the ninth embodiment;

FIG. 54 is a diagram showing a part of reuse availability information of node-4 in the tenth embodiment;

FIG. 55 is a diagram showing a part of reuse availability information of node-4 in the tenth embodiment;

FIG. 56 is a diagram showing a part of reuse availability information of node-4 in the tenth embodiment;

FIG. 61 is a diagram showing information stored in the issue identification information database 92 in the twelfth embodiment;

FIG. 62 is a diagram showing information stored in the resource reuse policy database 91 in the twelfth embodiment;

Figure 1:
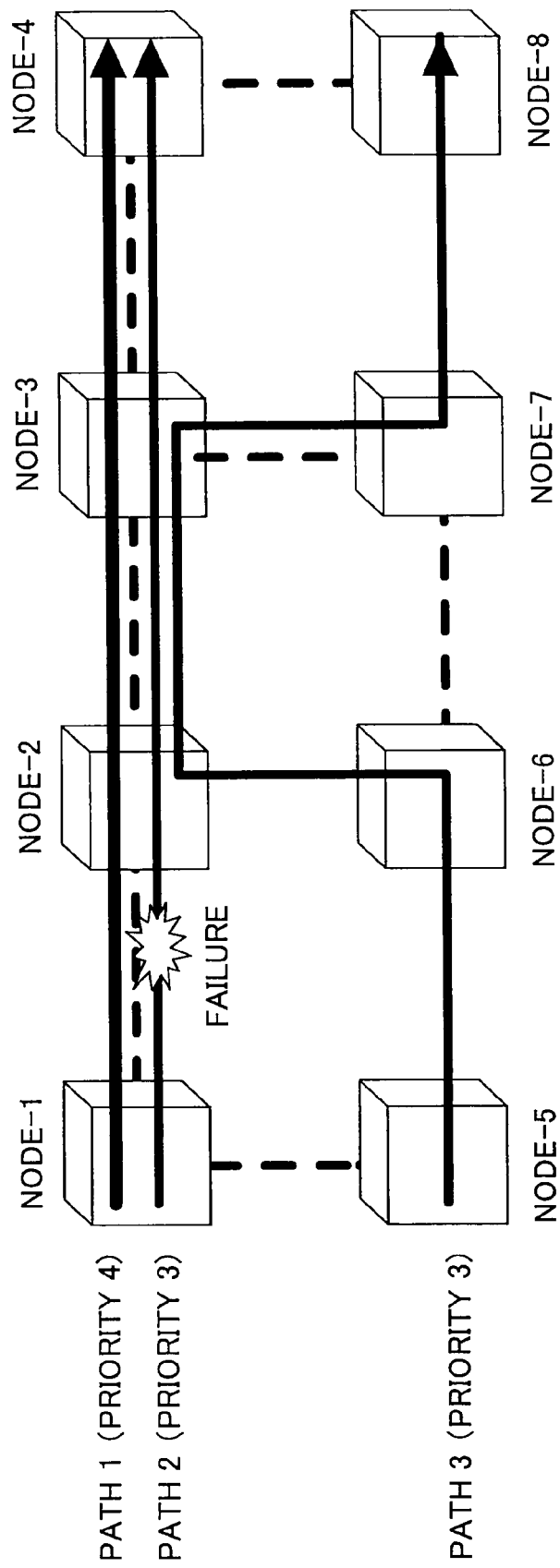
FIG. 1 is a diagram for explaining an example 1 in which efficient resource operation cannot be performed.
Figure 2:
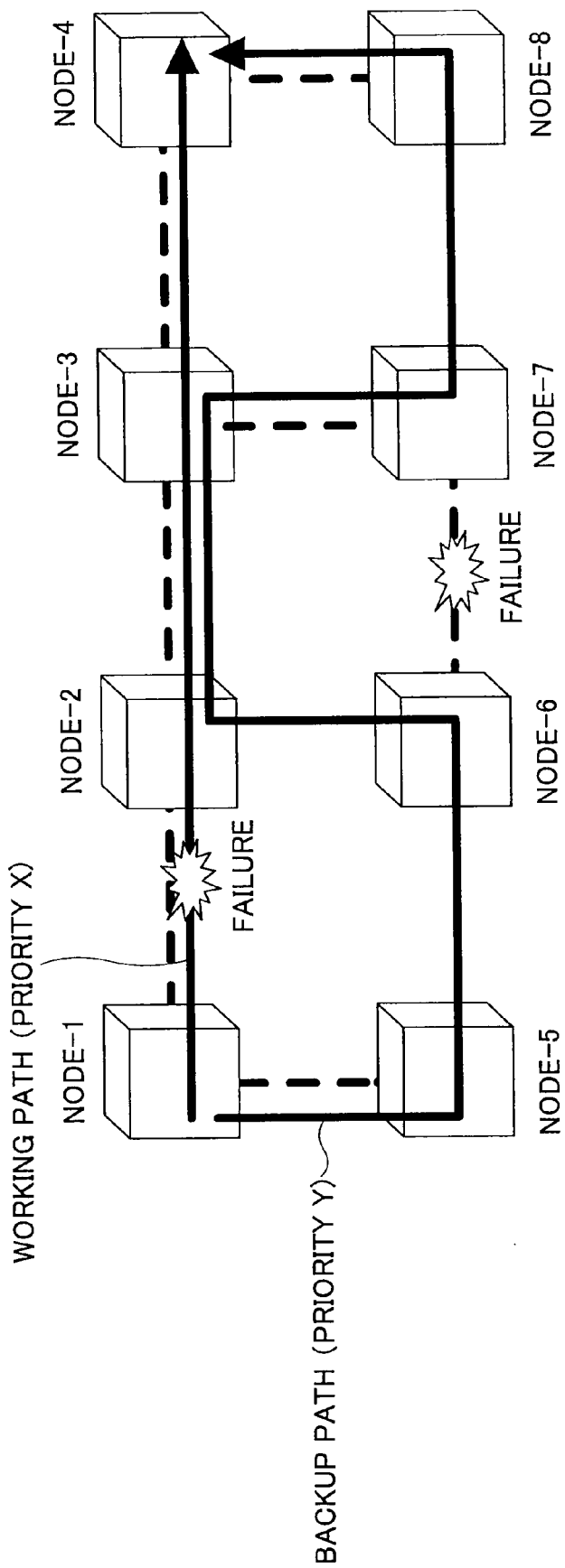
FIG. 2 is a diagram for explaining an example 1 in which efficient resource operation cannot be performed.

DESCRIPTION OF REFERENCE SIGNS 20, 50 adjacent apparatus control IF
21, 51 data sending IF
22, 52 data reception IF
23, 80 command input means
24, 54 switching HW
25 switching HW control function unit
26, 56 SW management IF
27, 82 signaling means
28, 83 route information processing means
29, 84 storing means
30, 85 resource management means
40 issue identification information database
41 resource reuse policy database
42 reuse availability information determination function
43 send and receive IF
55 switching HW control computer
57 optical cross connect switch
58 IP router
60 hard disk
61 main memory
62 CPU
63 command input IF apparatus
70 RSVP-TE protocol function unit
71 resource management function unit
72 OSPF-TE protocol function unit
73 CSPF module
74 GSMP protocol function unit
75 resource information table
76 route information data
77 CLI
81 node apparatus control IF
90 user information database
91 resource reuse policy database
92 issue identification information database
100 user communication node
101 resource reuse availability information issuing apparatus
102, 103 communication node apparatus
200 centralized management apparatus

PREFERRED EMBODIMENTS FOR CARRYING OUT THE INVENTION

Before describing embodiments of the present invention in detail, outline of embodiments of the present invention is described.

According to an embodiment of the present invention, a communication node apparatus that is provided in a communication network for operating paths using wavelengths, fibers and the like as resources by using GMPLS and MPLS and the like is provided. The communication node apparatus is able to utilize path identification information and resource information included in control messages, to perform resource management in which path information and resource information such as wavelengths or fibers are associated with each other in each communication node apparatus, and to perform operation by flexibly reusing resources among paths. In addition, resource reuse described in embodiments of the present invention includes preemption function defined in RSVP-TE and the like in its category.

In an embodiment of the present invention, by sending a control message used for path establishment and maintenance/management over a path after including, into the control message, identification information such as path ID and group ID of a path (reuse subject) from which resources are to be reused, reuse subject can be determined not only by determination from priority but also in units of identifiers by designating identifiers such as the path ID and group ID.

Before performing path establishment, identifier of a path to which reuse of resources is permitted or inhibited is determined beforehand, and a path is established by including the determined identification information in the control message. The node in which the path has been established can determines reuse availability of a path based on the identification information in the control message, and can determine reuse subject in units of path identifies.

When an event such as failure occurrence, or occurrence or cancellation of resource reuse occurs, priority change processing for the path is executed in which the priority is changed such that resource reuse can be performed most efficiently.

That is, the communication node apparatus of an embodiment of the present invention is a communication node apparatus for establishing a path for communication in a communication network by exchanging a control message between the communication node apparatus and another communication node apparatus and by setting switching information.

According to an embodiment of the present invention, the communication apparatus includes:

means configured to include, into a control message to be sent to the other communication node for establishing a path, path identification information or group identification information of a path for which reusing resources of the path to be established is permitted or inhibited, or to include, into the control message, path identification information or group identification information of a path from which resources can be reused to the path to be established, and to send the control message.

Accordingly, an instruction for performing resource reuse can be provided to an adjacent node.

By doing this, it becomes possible to perform resource reuse in units of path identification information of other paths, thus, resources of the communication network can be used efficiently. In using resources, it is possible to provide resource use authority only to a specific path group. Thus, resource management of a communication network can be performed more flexibly.

The communication node apparatus may be provided with means configured to include, into the control message for changing information on a path, in addition to the path identification information of the path, path identification or group identification information of a new path for which reusing resources assigned to the path is permitted or inhibited, or include new group identification information of the path in addition to the path identification information of the path, or include new priority information of the path in addition to the path identification information of the path, and to send the control message.

Accordingly, mapping relationship between paths and resources can be flexibly managed, so that flexible resource management for the communication network becomes possible. For example, it becomes possible to flexibly change superiority/inferiority relationship of resource use authority on path resource assignment and reuse.

The communication node apparatus may include: means configured to detect occurrence or dissolution state of resource reuse of an established path or means configured to detect failure occurrence or failure elimination state for the established path; and means configured, being triggered by detection of occurrence or dissolution of resource reuse of the established path or detection of failure occurrence or elimination of the established path, to change priority information of the path set in the communication node apparatus, and include changed priority information of the path, in addition to path identification information of the path, into the control message to be transmitted to the other communication node apparatus, and to send the control message.

Accordingly, path priority information can be changed speedily according to circumstances so that communication network resources can be used efficiently.

In addition, according to an embodiment of the present invention, a communication node apparatus for establishing a path for communication in a communication network by exchanging a control message between the communication node apparatus and another communication node apparatus and setting switching information is provided. The communication node apparatus includes: means configured to receive a control message from the other communication apparatus for establishing a path, and storing, into a resource reuse availability information table, path identification information or group identification information of a path for which reusing resources of the path to be established is permitted or inhibited, or path identification information or group identification information of a path from which resources can be reused for the path to be established, which are included in the control message; and means configured to retrieve a path from which resources can be reused or to retrieve a path belonging to a group from which resources can be reused from paths set in the communication node apparatus, and to reuse and assign resources of the retrieved path as resources for establishing a new path, and to establish the new path.

Thus, it becomes possible to refer to availability information of resource reuse, so that resource reuse for only a particular path can be performed. For example, it becomes possible to reuse resources of a particular path to use the resources for establishing a new path.

The communication node apparatus may include means configured to rewrite information in the resource reuse availability information table based on information included in the control message for changing information on the path, wherein the information included in the control message for changing the information on the path includes, in addition to the path identification information of the path, path identification or group identification information of a new path for which reusing resources assigned to the path is permitted or inhibited, new group identification information of the path, or new priority information of the path.

Accordingly, mapping relationship between paths and resources can be flexibly managed, so that flexible resource management for the communication network becomes possible. For example, resource information and use authority of the resources can be stored and managed. Or, it becomes possible to flexible change superiority/inferiority relationship of resource use authority on path resource assignment and reuse.

The communication node apparatus may include means configured to, when resource reuse occurs, send path identification information of a path from which resources have been reused and send information on a path including path identification information of the path that has reused the resources for its use to a communication node apparatus that is a start point of the path from which resources have been reused or to a monitoring apparatus.

Thus, each node apparatus in the communication network can ascertain resource reuse states of other nodes for each path.

When reuse of resources occurs, the communication node apparatus holds switching information set for configuring a path from which the resources have been reused, and the communication node apparatus may include means configured to, when detecting dissolution of reuse state of the path from which the resources have been reused, identifies another communication node apparatus on a route of the path from which the resources have been reused based on the held switching information so as to send the control message to the other communication node apparatus for notifying the other communication node apparatus of dissolution of reuse state.

By this configuration, it becomes possible to store setting information of switching hardware on the path in the communication node apparatus when the path is temporarily deleted. Thus, processing load for recovering the path is reduced so that speedy processing is possible. In addition, it becomes possible to assign the same resource as the resource assigned before path deletion, so that it becomes possible to use resources of the communication network flexibly and to perform simple operation. For example, it becomes possible to detect dissolution (cancellation) of resource reuse state, and to use resources for which reuse sate has been dissolved quickly, so that efficient use of the communication network resources becomes possible. Or, it becomes possible to quickly re-use resources for which resource reuse has been dissolved.

When reuse of resources occurs, the communication node apparatus holds setting information of a path from which the resources have been reused, and the communication node apparatus may include means configured to, when receiving a control message reporting dissolution of reuse state of the path from which the resources have been reused, send a control message including the held setting information of the path to the other communication node in order to re-assign the resources to the path before the resources are reused.

Accordingly, it becomes possible to reuse resources for which resource reuse has been dissolved quickly.

In addition, according to an embodiment of the present invention, a communication system comprising a resource reuse availability information issuing apparatus, and a communication node apparatus having communication means configured to communicate with the resource reuse availability information issuing apparatus, the communication node apparatus comprising means configured to, when receiving a path establishment request from a user, inquire the resource reuse availability information issuing apparatus about identification information of the path to be established and resource reuse availability information of the path, and to establish the path based on the result of the inquiry, the resource reuse availability information issuing apparatus comprising means configured to determine the identification information of the path and resource reuse availability information of the path based on user information received from the communication node apparatus and notify the communication node apparatus of them, is provided.

Thus, it becomes possible to automatically issue resource reuse availability based on the user connected to the communication network, so that it becomes possible to perform quick processing with low load.

In addition, according to an embodiment of the present invention, a communication node apparatus for establishing a path for communication in a communication network by exchanging a control message between the communication node apparatus and another communication node apparatus, advertising resource information of the communication node apparatus to the other communication node apparatus and setting switching information is provided. The communication node apparatus is a communication node apparatus including: means configured to manage resource amount for each of path identification information and group identification information for resources assigned to paths; and means configured to, when advertising information of the resource amount managed by the means configured to manage using a routing protocol, add ID information and group ID information of a path to which the resources are assigned and identification information of a path or a group that can use or cannot use the resources or either of these to the information of the resource amount to be advertised, and to include the information into a control message or a resource advertising message of the routing protocol so as to advertise information of resources.

Accordingly, each node apparatus in the communication network can ascertain resource use states of other nodes for each path. Thus, when performing resource reuse, efficient and flexible use of network resources become possible.

The communication node apparatus may include route calculation means configured to calculate a route of a detour path when a path fails, wherein the route calculation means can perform route calculation by using, as a parameter, necessary resource reduction effect obtained by resource reuse of a normal section of the failed path.

By this configuration, it becomes possible to calculate the route for performing resource reuse most efficiently, thus, more necessary resource reduction effects arise.

As the communication node apparatus of an embodiment, a working path and a backup path are provided, and the communication node apparatus may include: switch control means configured to, when the working path fails while the working path is in operation, switch the working path to the backup path; and means configured to notify the switch control means of failure occurrence or failure elimination of a control link on the backup path used when the working path fails while the working path is in operation or to notify the switch control means of exhaustion occurrence or exhaustion elimination of resources of the backup path.

When detecting failure occurrence of the control link on the backup path based on notification information of the means configured to notify, the switch control means can inhibit switching to the backup path even when the working path fails.

By this configuration, since switching to an unusable backup path can be prohibited, useless switching operation to backup path can be avoided, so that efficient resource operation becomes possible.

In addition, it is possible to provide a program for realizing each means of the above mentioned communication node apparatus by using information processing means in the communication node apparatus. By being resounded in recording medium, the program can be installed from the recording medium to the communication node apparatus. Or, the program can be directly installed in the communication node apparatus from a server storing the program via a network.

The program not only includes a program that can be directly executed by the information processing means of the communication node apparatus, but also includes a program that can be executed by being installed in a hard disk and the like. In addition, the program includes a compressed program, and an encrypted program.

Figure 3:
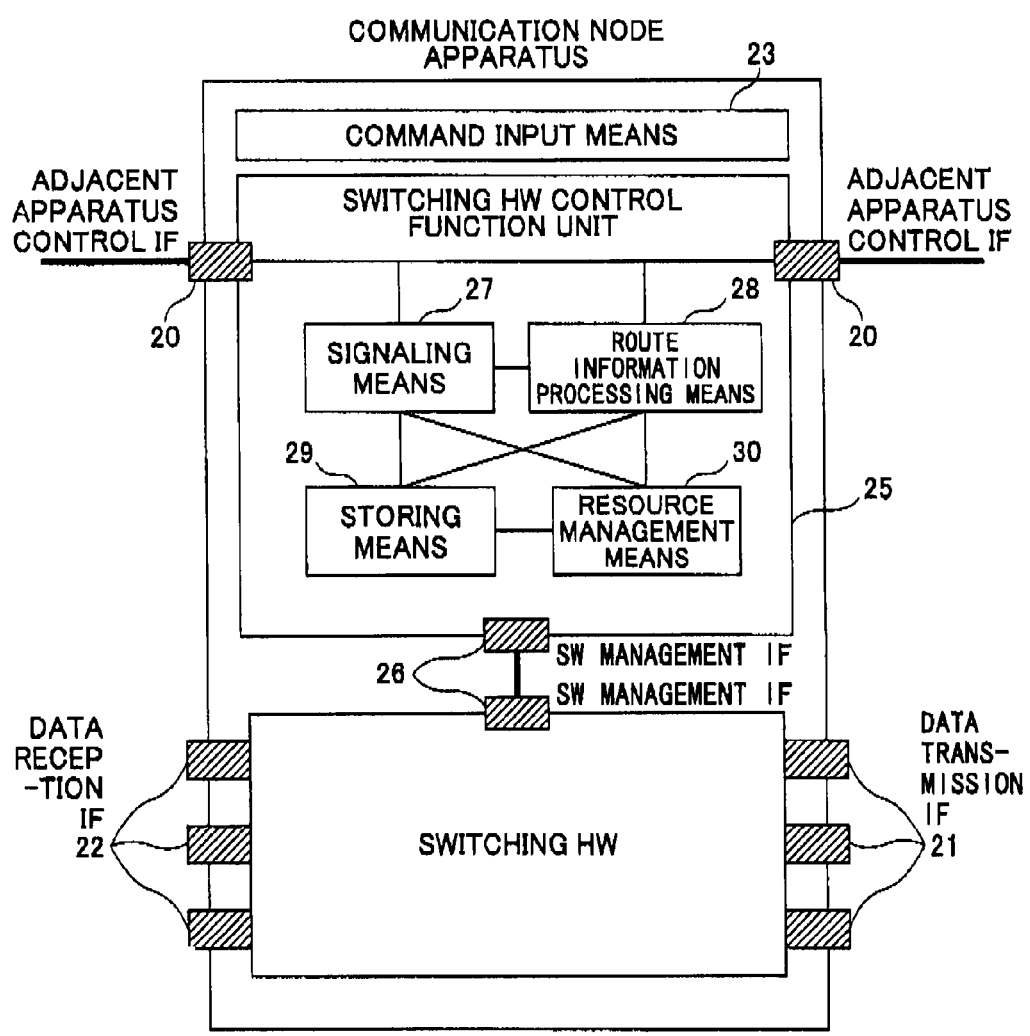
FIG. 3 is a block diagram of a communication node apparatus of the present embodiment.

Next, FIG. 3 shows a principle block diagram of the node of an embodiment of the present invention.

The communication node apparatus of an embodiment of the present invention is a communication apparatus for realizing path establishment or path switching, and includes adjacent apparatus control IFs (InterFace) 20 for sending and receiving control messages to/from adjacent nodes and a management server, data sending IFs 21 for sending data to adjacent nodes, data reception IFs 22 for receiving data from adjacent nodes, command input means 23 configured to receive settings from an operator, a switching HW (Hardware) 24 that is hardware in which paths are set, a switching HW control function unit 25 in which control function of the switching HW 23 is installed, and SW (Switching) management IFs 26 that are IFs of the switching HW 24 and the switching HW control function unit 25.

The switching HW control function unit 25 includes signaling means 27 configured to cause a signaling protocol to operate and to manage signaling sessions and switching state, route information processing means 28 configured to cause routing protocol and route calculation function to operate so as to perform route calculation, exchange and advertisement of route information, and storage means configured to store resource information, route information and information of established paths, and resource management means 30 configured to manage resource availability state and the like.

Figure 4:
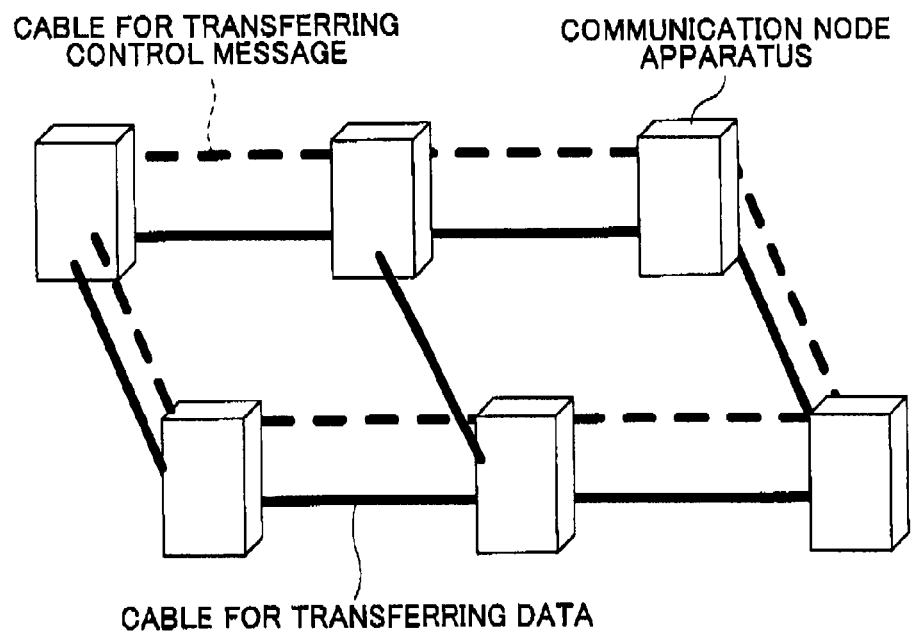
FIG. 4 is a diagram showing a communication network in the present embodiment.

In addition, as shown in FIG. 4, a communication network is configured by connecting between adjacent apparatus control IFs 20 of the communication apparatuses having the above-mentioned configuration using a cable for transferring control messages (dotted line), and connecting between the data sending IF 21 and the data reception IF 22 using a cable for transferring data (solid line) so as to interconnect the communication node apparatuses. In addition, by exchanging control messages by the adjacent apparatus control IF 20, path establishment is performed for the switching HW 24. In addition, the switching HW control function unit 25 manages resource information and path information, and manages assigned resources according to information of control massages that include information on resource reuse, so that efficient and speedy resource utilization for the communication apparatus can be realized.

Figure 5:
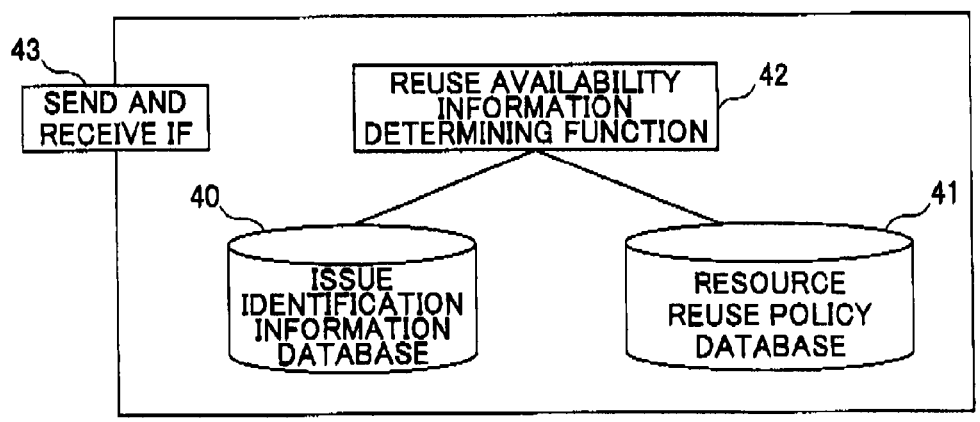
FIG. 5 is a block diagram of a resource reuse availability information issuing apparatus of the present embodiment.

FIG. 5 shows outline of a resource reuse availability information issuing apparatus. The resource reuse availability information issuing apparatus includes an issue identification information database 40 that stores information of users connecting to the communication network and path identification information that can be issued for path establishment request of the users, a resource reuse policy database 41 that stores resource reuse policy between users, a reuse availability information determination function 42 for determining reuse availability information to be issued for path establishment requested by the user by referring to information stored in the issue identification information database 40 and the resource reuse policy database 41, and a send and receive IF 43 for sending reuse availability information issued by the reuse availability information determination function 42 to other nodes.

Figure 6:
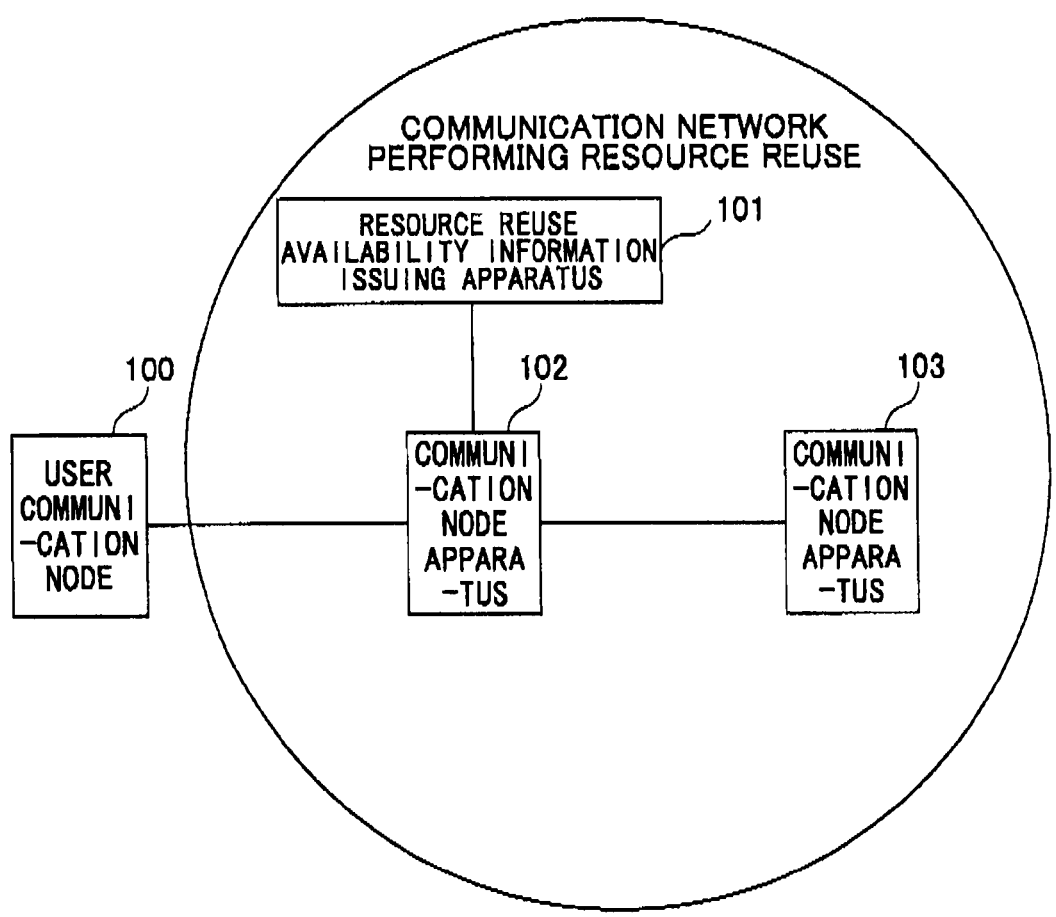
FIG. 6 is a connection diagram of resource reuse availability information issuing apparatus.

In addition, by connecting the resource reuse availability information issuing apparatus shown in FIG. 5 to communication node apparatuses 102 and 103 as shown in FIG. 6, the resource reuse availability information issuing apparatus 101 can provide the communication node apparatuses 102 and 103 with data on resource reuse policy to be include in the control message between the communication node apparatuses 102 and 103.

In the following, embodiments of the present invention are described.

Figure 7:
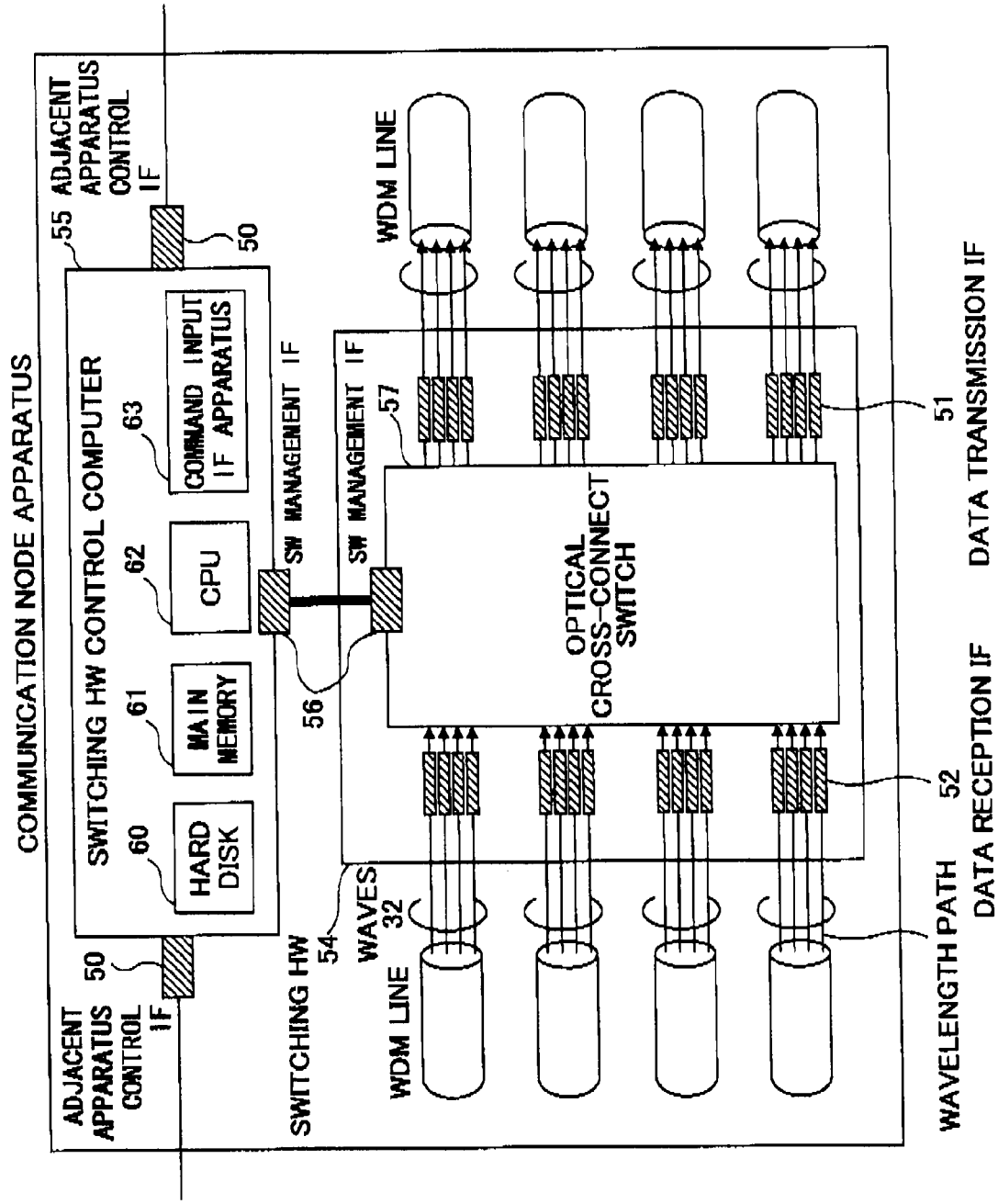
FIG. 7 is a detailed block diagram of the communication node apparatus of the present embodiment.

FIG. 7 shows a configuration of a communication node apparatus in an embodiment of the present invention. The communication node apparatus includes an optical cross connect switch 57 included in a switching HW 54 for realizing cross connection of wavelength paths, data reception IFs 52 for receiving light of wavelength paths, data transmission IFs 51 for transmitting light of wavelength paths, a switching HW control computer 55 for installing software for controlling SW, SW management IFs 56 that are IFs for the optical cross connect switch 57 and the switching HW control computer 55, and adjacent apparatus control IFs 50 for sending and receiving control messages to/from adjacent nodes.

In addition, WDM links that are media for sending multiplexed wavelength paths are connected to the communication node apparatus. The switching HW control computer 55 includes a hard disc 60 and a main memory 61 that are storage means, a CPU 62 for performing necessary computation such as route calculation and data processing, and a command input IF apparatus 63 such as a keyboard that is an interface for command input by an operator.

Figure 8:
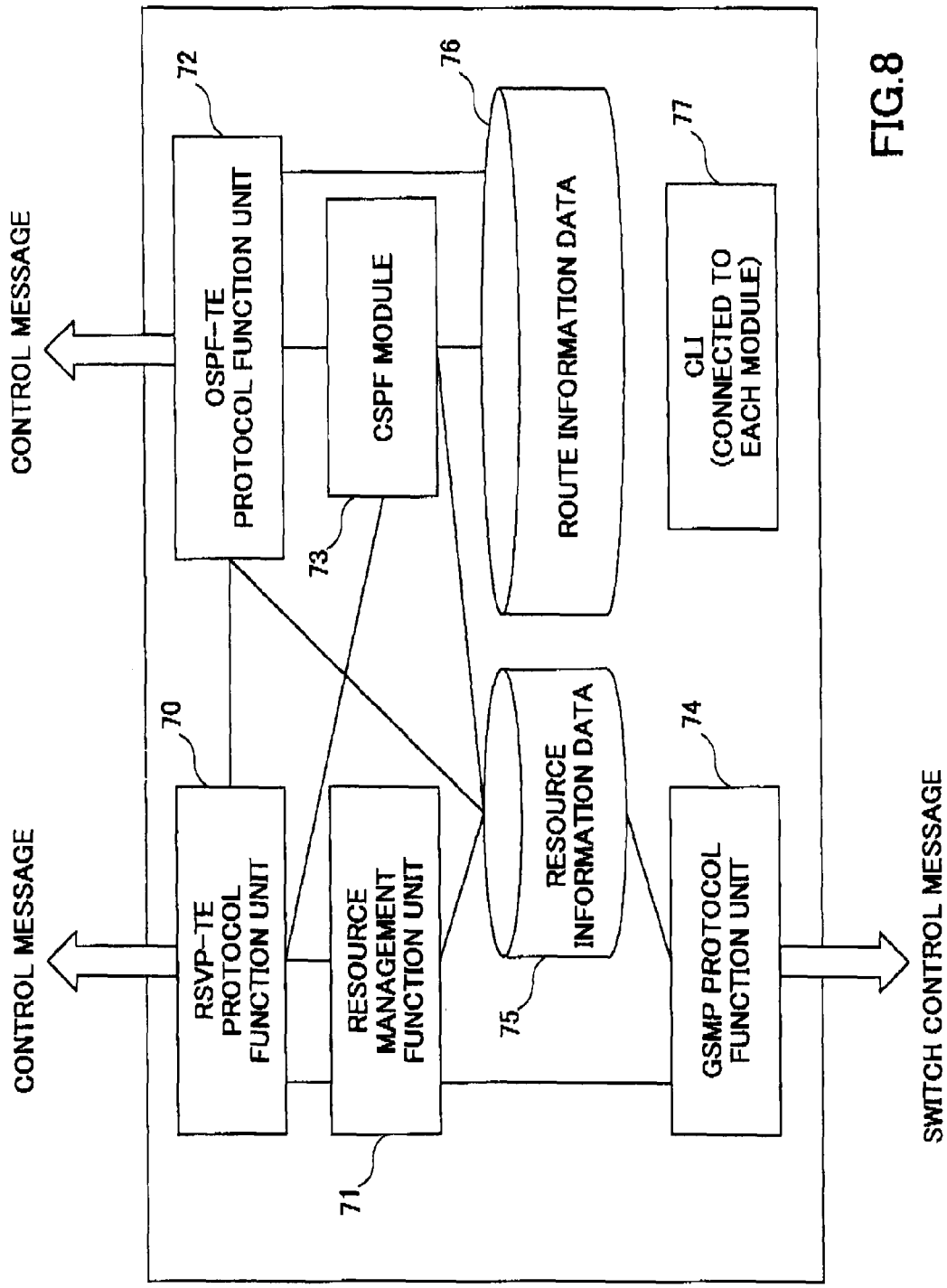
FIG. 8 is a functional block diagram of the communication node apparatus of the present embodiment.

FIG. 8 shows an example of a functional block configuration of the communication node apparatus of the present embodiment. In the present embodiment, RSVP-TE to which proprietary extension is added for the embodiment of the present invention is adopted as signaling means, and OSPF-TE (Open Shortest Path First for Traffic Engineering) (refer to non-patent document 4, for example) to which proprietary extension is added is adopted as a function of route processing means.

The RSVP-TE protocol function unit 70 is a function unit for performing generation and processes of control messages necessary for realizing signaling means, and the RSVP-TE protocol function unit 70 performs management of path session by exchanging path information between nodes for established paths.

The resource management function unit 71 is a function unit for referring to the resource information data 75 to determine resources to be assigned based on resource reuse availability information when performing path establishment processing by the RSVP-TE protocol function unit 70. In addition, the resource management function unit 71 has functions for cooperating with the RSVP-TE protocol function unit 70 to update resource reuse availability information stored in the resource information data 75 when a path is established, and performing detection of occurrence and dissolution of resource reuse state, and notifying the RSVP-TE protocol function unit 70 of the result of detection.

The OSPF-TE protocol function unit 72 is a function unit for realizing a function for receiving a control message from an adjacent node and generating the route information data 76, and a function for advertising resource information of the own node to adjacent nodes by including the resource information into a control message.

The CSPF (Constrained Shortest Path First) module 73 is a module for calculating route information of a path used by the signaling means by using the route information data 76. Route computation processing means is realized by cooperation between the OSPF-TE function unit 72 and the CSPF module 73, and the route computation processing means can receive a route computation request from the RSVP-TE protocol function unit 70, calculate a route satisfying required conditions and return the route to the RSVP-TE protocol function unit 70.

The GSMP (General Switch Management Protocol) (refer to non-patent document 6, for example) protocol function unit 74 is a protocol function unit for realizing exchange of control information relating to switching.

In addition, resource information data 75 and route information data 76 exist, and each module can refer to the data. The resource information data 75 has link information provided in the switching HW 54 and resource information corresponding to the link information, and stores an available resource amount and an in-use resource amount for each path. In addition, priority information of the resources and resource reuse availability information are stored.

FIG. 9 shows an example of resource priority information and resource reuse availability information included in the resource information data 75. The resource reuse availability information has a data structure by which following items can be retrieved using an link ID as a key.

Link ID (plural available)
Resource ID (plural available)
In-use path ID (plural available)
In-use path group ID (plural available)
Reuse available path ID (plural available)
Reuse available group ID (plural available)
Reuse inhibited path ID (plural available)
Reuse inhibited group ID (plural available)
Presence or absence of occurrence of reuse
Reused path ID (plural available)
Reused group ID (plural available)
Set up priority (plural available)
Holding priority (plural available)

The route information data 76 stores link information of other nodes collected via the OSPF-TE protocol function unit 72.

In addition, the communication node apparatus includes a CLI (Call-Level Interface) 77 that is an interface for command input and for information reference by an operator.

Physical setting information of the optical cross-connect switch 57 is reported to the switching HW control computer 55 via the SW management IF 56. In addition, generation and change of settings of the optical cross-connect switch 57 are performed by a control message from the switching HW control computer 55.

Figure 10:
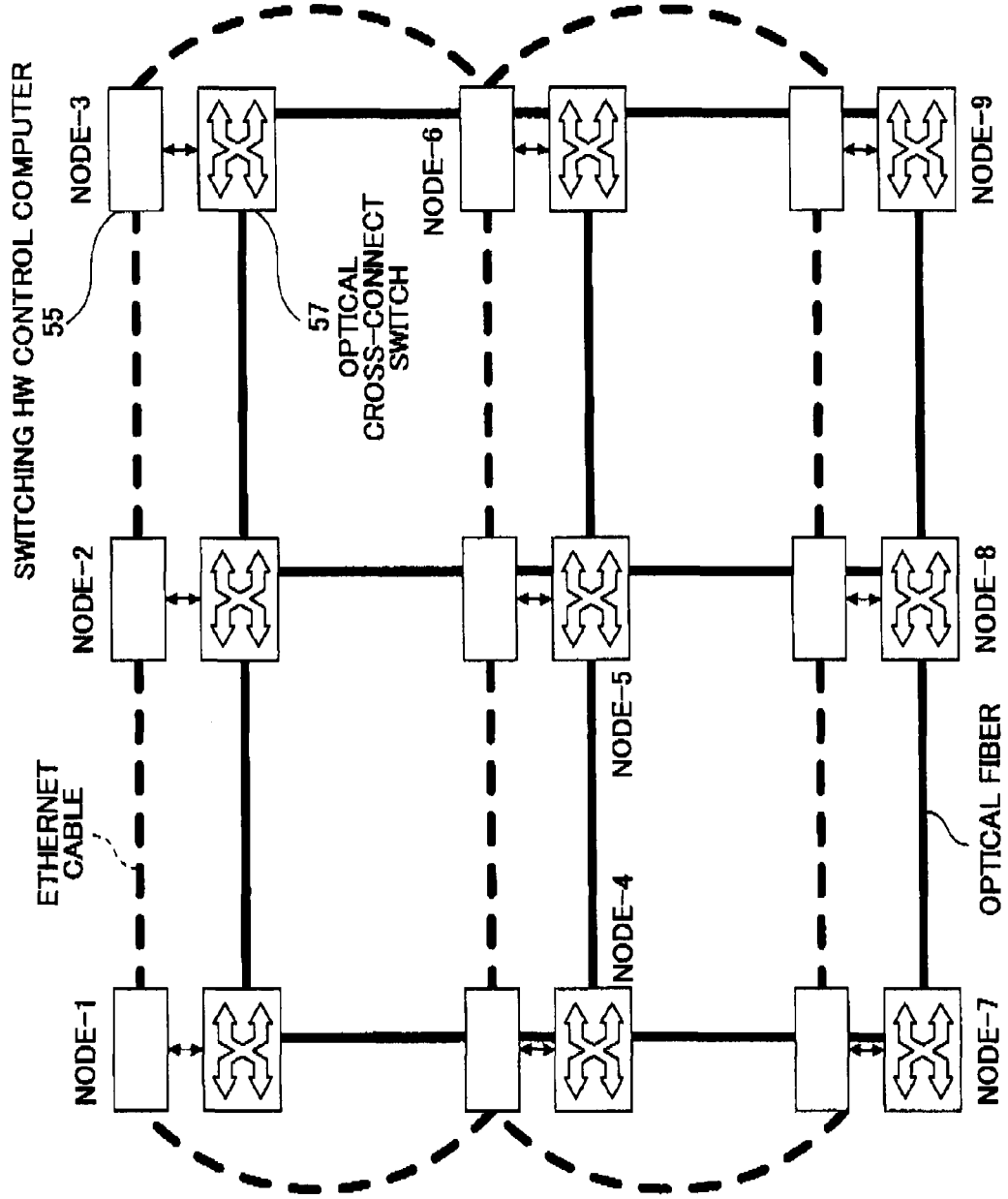
FIG. 10 is a diagram showing a communication network of a first embodiment for each function.

FIG. 10 shows a communication network configured by optical cross-connect switches. The adjacent apparatus control IF 50 of the switching HW control computer 55 of each communication node apparatus is connected to another IF 50 via an Ethernet cable (shown as dotted line), and light that is transmitted from an IF of the optical cross-connect switch 57 is transmitted by using an optical fiber (solid line), as a medium, connected to the optical cross-connect switch 57. In addition, a plurality of wavelengths are multiplexed in the optical fiber. In this example, the communication network is assumed to be operated by establishing wavelength paths, the number of wavelength channels included in a link between communication node apparatuses corresponds to an amount of resources of the communication network.

First Embodiment

This embodiment describes an operation example for performing resource reuse of resources by specifying an ID of a specific path, and describes an operation example for detecting resource release, notifying a start point node of it, and returning the state of the path back to the state before occurrence of reuse.

Figure 11:
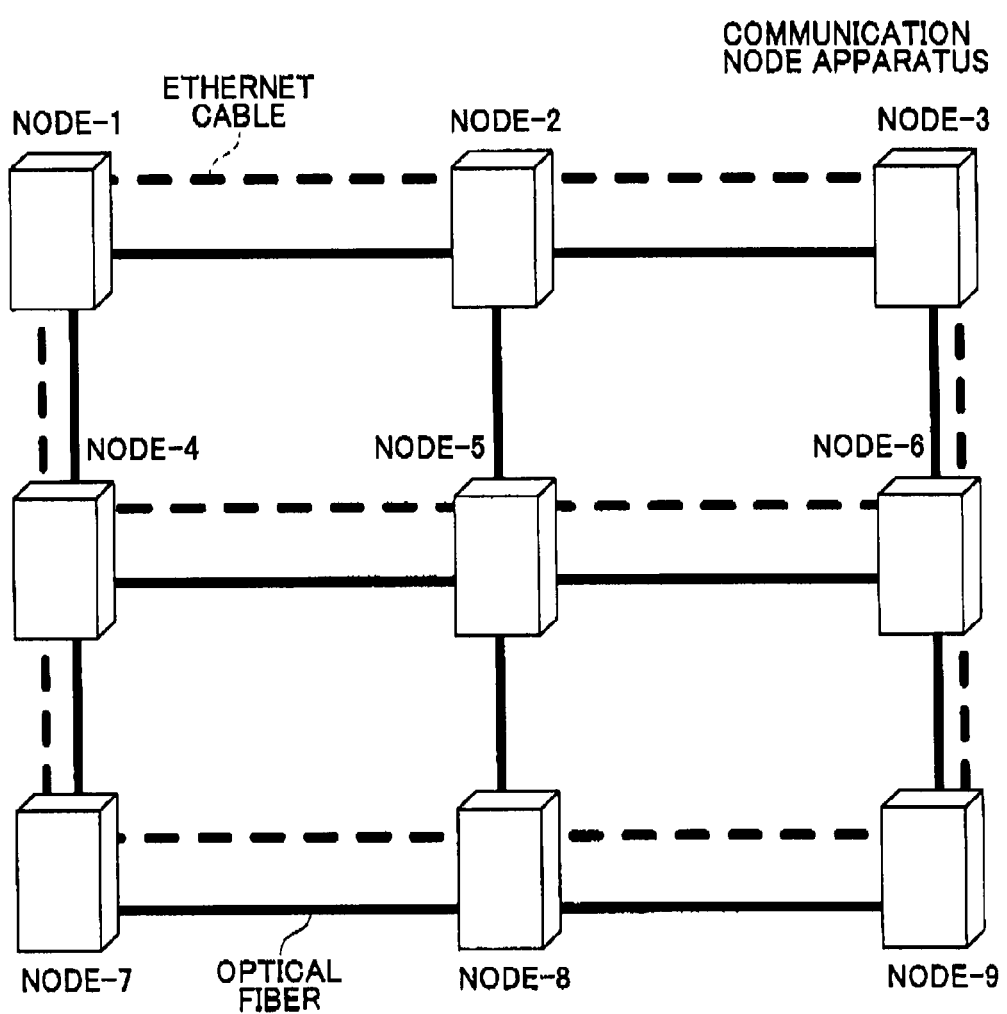
FIG. 11 is a diagram showing an example of a communication network.
Figure 12:
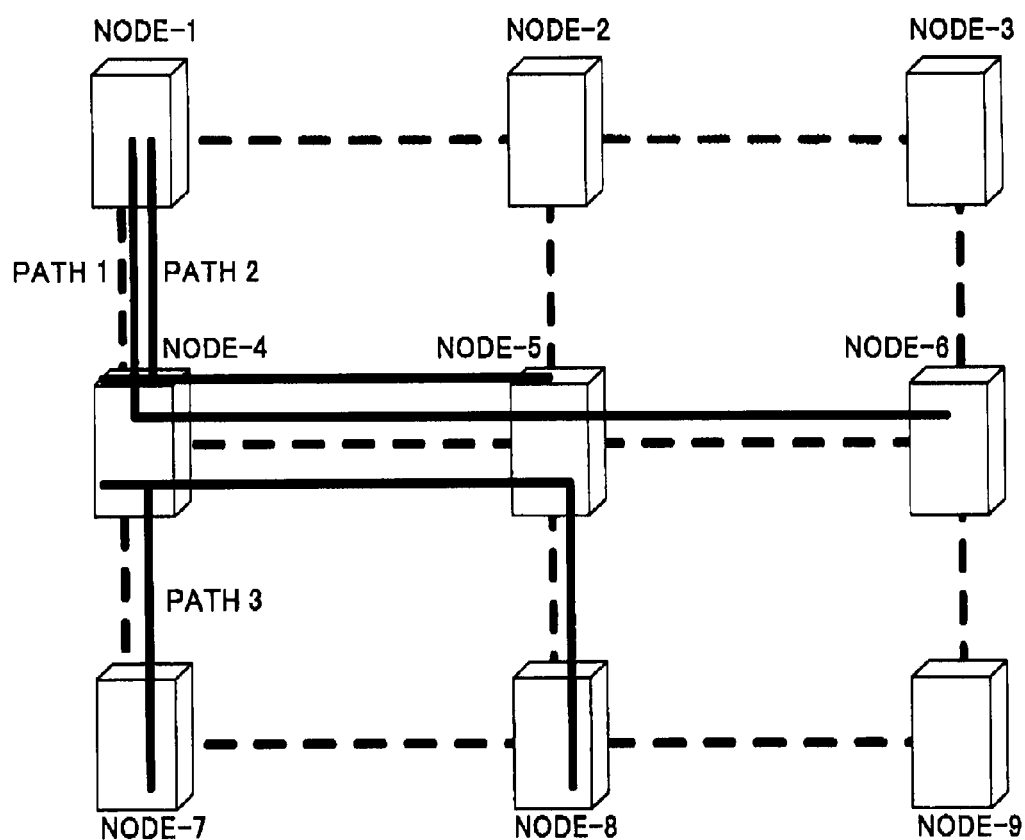
FIG. 12 is a diagram showing a network example for performing change of Priority value.
Figure 13:
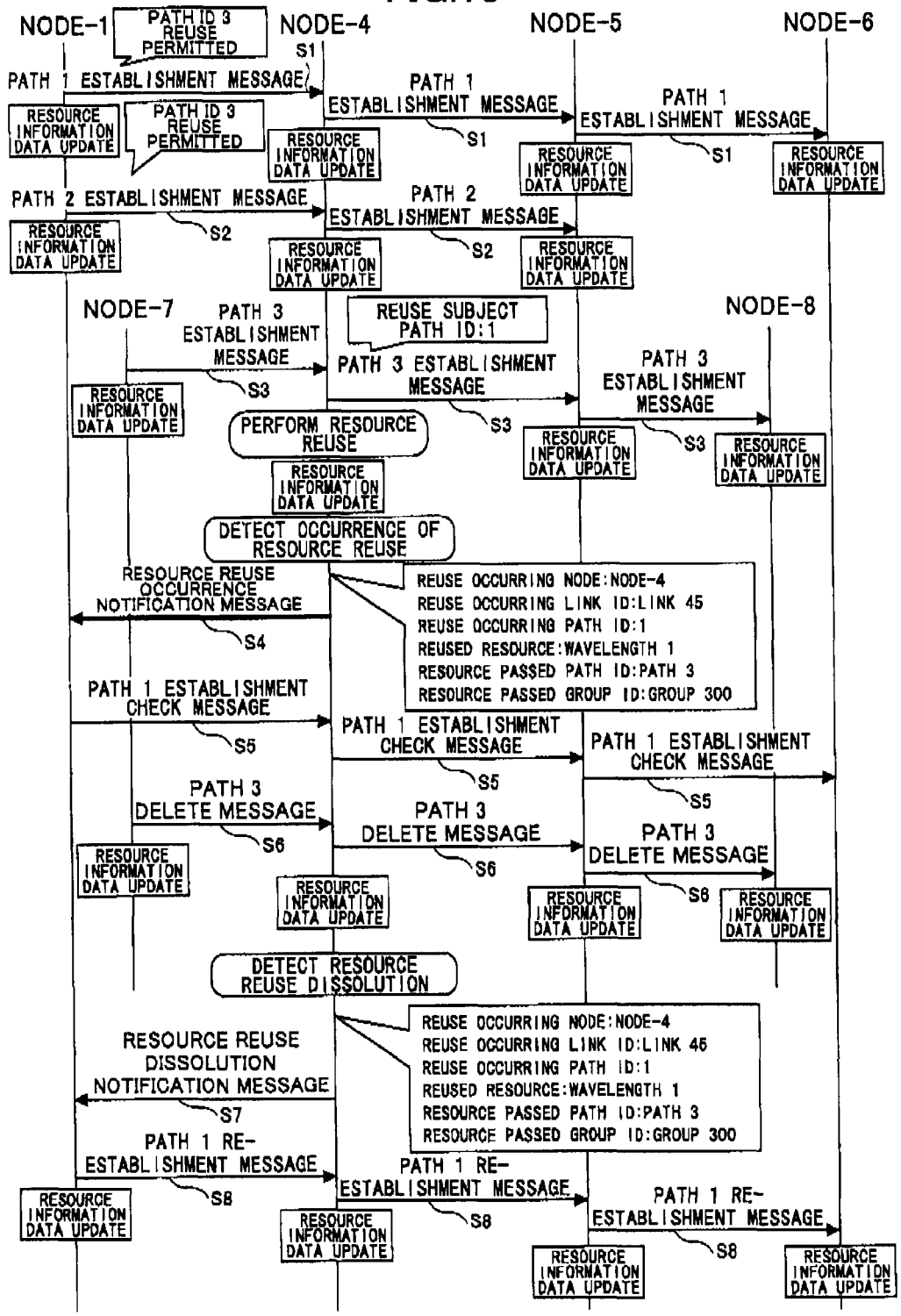
FIG. 13 is a diagram showing control sequence when performing resource reuse.

FIG. 11 shows a communication network of the first embodiment. FIG. 12 shows a network example in which a priority value is changed. FIG. 13 shows control message sequence outline in a case when a path 1 (node-1→node-4→node-5→node-6), a path 2 (node-1→node-4→node-5), and a path 3 (node-7→node-4→node-5→node-8) are established as shown in FIG. 12 in the communication network shown in FIG. 11, and operation for resource reuse is performed using the configuration of the present embodiment.

In the following, as to control information in descriptions for each embodiment, only parts essential for describing the embodiment of the present invention are described, and description of control information used only for realizing conventional technology such as basic functions of path operation are not provided.

Figure 14:
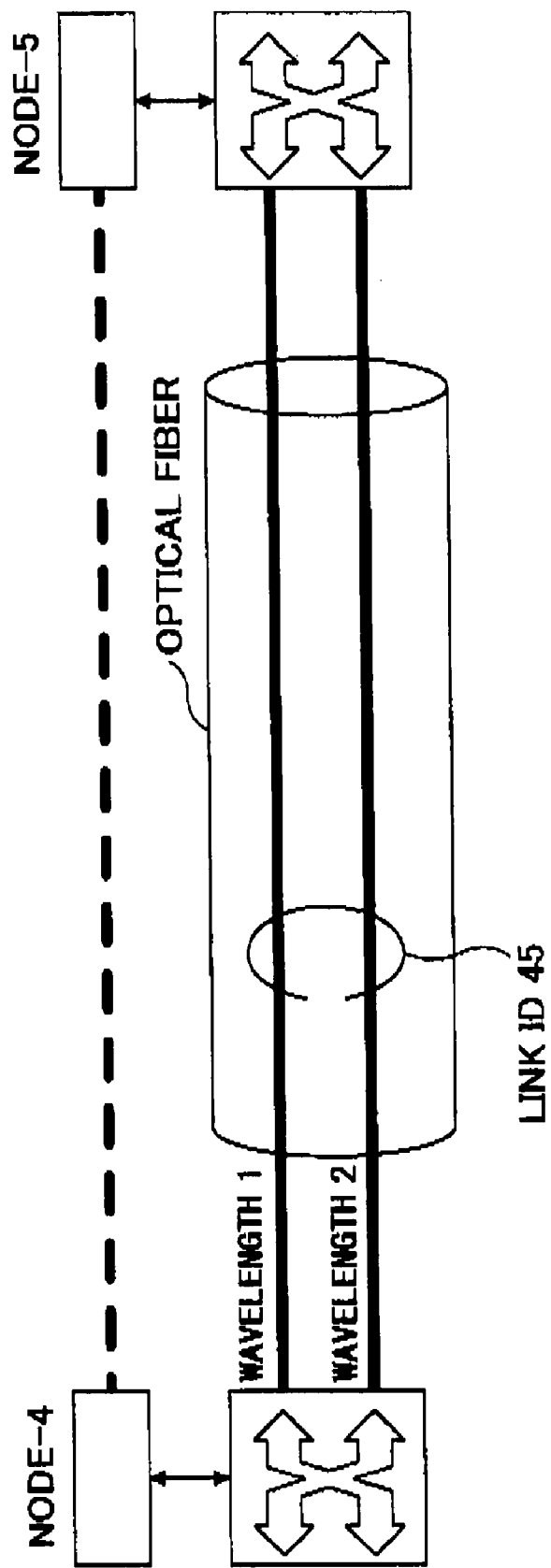
FIG. 14 is a diagram showing a link configuration example.

In this embodiment, before establishing the path 3, the path 1 and the path 2 are established, and then, the path 3 is established by reusing resources of the path 1. FIG. 14 shows a link configuration example of the first embodiment. As shown in FIG. 14, resources (wavelengths) of two wavelengths that are a wavelength 1 and a wavelength 2 are prepared between the node-4 and the node-5 where reuse of resources occurs.

As shown in FIG. 13, a control message is transmitted for establishing the path 1 along the route of node-1→node-4→node-5→node-6 (step 1). The control message of the path 1 includes following control information.

-Contents of Path 1 Establishment Control Message-
Path ID: 1
Group ID: 100
ID of path for which reuse is permitted: 3
ID of group for which reuse is permitted: not designated
ID of reuse subject path: not designated
ID of reuse subject group: not designated Resources are assigned in node-1→node-4→node-5→node-6 and the resource information data 75 is updated. In this process, wavelength resources between the node-4 and the node-5 are retrieved from among available wavelengths by the resource management function unit 71 in the communication node apparatus. As a result, a wavelength 1 is assigned. FIG. 15 shows (a part of) reuse availability information in node-4.

A control message for establishing the path 2 along the route of node-1→node-4→node-5 is transmitted (step 2) so that the path 2 is established. The control message of the path 2 includes the following control information.

-Contents of Path 2 Establishment Control Message-
Path ID: 2
Group ID: 200
ID of path for which reuse is permitted: 3
ID of group for which reuse is permitted: not designated
ID of reuse subject path: not designated
ID of reuse subject group: not designated Resources are assigned in node-1→node-4→node-5 and the resource information data 75 is updated. In this process, wavelength resources between the node-4 and the node-5 are retrieved from among available wavelengths by the resource management function unit 71 in the communication node apparatus. As a result, a wavelength 2 is assigned. FIG. 16 shows (a part of) reuse availability information in node-4.

Based on command input from the CLI 77 and a control message from other communication node apparatus, a setting condition of the path 3 is set such that resources of the path 1 are reused.

A control message for establishing the path 3 over the route of node-7→node-4→node-5→node-8 is transmitted (step 3) so that the path 3 is established. The control message of the path 3 includes the following control information.
-Contents of Path 3 Establishment Control Message-
  Path ID: 3
  Group ID: 300
  ID of path for which reuse is permitted: not designated
  ID of group for which reuse is permitted: not designated
  ID of reuse subject path: 1
  ID of reuse subject group: not designated In the communication node apparatus that received the establishment control message of the path 3, the resource management function unit 71 refers to the resource information data 75 to retrieve a wavelength assigned to the path designated by the path ID of the reuse subject. In the node-4, as a result of retrieve process, a resource assigned to the path 1 having the path ID 1 is found in wavelengths existing in the downstream side link (link ID 45) of the node-4, that is, the wavelength 1 is found.

Then, reuse availability information in the resource information data 75 is referred to and it is checked whether ID 3 that is an ID of the path 3 is included in path IDs for which reuse of wavelength 1 is permitted. Since the ID 3 is included in the path IDs for which reuse of wavelength 1 is permitted, the wavelength 1 is reused as the resource of the path 3 so that the wavelength 1 is assigned to the path 3.

Also in the node-5, as a result of similar retrieve processing, a resource assigned to the path 1 having the path ID 1 is found in wavelengths existing in the upstream side link (link ID 45) of the node-5, that is, the wavelength 1 is found. The wavelength 1 is reused as resources for the path 3 and assigned to the path 3.

After the resources are assigned, resource information data 75 is updated in each communication node apparatus of node-7→node-4→node-5→node-8. The reuse availability information (a part of it) of the node-4 becomes as shown in FIG. 17. In the node-4, even after the wavelength 1 that was a resource for the path 1 is reused as a resource for the path 3, information indicating that the resource that was originally used by the path 1 is reused is recorded in resource information data 75 by the resource management function unit 71.

The node-4 in which resource reuse for the path occurred sends information, as a control message, such as path, link ID and wavelength ID and the like for which reuse occurs to the node 1 that is an Ingress node (start point node) of the path 1 that was reused (step 4). The resource reuse occurrence notification message includes following control information.
-Contents of Resource Reuse Occurrence Notification Message-
  Communication node apparatus in which reuse occurred: node-4
  ID of link in which reuse occurred: link 45
  ID of path in which reuse occurred: 1
  Reused resource: wavelength 1
  ID of path to which resource was passed: path 3
  ID of group to which resource was passed: group 300.

The node-1 that received the resource reuse occurrence notification stores contents included in the resource reuse occurrence notification message by the resource management function unit 71. In the process of storing, the path ID of the path 1 is associated with combination of node ID, link ID and wavelength ID for which reuse occurred, and the contents are stored such that the ID of the path 1 for which reuse occurred can be retrieved using the combination of the node ID, link ID and wavelength ID for which reuse occurred or using any of these as a key. In addition, by receiving the notification, the path 1 is set to be in a non-operation state, and transmission of data is stopped.

On the route of the path 1 that gave the resource to another path by resource reuse, an establishment check message (refresh message) is exchanged for checking setting information before occurrence of reuse (step 5). In addition, by the message, communication node apparatuses of the path 1 store and maintain path setting information such as the path ID of the path 1, and path or group ID that permits or prohibits reuse.

A control message for deleting the path 3 is transmitted over the route of node-7→node-4→node-5→node-8 (step 6) so as to delete the path 3. When the path 3 is deleted, the wavelength 1 that is the resource between the node-4 and the node-5 is released.

The resource of the path 3 is released in node-7→node-4→node-5→node-8, and the resource information data 75 is updated. Reuse availability information (a part of it) in the node-4 becomes as shown in FIG. 18.

In node-4, the resource management function unit 71 detects that the wavelength 1 is released, then, the node-4 specifies the node 1 as a start point node of the path 1 that was assigned before being reused based on switching information stored before reuse occurred, and sends a control message to the node-1 notifying the node-1 of dissolution of resource reuse state (step 7). The resource reuse dissolution notification message includes the following control information.
-Contents of Resource Reuse Dissolution Notification Message-
  Communication node apparatus where reuse release occurred: node-4
  ID of link in which reuse was dissolved: link 45
  ID of path in which reuse was dissolved: path 1
  Reuse dissolved resource: wavelength 1
  ID of path that used resource before dissolution occurrence: path 3
  ID of group that used resource before dissolution occurrence: Group 300

The node-1 that received the resource reuse dissolution message sends a re-establishment message over node-1→node-4→node-5→node-6 on the route of the path 1 for re-establishing the path 1 that is in a non-operation state due to resource reuse based on the contents of the received control message (step 8), so as to start processing for re-establishment into operation state for the path 1.

The wavelength 1 is assigned to the path 1 in the section between the node-4 and the node-5 in order to set the path 1 into an operation state again. Then, resource information data 75 is updated in node-1→node-4→node-5→node-6 on the route of the path 1. Reuse availability information (a part) in the node-4 at this time is shown in FIG. 19.

In the present embodiment, a path where resources are reused may be either a working path or a backup path.

Second Embodiment

The present embodiment gives a path establishment example for establishing a path by performing resource reuse by specifying a group ID of a specific path in which resource reuse is performed from a path belonging to the specified group, and gives an operation example for detecting resource release, notifying the start point node, and switching back the state of the path to a state before reuse occurrence.

In the first embodiment, operation for specifying indivisible paths is possible. On the other hand, in the present embodiment, operation for specifying a group of paths is possible. For both embodiments, although there is a similar effect in that operability is improved, which is more applicable and which provides greater effect depend on the status of the communication network. Thus, it leads to improvement of operability to prepare both of the first embodiment and the second embodiment so as to diversify designation methods.

As to path ID, a same value is used from path establishment until deleting the path. On the other hand, group ID is flux. Thus, the method for specifying the group ID is more useful in the case where operation policy is changed fluidly.

Control message sequence outline is described with reference to FIG. 13 in a case in which path 1 (node-1→node-4→node-5→node-6), path 2 (node-1→node-4→node-5), and path 3 (node-7→node-4→node-5→mode-8) are established as shown in FIG. 12 in a communication network shown in FIG. 11, and operation for performing resource reuse is performed using the configuration of the embodiment of the present invention.

In this embodiment, before establishing the path 3, the path 1 and the path 2 are established, and then, the path 3 is established by reusing resources from the path 1. As shown in FIG. 14, resources (wavelengths) of wavelength 1 and wavelength 2 are prepared between the node-4 and the node-5 where reuse of resources occurs.

A control message is transmitted for establishing the path 1 along the route of node-1→node-4→node-5→node-6 (step 1). In the present embodiment, the control message of the path 1 includes following control information.

-Contents of Path 1 Establishment Control Message-
  Path ID: 1
  Group ID: 100
  ID of path for which reuse is permitted: not designated
  ID of group for which reuse is permitted: 300
  ID of reuse subject path: not designated
  ID of reuse subject group: not designated
  Resources are assigned in node-1→node-4→node-5→node-6 and the resource information data 75 is updated. In this process, wavelength resources between the node-4 and the node-5 are retrieved from among available wavelengths by the resource management function unit 71 in the communication node apparatus. As a result, the wavelength 1 is assigned. FIG. 20 shows (a part of) reuse availability information in node-4.

A control message for establishing the path 2 along the route of node-1→node-4→node-5 is transmitted (step 2) so that the path 2 is established. The control message of the path 2 includes the following control information.

-Contents of Path 2 Establishment Control Message-
  Path ID: 2
  Group ID: 200
  ID of path for which reuse is permitted: not designated
  ID of group for which reuse is permitted: 300
  ID of reuse subject path: not designated
  ID of reuse subject group: not designated
Resources are assigned in node-1→node-4→node-5 and the resource information data 75 is updated. In this process, wavelength resources between the node-4 and the node-5 are retrieved from among available wavelengths by the resource management function unit 71 in the communication node apparatus. As a result, the wavelength 2 is assigned. FIG. 21 shows (a part of) reuse availability information in node-4.

Based on command input from the CLI 77 and a control message from other communication node apparatus, a setting condition for the path 3 is set such that the path 3 reuses resources from path 1.

A control message for establishing the path 3 along the route of node-7→4node-4→node-5→node-8 is transmitted (step 3) so that the path 3 is established. In the present embodiment, the control message for the path 3 includes the following control information.

-Contents of Path 3 Establishment Control Message-
  Path ID: 3
  Group ID: 300
  ID of path for which reuse is permitted: not designated
  ID of group for which reuse is permitted: not designated
  ID of reuse subject path: not designated
  ID of reuse subject group: 100

In the communication node apparatus that received the path 3 establishment control message, the resource management function unit 71 refers to the resource information data 75 to retrieve a wavelength assigned to the path belonging to the group designated by the group ID of the reuse subject. In the node-4, as a result of retrieve process, a resource assigned to the path 1 having the group ID 100 is found from wavelengths existing in the downstream side (link ID 45) of the node-4, that is, the wavelength 1 is found.

Then, reuse availability information in the resource information data 75 is referred to and it is checked whether the reuse availability information includes ID 300 that is a group ID of the path 3 is included as a path ID by which reuse of the wavelength 1 is permitted. Since the ID 300 is included as a path ID by which reuse of the wavelength 1 is permitted, the wavelength 1 is reused as the resource of the path 3 so that the wavelength 1 is assigned to the path 3.

Also in the node-5, as a result of similar search processing, a resource that is assigned to the path 1 having the group ID 100 is found in wavelengths that exist in an upstream side link (link ID: 45) of the node-5, that is, the wavelength 1 is found. The wavelength 1 is reused as a resource for the path 3 and assigned to the path 3. After the resource is assigned, resource information data 75 is updated in each communication node apparatus of node-7→node-4→node-5→node-8.

The reuse availability information (a part) on the node-4 becomes as shown in FIG. 22. In the node-4, even after the wavelength 1 that was a resource for the path 1 is reused as a resource for the path 3, information indicating that the resource that was originally used by the path 1 is reused is recorded in resource information data 75 by the resource management function unit 71.

The node-4 in which resource reuse for the path occurred sends information, as a control message, such as path, link ID and wavelength ID and the like for which reuse occurred to the node 1 that is an Ingress node (start point node) of the reused path 1 (step 4). The resource reuse occurrence notification message includes following control information.

-Contents of Resource Reuse Occurrence Notification Message-
  Communication node apparatus in which reuse occurred: node-4
  ID of link in which reuse occurred: link 45
  ID pf path in which reuse occurred: path 1
  Reused resource: wavelength 1
  ID of path to which resource was passed: path 3
  ID of group to which resource was passed: group 300.

The node-1 that received the resource reuse occurrence notification stores contents included in the resource reuse occurrence notification message by the resource management function unit 71. In the process of storing, the path ID of the path 1 is associated with combination of node ID, link ID and wavelength ID for which reuse occurred, and the contents are stored such that the ID of the path 1 for which reuse occurred can be retrieved using the combination of the node ID, link ID and wavelength ID for which reuse occurred or using any of these as a key. In addition, by receiving the notification, the path 1 is set to be in a non-operation state, and transmission of data is stopped.

On the route of the path 1 that gave the resource to another path due to resource reuse, an establishment check message (refresh message) is exchanged for checking setting information before occurrence of reuse (step 5). In addition, by the message, communication node apparatuses of the path 1 store and maintain path setting information such as the path ID of the path 1, and path or group ID that permits or inhibits reuse.

A control message for deleting the path 3 is transmitted along the route of node-7→node-4→node-5→node-8 (step 6) so as to delete the path 3. When the path 3 is deleted, the wavelength 1 that is the resource between the node-4 and the node-5 is released.

The resource of the path 3 is released in node-7→node-4→node-5→node-8, and the resource information data 75 is updated. Reuse availability information (a part of it) in the node-4 becomes as shown in FIG. 23.

In node-4, the resource management function unit 71 detects that the wavelength 1 is released, then, the node-4 specifies sends a control message to the node-1 that is a start node of the path 1 that was assigned before being reused, notifying the node-1 of release of resource reuse state (step 7). The resource reuse dissolution message includes the following control information.

Communication node apparatus where reuse dissolution occurred: node-4
ID of link in which reuse was dissolved: link 45
ID of path in which reuse was dissolved: path 1
Reuse dissolved resource: wavelength 1
ID of path that used resource before dissolution occurrence: path 3
ID of group that used resource before dissolution occurrence: Group 300

The node-1 that received the resource reuse dissolution message sends a re-establishment message over node-1→node-4→node-5→node-6 on the route of the path 1 for re-establishing the path 1 that is in a non-operation state due to resource reuse based on the contents of the received control message (step 8), so as to start processing for re-establishment into operation state for the path 1.

The wavelength 1 is assigned to the path 1 in the section between the node-4 and the node-5 in order to set the path 1 into an operation state again. Then, resource information data 75 is updated in node-1→node-4→node-5→node-6 on the route of the path 1. Reuse availability information (a part) in the node-4 at this time is shown in FIG. 24.

In the present embodiment, a path in which resource reuse occurs may be either a working path or a backup path.

Third Embodiment

The third embodiment gives an operation example for referring to resource reuse inhibited path ID when performing resource reuse based on priority information in path establishment processing so as to find non-inhibited resources, and to perform resource reuse from the resources that are not inhibited for use by the path to be established. In addition, the present embodiment gives an operation example for detecting resource release, notifying the start point node, and switching back the state of the path to the state before occurrence of reuse.

Also in the present embodiment, outline of control message sequence is described with reference to FIG. 13 in a case when a path 1 (node-1→node-4→node-5→node-6), a path 2 (node-1→node-4→node-5), and a path 3 (node-7→node-4→node-5→node-8) are established as shown in FIG. 12 in the communication network shown in FIG. 11, and operation for resource reuse is performed using the configuration of the present embodiment.

In this embodiment, before establishing the path 3, the path 1 and the path 2 are established, and then, the path 3 is established by reusing resources of the path 1. As shown in FIG. 14, resources (wavelengths) of two wavelengths that are a wavelength 1 and a wavelength 2 are prepared between the node-4 and the node-5 where reuse of resources occurs.

A control message is transmitted for establishing the path 1 along the route of node-1→node-4→node-5→node-6 (step 1). The control message of the path 1 includes following control information.

-Contents of Path 1 Establishment Control Message-
Path ID: 1
Group ID: 100
ID of path for which reuse is inhibited: not designated
ID of group for which reuse is inhibited: not designated
ID of reuse subject path: not designated
ID of reuse subject group: not designated
Set up priority: 8
Holding priority: 4

Resources are assigned in node-1→node-4→node-5→node-6 and the resource information data 75 is updated. In this process, wavelength resources between the node-4 and the node-5 are retrieved from among available wavelengths by the resource management function unit 71 in the communication node apparatus. As a result, a wavelength 1 is assigned. FIG. 25 shows (a part of) reuse availability information in node-4.

A control message for establishing the path 2 along the route of node-1→node-4→node-5 is transmitted (step 2) so that the path 2 is established. The control message of the path 2 includes the following control information.

-Contents of Path 2 Establishment Control Message-
Path ID: 2
Group ID: 200
ID of path for which reuse is inhibited: not designated
ID of group for which reuse is inhibited: 300
ID of reuse subject path: not designated
ID of reuse subject group: not designated
Set up priority: 8
Holding priority: 5

Resources are assigned in node-1→node-4→node-5 and the resource information data 75 is updated. In this process, wavelength resources between the node-4 and the node-5 are retrieved from among available wavelengths by the resource management function unit 71 in the communication node apparatus. As a result, a wavelength 2 is assigned. FIG. 26 shows (a part of) reuse availability information in node-4.

A control message for establishing the path 3 over the route of node-7→node-4→node-5→node-8 is transmitted (step 3) so that the path 3 is established. The control message of the path 3 includes the following control information.

-Contents of Path 3 Establishment Control Message-
Path ID: 3
Group ID: 300
ID of path for which reuse is inhibited: not designated
ID of group for which reuse is inhibited: not designated
ID of reuse subject path: not designated
ID of reuse subject group: not designated
Set up priority: 3
Holding priority: 1

In the communication node apparatus that received the establishment control message of the path 3, the resource management function unit 71 refers to the resource information data 75. In the node-4, as a result of retrieve process, since there is no available resource, resource reuse is performed. Set up priority of the path to be established is 3. On the other hand, holding priorities of wavelength 1 and wavelength 2 that are in-use resources existing in the downstream side link (link 45) are 4 and 5 respectively. Thus, assignment candidate wavelengths that are found based on priority information are the wavelength 1 and the wavelength 2.

However, as to the wavelength 2, there is the group 300 that is a group ID of the path 3 as a reuse inhibited group ID. Therefore, the assignment candidate wavelength is narrowed into the wavelength 1, so that the wavelength 1 assigned to the path 1 is reused for assignment to the path 3.

Also in the node-5, as a result of similar retrieve processing, the wavelength 1 is found in the upstream side link of the node-5. The wavelength 1 is reused as resources for the path 3 and assigned to the path 3. After the resources are assigned, resource information data 75 is updated in each communication node apparatus of node-7→node-4→node-5→node-8.

The reuse availability information (a part of it) of the node-4 becomes as shown in FIG. 27. In the node-4, even after the wavelength 1 that was a resource for the path 1 is reused as a resource for the path 3, information indicating that the resource that was originally used by the path 1 is reused is recorded in resource information data 75 by the resource management function unit 71.

The node-4 in which resource reuse for the path occurred sends information, as a control message, such as path, link ID and wavelength ID and the like for which reuse occurs to the node 1 that is an Ingress node (start point node) of the path 1 that was reused (step 4). The resource reuse occurrence notification message includes following control information.

-Contents of Resource Reuse Occurrence Notification Message-

Communication node apparatus in which reuse occurred: node-4
  ID of link in which reuse occurred: link 45
  ID of path in which reuse occurred: 1
  Reused resource: wavelength 1
  ID of path to which resource was passed: path 3
  ID of group to which resource was passed: group 300.

The node-1 that received the resource reuse occurrence notification stores contents included in the resource reuse occurrence notification message by the resource management function unit 71. In the process of storing, the path ID of the path 1 is associated with combination of node ID, link ID and wavelength ID for which reuse occurred, and the contents are stored such that the ID of the path 1 for which reuse occurred can be retrieved using the combination of the node ID, link ID and wavelength ID for which reuse occurred or using any of these as a key. In addition, by receiving the notification, the path 1 is set to be in a non-operation state, and transmission of data is stopped.

On the route of the path 1 that gave the resource to another path by resource reuse, an establishment check message (refresh message) is exchanged for checking setting information before occurrence of reuse (step 5). In addition, by the message, communication node apparatuses of the path 1 store and maintain path setting information such as the path ID of the path 1, and path or group ID that permits or prohibits reuse.

A control message for deleting the path 3 is transmitted over the route of node-7→node-4→node-5→node-8 (step 6) so as to delete the path 3. When the path 3 is deleted, the wavelength 1 that is the resource between the node-4 and the node-5 is released.

The resource of the path 3 is released in node-7→node-4→node-5→node-8, and the resource information data 75 is updated. Reuse availability information (a part of it) in the node-4 becomes as shown in FIG. 28.

In the node-4, the resource management function unit 71 detects that the wavelength 1 is released, then, the node-4 sends a control message to the node-1 that is a start point node of the path 1 that was assigned before being reused, notifying the node-1 of dissolution of resource reuse state (step 7). The resource reuse dissolution notification message includes the following control information.

-Contents of Resource Reuse Dissolution Notification Message-

Communication node apparatus where reuse release occurred: node-4
  ID of link in which reuse was dissolved: link 45
  ID of path in which reuse was dissolved: path 1
  Reuse dissolved resource: wavelength 1
  ID of path that used resource before dissolution occurrence: path 3
  ID of group that used resource before dissolution occurrence: Group 300

The node-1 that received the resource reuse dissolution message sends a re-establishment message over node-1→node-4→node-5→node-6 on the route of the path 1 for re-establishing the path 1 that is in a non-operation state due to resource reuse based on the contents of the received control message (step 8), so as to start processing for re-establishment into operation state for the path 1.

The wavelength 1 is assigned to the path 1 in the section between the node-4 and the node-5 in order to set the path 1 into an operation state again. Then, resource information data 75 is updated in node-1→node-4→node-5→node-6 on the route of the path 1. Reuse availability information (a part) in the node-4 at this time is shown in FIG. 29.

In the present embodiment, a path where resources are reused may be either a working path or a backup path.

Fourth Embodiment

In the forth embodiment, an example is explained for updating group ID set to a path based on the present invention, resource reuse permitted or inhibited path ID or group ID, and holding priority representing degree of priority of path resource holding.

Figure 30:
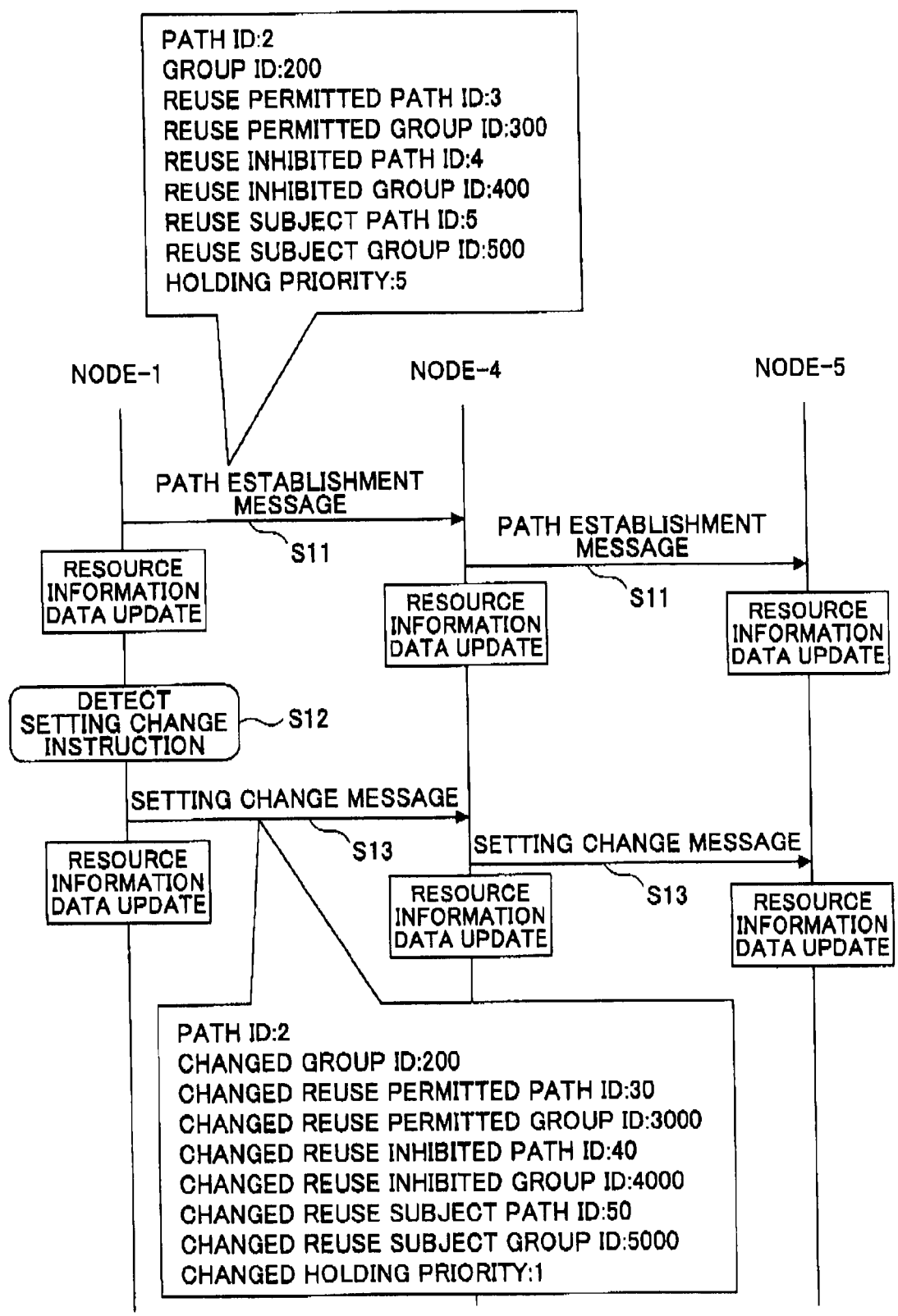
FIG. 30 is a diagram showing control sequence when changing settings.

FIG. 30 shows control message sequence outline in the case when changing group ID, group ID for which resource reuse is permitted, path ID for which resource reuse is permitted, and the value of holding priority representing the degree of priority of resource holding of the path for the path 2 established over node-1→node-4→node-5 shown in FIG. 12.

In this example, according to the following procedure, path 2 is established, and after the path 2 is established, the system changes group ID, path ID or group ID for which resource reuse is permitted or inhibited, and the value of holding priority representing the degree of the priority of resource holding of the path that are set for the path by using a setting change message for the path 2.

A path establishment message is sent over the route of node-1→node-4→node-5 (step 11), so that the path 2 is established. The message for establishing the path 2 includes following information. Parameters for initial setting for the path 2 is determined by this information.

-Control Information Included in the Path Establishment Message-

Path ID: 2
  Group ID: 200
  ID of path ID for which reuse is permitted: 3

ID of group ID for which reuse is permitted: 300
ID of path for which reuse is inhibited: 4
ID of group for which reuse is inhibited: 400
ID of reuse subject path: 5
ID of reuse subject group: 500
holding priority: 5

The resource information data 75 is updated in node-1→node-4→node-5 that is the route of the path 2. In addition, (a part of) reuse availability information in the node-4 becomes one as shown in FIG. 31.

In addition, path ID and group ID of reuse subject of the path 2 are recorded in the resource information data 75 as shown in FIG. 32.

A setting change instruction is detected in the node-1 (step 12). The setting change instruction is a request triggered by operation of an operator, a request triggered by failure occurrence or elimination, a request from a centralized control server, a request triggered by change of use status, a setting change request issued according to temporal scheduling, or the like.

The path setting change message is sent along the route of node-1→node-4→node-5 (step 13), so that setting information of the path 2 is changed. The message for setting the information of the path 2 includes following information, and parameters of initial settings of the path 2 are changed by this information.

-Control Information Included in the Path Change Message-
Path ID: 2
Changed group ID: 2000
Changed path ID for which reuse is permitted: 30
Changed group ID for which reuse is permitted: 3000
Changed path ID for which reuse is inhibited: 40
Changed group ID for which reuse is inhibited: 4000
Changed reuse subject path ID: 50
Changed reuse subject group ID: 5000
Changed holding priority: 1

The resource information data 75 is updated according to change information in node-1→node-4→node-5 that is the route of the path 2. (A part of) reuse availability information in the node-4 becomes one shown in FIG. 33.

In addition, in the resource information data 75, path ID and group ID of reuse subject of the path 2 are changed as shown in FIG. 34.

In the present embodiment, the path for which settings are changed may be either a working path or a backup path.

By using the above-mentioned path state change, path operation methods such as the following fifth-seventh embodiments become possible.

Fifth Embodiment

Figure 35:
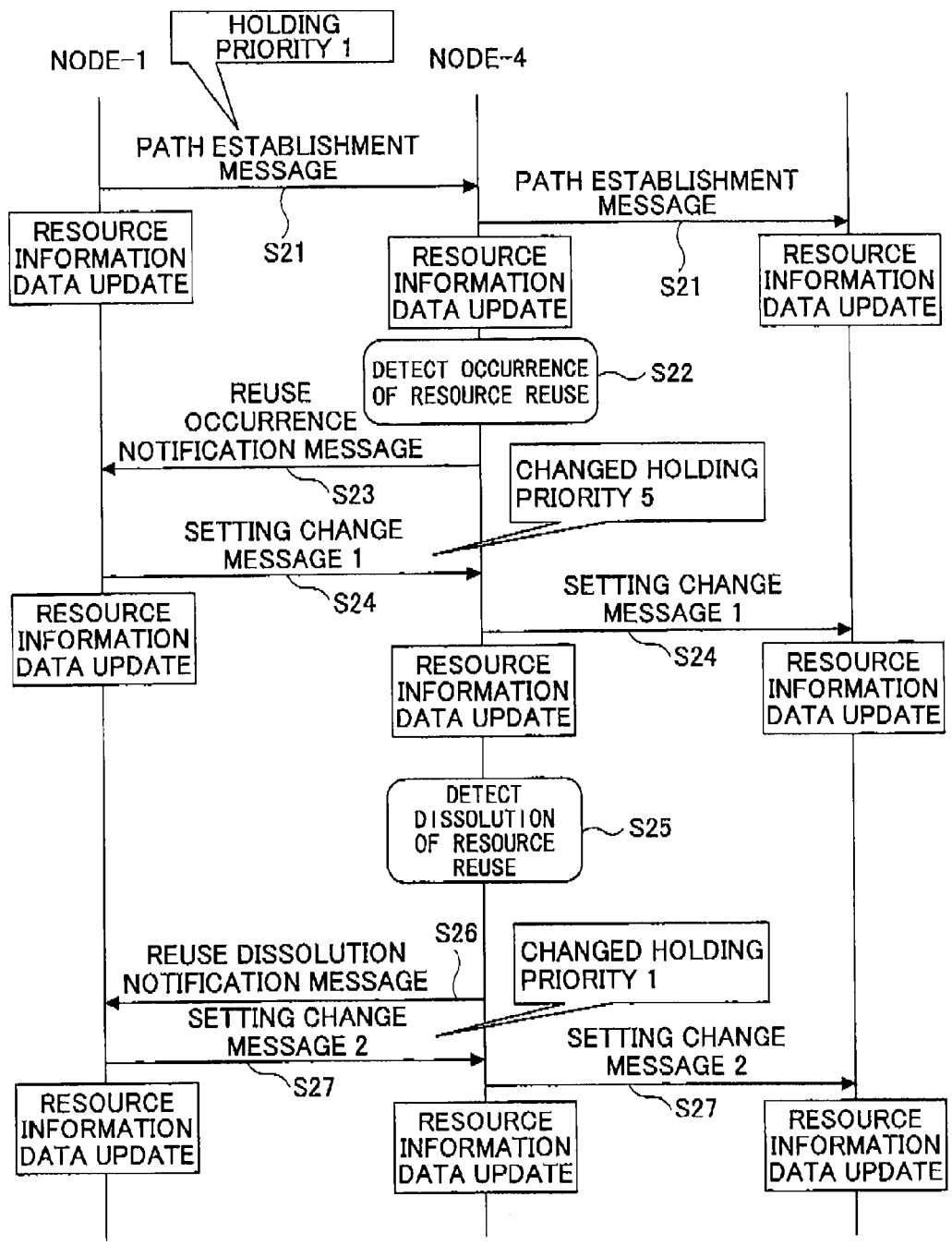
FIG. 35 is a diagram showing setting change sequence triggered by resource reuse.

Following operation is possible by using before-mentioned first-fourth embodiments. In the following an operation method is described in which holding priority is changed to be low (the value is changed large) for a path from which resources are reused, and when the resource reuse state is dissolved, the holding priority is restored to the original value. FIG. 35 shows outline of sequence of the control message. In this example, a case is described for changing holding priority of the path 2 set in node-1→node-4→node-5 in FIG. 12.

A path is generated in node-1→node-4→node-5 (step 21). As to the path, holding priority is set to 1. The resource information data 75 is updated in node-1→node-4→node-5. In the node-4, occurrence of resource reuse is detected (step 22), and it is reported to the node-1 by a control message (step 23). The node-1 receives the resource reuse occurrence notification. In response to receiving the resource reuse occurrence notification, the node-1 sends a path setting change message. The path setting change message includes changed holding priority value (5).

The control message is sent over node-1→node-4→node-5 (step 24), so that the set holding priority of the path is changed from 1 to 5. The resource information data 75 is updated in node-1→node-4→node-5. The node-4 detects dissolution of resource reuse (step 25), and it is reported to the node-1 using a control message (step 26). The node-1 receives the resource reuse occurrence dissolution notification. Triggered by receiving the resource reuse occurrence dissolution notification, the node-1 sends a path setting change message. The setting change message includes holding priority value (1) before resource reuse occurrence.

A control message is sent over node-1→node-4→node-5 (step 27), and the set holding priority of the path is changed from 5 to 1. The resource information data 75 is updated in node-1→node-4→node-5.

By lowering priority for a path that enters in a non-operation state due to occurrence of resource reuse, usable parts (normal other than the link where resource reuse occurred) can be positively utilized to other paths so that use efficiency for resources can be increased.

Also in the present embodiment, the path for which settings are changed may be either a working path or a backup path.

Sixth Embodiment

Figure 36:
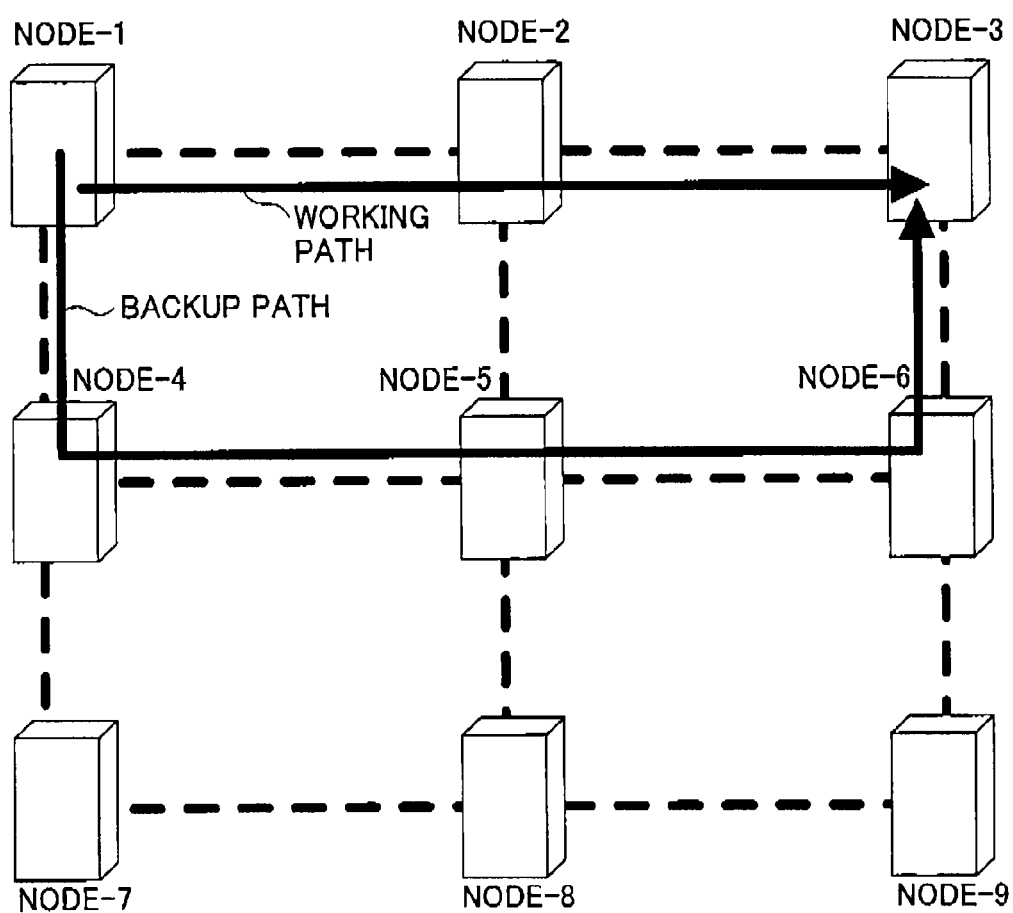
FIG. 36 is a diagram showing an example of a communication network including a working path and a backup path.
Figure 37:
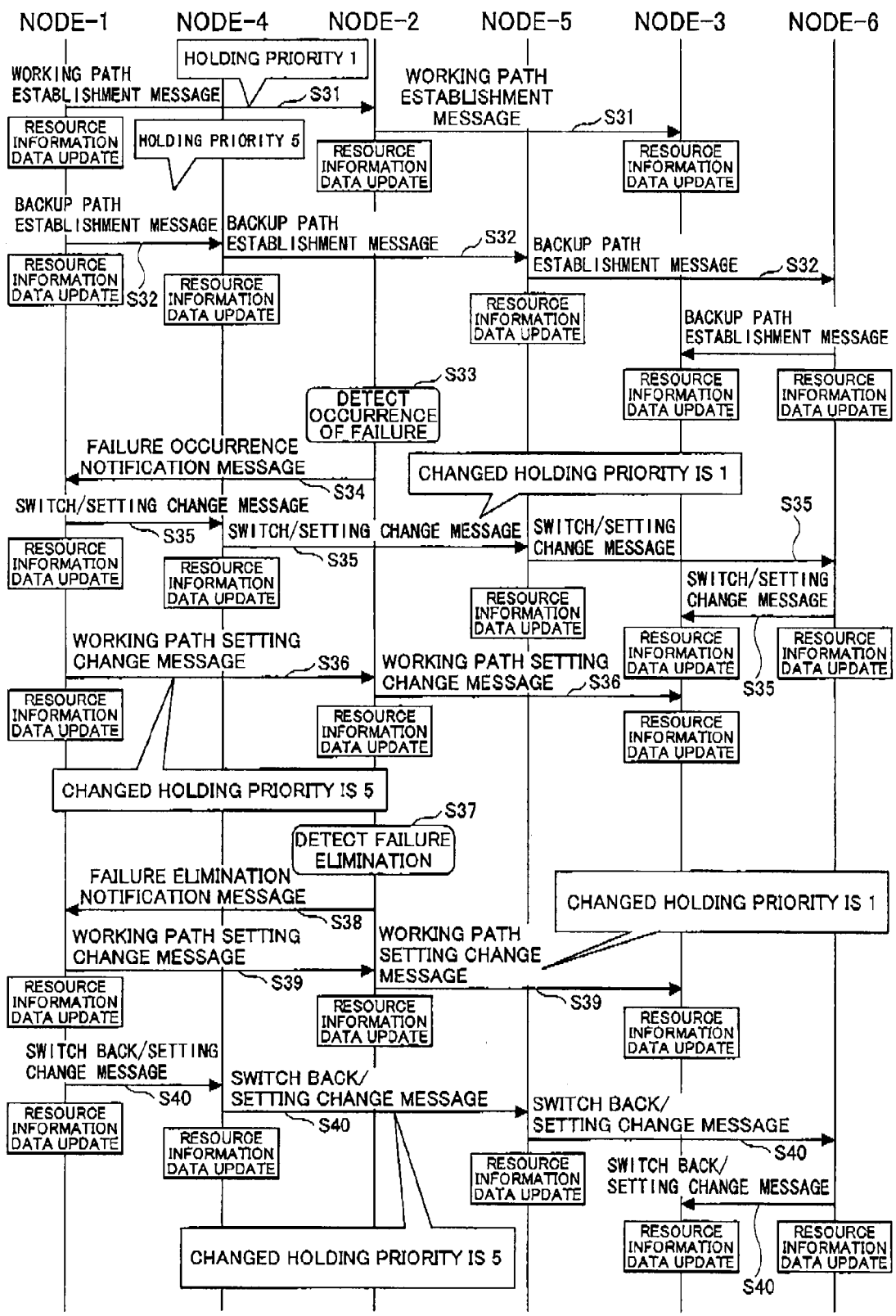
FIG. 37 is a diagram showing an example of sequence triggered by failure.

Following operation is possible by using the before-mentioned first-fourth embodiments. By using the present invention, it becomes possible to change priority information triggered by occurrence of failure. For example, in a failure restore scheme in which operation is performed using a working path in normal times and failure is dealt with by preparing a backup path of reservation state beforehand, an operation method is available in which, after failure of the working path occurs, when changing the state of the path from the reservation state to the operation state, priority value of the backup path is increased, and after failure of the working path is eliminated, when switching back to the working path is performed, priority value is lowered. FIG. 36 shows outline of a network that can perform this operation, and FIG. 37 shows sequence outline of control message.

Here, an example is described for changing holding priority representing priority order of paths that is also used in the RSVP-TE protocol and the like. As shown in FIG. 36, a communication network is taken as an example in which a working path (node-1→node-2→node-3) of holding priority 1 and a backup path (node-1→node-4→node-5→node-6→node-3) of holding priority 5 are established. Then, when failure switching is performed after occurrence of failure, holding priority of the working path is changed from 1 to 5, and holding priority of the backup path is changed from 5 to 1. After the failure is eliminated, holding priority of the working path is restored from 5 to 1, and holding priority of the backup path is restored from 1 to 5.

By the way, the smaller the value of holding priority is, the higher the priority is. In this embodiment, the priority value is changed along with failure switching in the following procedure as shown in FIG. 37.

A working path establishment message is sent over the route (node-1→node-2→node-3) of the working path (step 31), so that the working path is established. In the establishment, holding priority set for the working path is 1.

The resource information data is updated in the route (node-1→node-2→node-3) of the working path. A backup path establishment message is sent over the route (node-1→node-4→node-5→node-6→node-3) of the backup path (step 32), so that the backup path is established. In the establishment, holding priority set for the backup path is 5. The resource information data 75 is updated on the route (node-1→node-4→node-5→node-6→node-3) of the backup path.

Failure occurs at the node-2, and the node-2 on the route of the working path detects failure (step 33). The node-2 sends a failure notification message to node-1 that is an Ingress node of the working path (step 34). This failure notification message includes information on the failed path and information on the failed link.

The node-1 receives the failure notification, and sends a switching message for switching the working path to the backup path over the route (node-1→mode-4→node-5→node-6→node-3) of the backup path (step 35). At this time, the node-1 sends a setting change message at the same time for changing the holding priority of the backup path from 5 to 1.

Each communication node apparatus on the route (node-1→node-4→node-5→node-6→node-3) of the backup path receives the message, performs switching processing, and changes the set holding priority from 5 to 1 at the same time. Accordingly, the resource information data 75 is updated. After sending the switching message over the backup path, the node-1 sends a setting change message over the route (node-1→mode-2→node-3) of the working path for changing the holding priority of the working path from 1 to 5 (step 36).

Communication node apparatuses on the route (node-1→node-2→node-3) of the working path receives the message, changes holding priority from 1 to 5, so that the resource information data 75 is updated.

When the failure occurred in the node-2 on the route of the working path is eliminated, the node-2 detects failure elimination (step 37), and sends a failure elimination notification message to the node-1 that is an Ingress node of the working path (step 38). This failure elimination message includes information on the failed path and information on the failed link. The node-1 that received the failure elimination notification message sends a setting change message over the route (node-1→node-2→node-3) of the working path triggered by the failure elimination notification message for changing the holding priority from 5 to 1 (step 39).

Each communication node apparatus on the route (node-1→node-2→node-3) of the working path receives the message, changes the holding priority from 5 to 1. According to the change, the resource information data 75 is updated.

At the same time when sending the setting change message of the working path, the node-1 sends a switch back message for switching the backup path back to the working path, and a setting change message for changing holding priority from 1 to 5 over the route of the backup path (node-1→node-4→node-5→node-6→node-3) (step 40).

Each communication node apparatus on the route (node-1→node-4→node-5→node-6→node-3) of the backup path receives the message, performs the switch back processing, changes the holding priority from 1 to 5, and updates the resource information data 75.

In the present embodiment, operation similar to above-mentioned operation can be also performed between a backup path in operation and a working path not in operation.

Seventh Embodiment

By using the before-mentioned first-fourth embodiments, following operation is possible. In the present embodiment, a procedure is described for performing setting change for a path that is reusing resources, and changing resources of reuse subject. The resources of reuse subject are retrieved from resources for which reuse is not inhibited, and are assigned.

Figure 38:
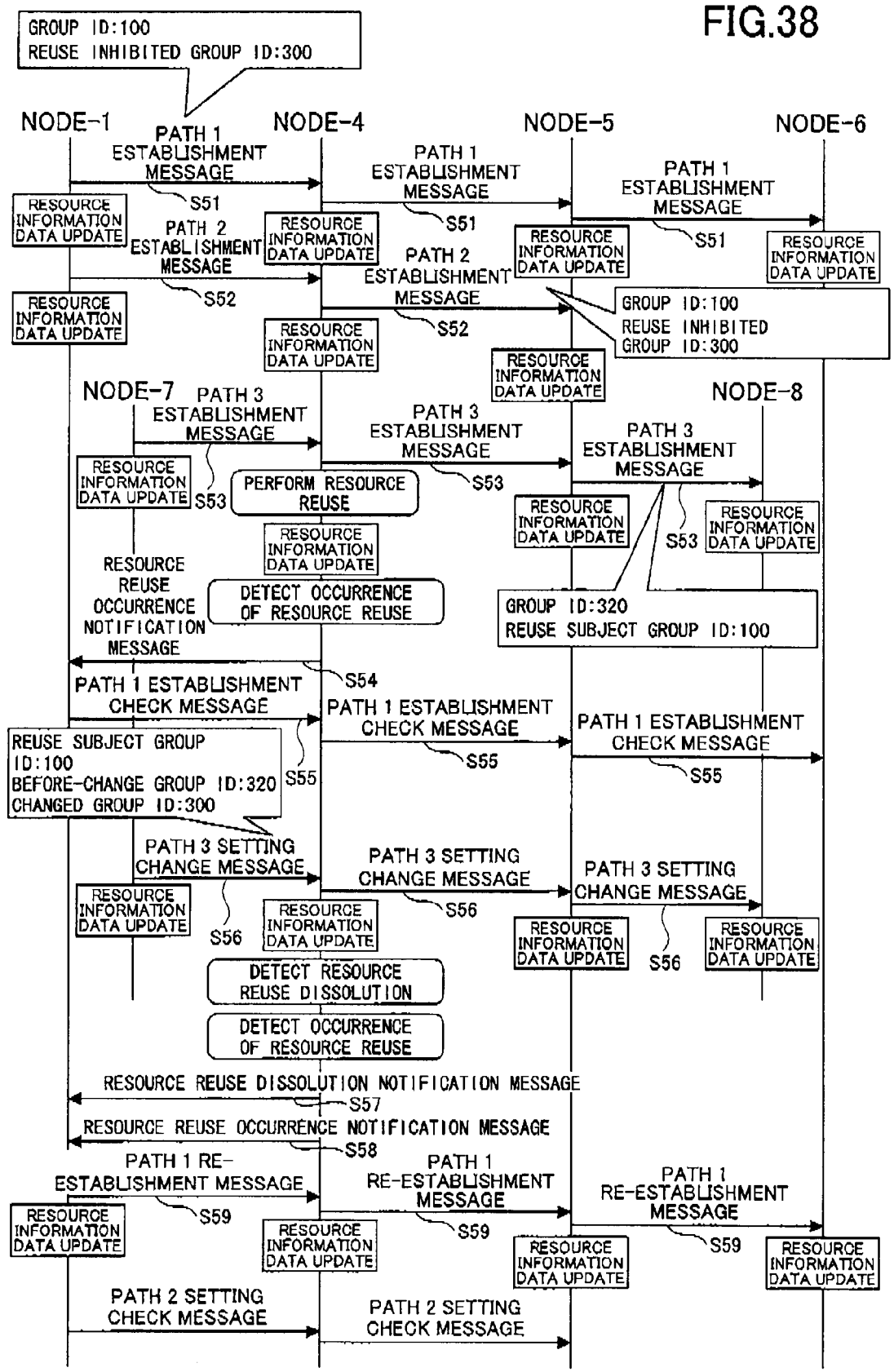
FIG. 38 is a diagram showing a sequence of path establishment processing accompanied by resource reuse or dissolution triggered by setting change.

FIG. 38 shows control message sequence outline in a case where a path 1 (node-1→node-4→node-5→node-6), a path 2 (node-1→node-4→node-5), and a path 3 (node-7→node-4→node-5→node-8) are established as shown in FIG. 12 in the communication network shown in FIG. 11, and operation for resource reuse is performed using the configuration of the present embodiment.

In this embodiment, before establishing the path 3, the path 1 and the path 2 are established, and then, the path 3 is established by reusing resources of the path 1 for use of establishment of the path 3. As shown in FIG. 14, resources (wavelengths) of two wavelengths that are a wavelength 1 and a wavelength 2 are prepared between the node-4 and the node-5 where reuse of resources occurs.

A control message is transmitted for establishing the path 1 along the route of node-1→node-4→node-5→node-6 (step 51). The control message of the path 1 includes following control information.

-Contents of Path 1 Establishment Control Message-
  Path ID: 1
  Group ID: 100
  ID of path for which reuse is permitted: not designated
  ID of group for which reuse is prohibited: 300
  ID of reuse subject path: not designated
  ID of reuse subject group: not designated Resources are assigned in node-1→node-4→node-5→node-6 and the resource information data 75 is updated. In this process, wavelength resources between the node-4 and the node-5 are retrieved from among available wavelengths by the resource management function unit 71 in the communication node apparatus. As a result, a wavelength 1 is assigned. FIG. 39 shows (a part of) reuse availability information in node-4.

A control message for establishing the path 2 along the route of node-1→node-4→node-5 is transmitted (step 52) so that the path 2 is established. The control message of the path 2 includes the following control information.

-Contents of Path 2 Establishment Control Message-
  Path ID: 2
  Group ID: 100
  ID of path for which reuse is permitted: not designated
  ID of group for which reuse is prohibited: 320
  ID of reuse subject path: not designated
  ID of reuse subject group: not designated Resources are assigned in node-1→node-4→node-5 and the resource information data 75 is updated. In this process, wavelength resources between the node-4 and the node-5 are retrieved from among available wavelengths by the resource management function unit 71 in the communication node apparatus. As a result, a wavelength 2 is assigned. FIG. 40 shows (a part of) reuse availability information in node-4.

Based on command input from the CLI 77 and a control message from other communication node apparatus, a setting condition of the path 3 is set such that resources of the path 1 are reused.

A control message for establishing the path 3 over the route of node-7→node-4→node-5→node-8 is transmitted (step 53) so that the path 3 is established. The control message of the path 3 includes the following control information.

-Contents of Path 3 Establishment Control Message-
  Path ID: 3
  Group ID: 320

ID of path for which reuse is permitted: not designated
ID of group for which reuse is permitted: not designated
ID of reuse subject path: not designated
ID of reuse subject group: 100

In the communication node apparatus that received the establishment control message of the path 3, the resource management function unit 71 refers to the resource information data 75 to retrieve a wavelength assigned to the path designated by the path ID of the reuse subject. In the node-4, as a result of retrieve process, resources assigned to the group ID 100 are found in wavelengths existing in the downstream side link (link ID 45) of the node-4, that is, the wavelength 1 and the wavelength 2 are found. Then, reuse availability information in the resource information data 75 is referred to and it is checked whether group ID 320 that is a group ID of the path 3 is included in group IDs for which reuse of wavelength 2 is inhibited.

Since the group ID 320 is included in the group IDs for which reuse of wavelength 2 is inhibited, the wavelength 2 is excluded from assignment candidate, so that the wavelength 1 is selected, and the wavelength 1 is reused as the resource of the path 3 and the wavelength 1 is assigned to the path 3. Also in the node-5, as a result of similar retrieve processing, the wavelength 1 is found in wavelengths existing in the upstream side link (link ID 45) of the node-5, and the wavelength 1 is reused as resources for the path 3 and assigned to the path 3.

After the resources are assigned, resource information data 75 is updated in each communication node apparatus of node-7→node-4→node-5→node-8. The reuse availability information (a part of it) of the node-4 becomes as shown in FIG. 41. In the node-4, even after the wavelength 1 that was a resource for the path 1 is reused as a resource for the path 3, information indicating that the resource that was originally used by the path 1 is reused is recorded in resource information data 75 by the resource management function unit 71.

The node-4 in which resource reuse for the path occurred sends information, as a control message, such as path, link ID and wavelength ID and the like for which reuse occurred to the node 1 that is an Ingress node (start point node) of the path 1 that was reused (step 54). The resource reuse occurrence notification message includes following control information.
-Contents of Resource Reuse Occurrence Notification Message-
Communication node apparatus in which reuse occurred: node-4
ID of link in which reuse occurred: link 45
ID of path in which reuse occurred: 1
Reused resource: wavelength 1
ID of path to which resource was passed: path 3
ID of group to which resource was passed: group 320.

The node-1 that received the resource reuse occurrence notification stores contents included in the resource reuse occurrence notification message by the resource management function unit 71. In the process of storing, the path ID of the path 1 is associated with combination of node ID, link ID and wavelength ID for which reuse occurred, and the contents are stored such that the ID of the path 1 for which reuse occurred can be retrieved using the combination of the node ID, link ID and wavelength ID for which reuse occurred or using any of these as a key. In addition, by receiving the notification, the path 1 is set to be in a non-operation state, and transmission of data is stopped.

On the route of the path 1 that gave the resource to another path by resource reuse, an establishment check message (refresh message) is exchanged for checking setting information before occurrence of reuse (step 55). In addition, by the message, communication node apparatuses of the path 1 store and maintain path setting information such as the path ID of the path 1, and path or group ID for which reuse is permitted or inhibited.

Based on command input from the CLI 77 by the operator, or based on a control message from another communication node apparatus, an establishment condition for the path 3 is set such that belonging group ID is changed to 300.

A control message for changing the setting of the path 3 is transmitted over the route of node-7→node-4→node-5→node-8 (step 56) so that the setting of the path 3 is changed. In this example, the group ID to which the path 3 belongs is changed from 320 to 300. The setting change message includes following information.
Path ID: 3
Group ID of reuse subject: 100
Before changed group ID: 320
Changed group ID: 300

The resource information data 75 is updated in each communication node apparatus of the route (node-7→node-4→node-5→node-8) of path 3. Accompanying the change of the reuse subject, since reuse is inhibited for the path of the group ID 300 according to setting information of path 1 (determined from reused path ID) from which the wavelength 1 was reused so far, the resource assigned to the path 3 is released, and separate resource is newly searched.

The wavelength 2 assigned to the path 2 belongs to the group ID 100 which is the reuse subject for the path 3, and resource reuse of the wavelength 2 is not inhibited for the group ID 300 that is the changed group ID of the path 3. Thus, the resource of the wavelength 2 assigned to the path 2 is reused for assignment to the path 3. (A part of) reuse availability information in the node-4 becomes one shown in FIG. 42. In the node-4, even after the wavelength 2 that was a resource for the path 2 is reused as a resource for the path 3, information indicating that the resource that was originally used by the path 2 is reused is recorded in resource information data 75 by the resource management function unit 71.

In node-4, the resource management function unit 71 detects that the wavelength 1 is released, then, the node-4 sends a control message to the node-1 that is a start point node of the path 1 that was assigned before being reused, notifying the node-1 of dissolution of resource reuse state (step 57). The resource reuse dissolution notification message includes the following control information.
-Contents of Resource Reuse Dissolution Notification Message-
Communication node apparatus where reuse dissolution occurred: node-4
ID of link in which reuse was dissolved: link 45
ID of path in which reuse was dissolved: path 1
Reuse dissolved resource: wavelength 1
ID of path that used resource before dissolution occurrence: path 3
ID of group that used resource before dissolution occurrence: Group 320

The node-4 in which resource reuse for the path newly occurred due to setting change sends information, as a control message, such as path, link ID and wavelength ID and the like for which reuse occurred to the node 1 that is an Ingress node (start point node) of the path 1 that was reused (step 58). The resource reuse occurrence notification message includes following control information.
Contents of Resource Reuse Occurrence Notification Message
Communication node apparatus in which reuse occurred: node-4
ID of link in which reuse occurred: link 45

ID of path in which reuse occurred: path 2
Reused resource: wavelength 2
ID of path to which resource was passed: path 3
ID of group to which resource was passed: group 300.

The node-1 that received the resource reuse dissolution message sends a re-establishment message over the route of node-1→node-4→node-5→node-6 of the path 1 based on contents of the received message for re-establishing the path 1 that is in a non-operation state due to resource reuse (step 59), so as to start re-establishment processing for changing the state of the path 1 into an operation state.

The wavelength 1 is assigned to the path 1 in the section between the node-4 and the node-5 in order to set the path 1 into an operation state again. Then, resource information data 75 is updated in node-1→node-4→node-5→node-6 on the route of the path 1. Reuse availability information (a part) in the node-4 at this time is shown in FIG. 43.

The path in the present embodiment may be either a working path or a backup path.

Eighth Embodiment

Figure 44:
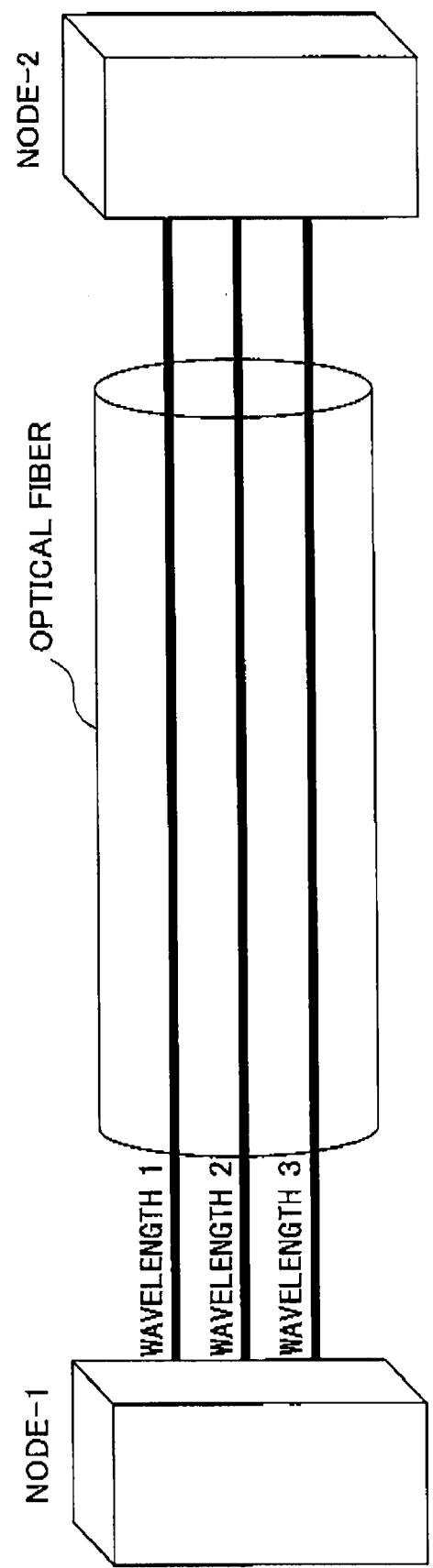
FIG. 44 is a diagram showing a link configuration example.

In the eighth embodiment, a method is described for advertising use resources in each communication node, and IDs of paths and groups that are using the resources over the communication network. For example, the advertisement can be realized by extending functions of OSPF-TE that is an existing routing protocol. The OSPF-TE is provided with means for advertising resource information of each link over the whole of the Communication network. This embodiment is realized by adding path ID and group ID to the resource information. FIG. 44 is a schematic diagram when performing the present method. In this embodiment, a communication network for operating wavelength paths is given, and it is assumed that there are resources of three wavelengths that are wavelength 1, wavelength 2 and wavelength 3 each having a bandwidth of 10 Gbps between the node-1 and the node-2, and that the wavelength 1 is assigned to the path 1 and the wavelength 3 is assigned to the path 2. IDs are provided as follows for identifying node-1, node-2, wavelength 1, wavelength 2 and wavelength 3 respectively.

The node-1 is assigned 192.168.1.1 as a node ID, and the node-2 is assigned 192.168.1.2 as a node ID. The wavelength 1 is assigned 10.10.10.10 as a link ID, and the wavelength 2 is assigned 20.20.20.20 as a link ID, and the wavelength 3 is assigned 30.30.30.30 as a link ID. The path 1 is assigned 1 as a path ID, and assigned 100 as a group ID. The path 2 is assigned 2 as a path ID, and assigned 200 as a group ID.

As to IDs to be assigned for wavelengths, it is possible to set IDs separately for each of the node-1 and the node-2. But, in the present embodiment, a same value is used for the node-1 and the node-2.

In the case of this example, the node-1 and the node-2 include information shown in FIGS. 45 and 46 respectively into a control message to form a message that can identify relationship between use bands and paths using the bands, and advertise the message to other nodes. FIG. 45 shows information advertised by the node-1, and FIG. 46 shows information advertised by the node-2.

As means for advertising over the communication network, means provided in OSPF-TE is used.

Ninth Embodiment

Figure 47:
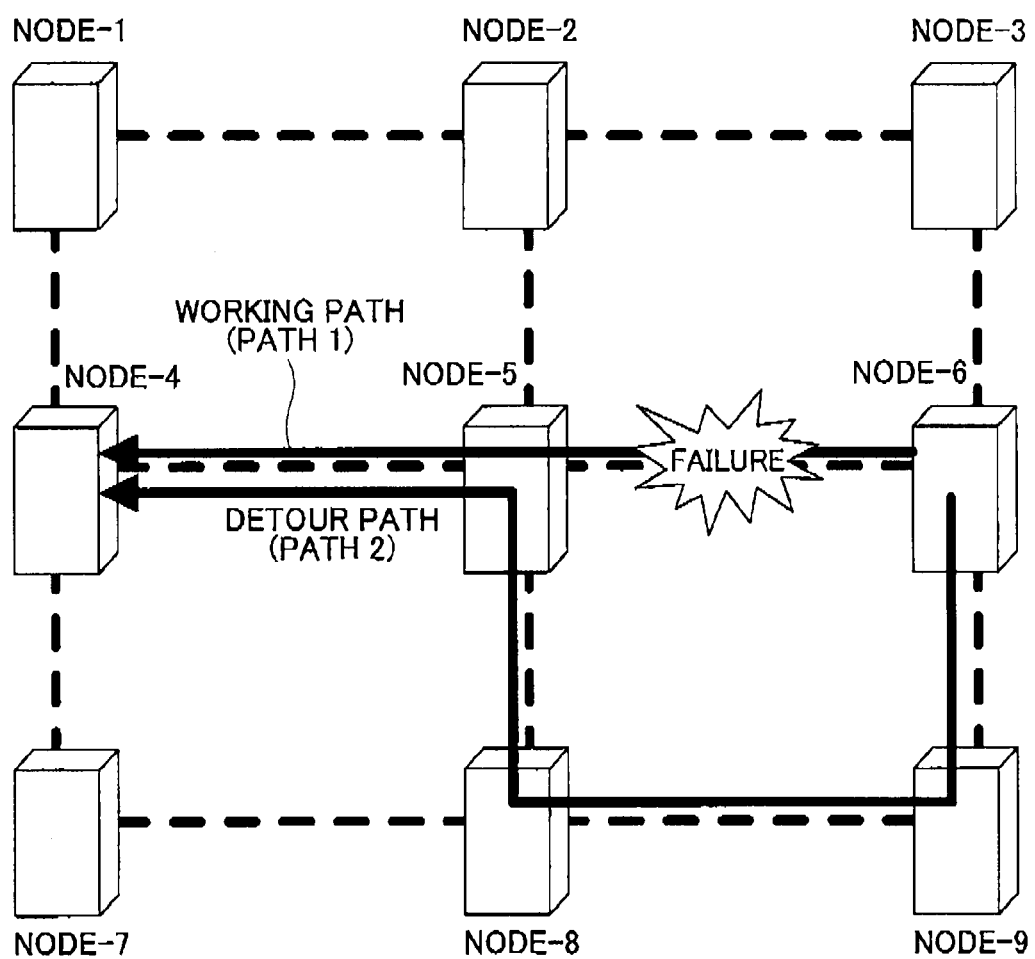
FIG. 47 is a diagram showing detour path setting example.
Figure 48:
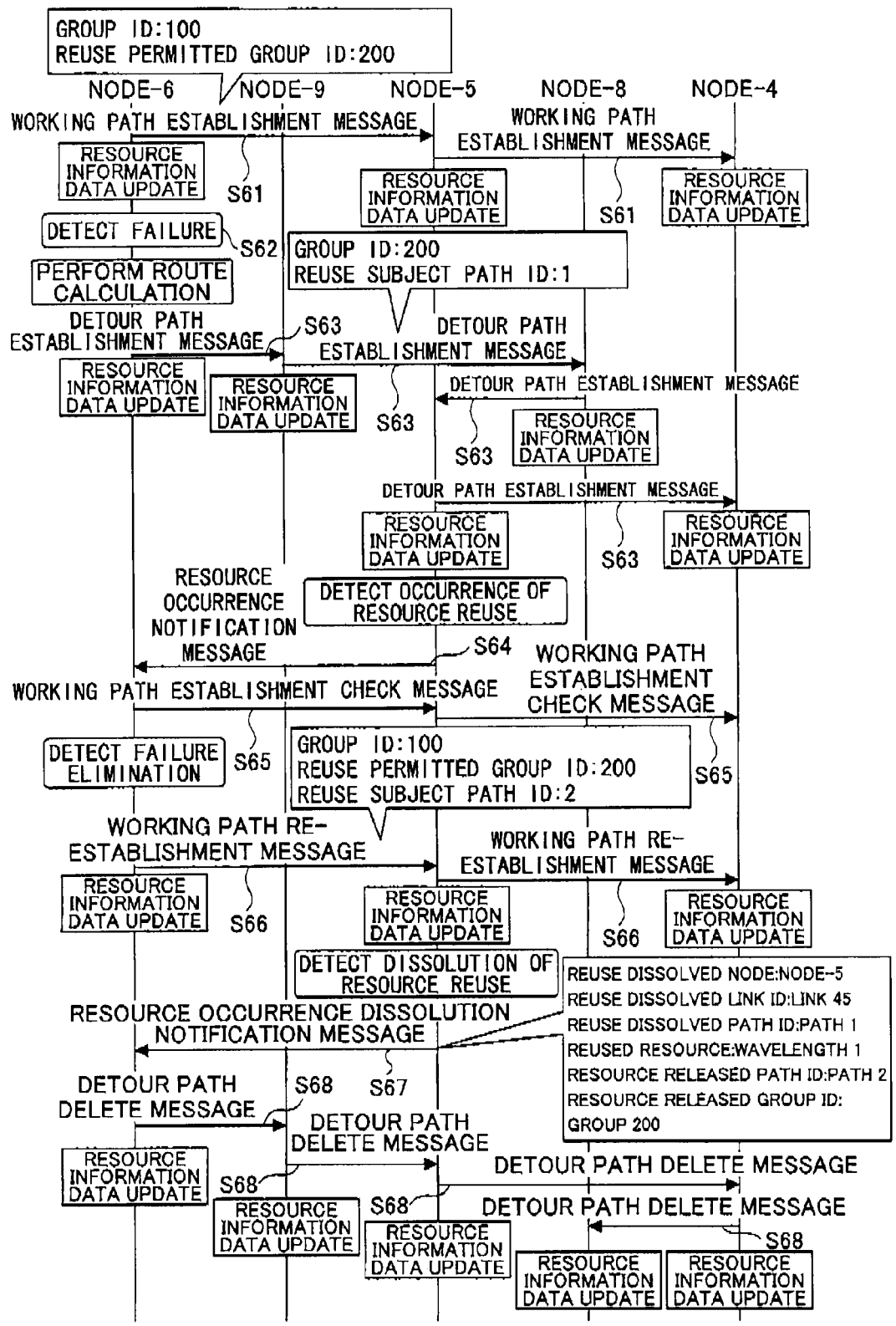
FIG. 48 is a diagram showing a sequence of failure recovery processing example accompanied by resource reuse.

In the ninth embodiment, it is described that following operation is possible by using the eighth embodiment. In the present embodiment, when a working path or a backup path is failed, detour route calculation is performed considering resource reuse so that failure is recovered. FIG. 47 shows a detour path setting example. FIG. 48 shows control message sequence outline in a case in which path 1 (node-6→node-5→node-4) is established as shown in FIG. 47 in a communication network shown in FIG. 11, and failure switching processing is performed by reusing resources using configurations of embodiments of the present invention.

An establishment message for path 1 that is a working path is sent over the route of node-6→node-5→node-4 (step 61), so that the path 1 is established. The establishment message for the path 1 includes following information.
Contents of Path 1 Establishment Control Message-
  Path ID:1
  Group ID: 100
  ID of path for which reuse is permitted: not designated
  ID of group for which reuse is permitted: 200

The contents of the establishment message are stored in the node-6 that is a start point node of the path 1. The resource information data 75 on the route of the path 1 (node-6→node-5→node-4) is updated. In the process, the wavelength 1 is selected from among available resources in the link between the node-5 and the node-4, so that resource information data of the node-5 becomes one as shown in FIG. 49.

Failure is detected by the node-6 (step 62). The node-6 that detected the failure identifies path ID (path 1) where the failure occurs. Since the path 1 is established such that the node-6 is the start point node, setting information of the path 1 has been stored in the node-6. By referring to the information, the node-6 determines that group ID that can reuse the path 1 is 200.

Figure 50:
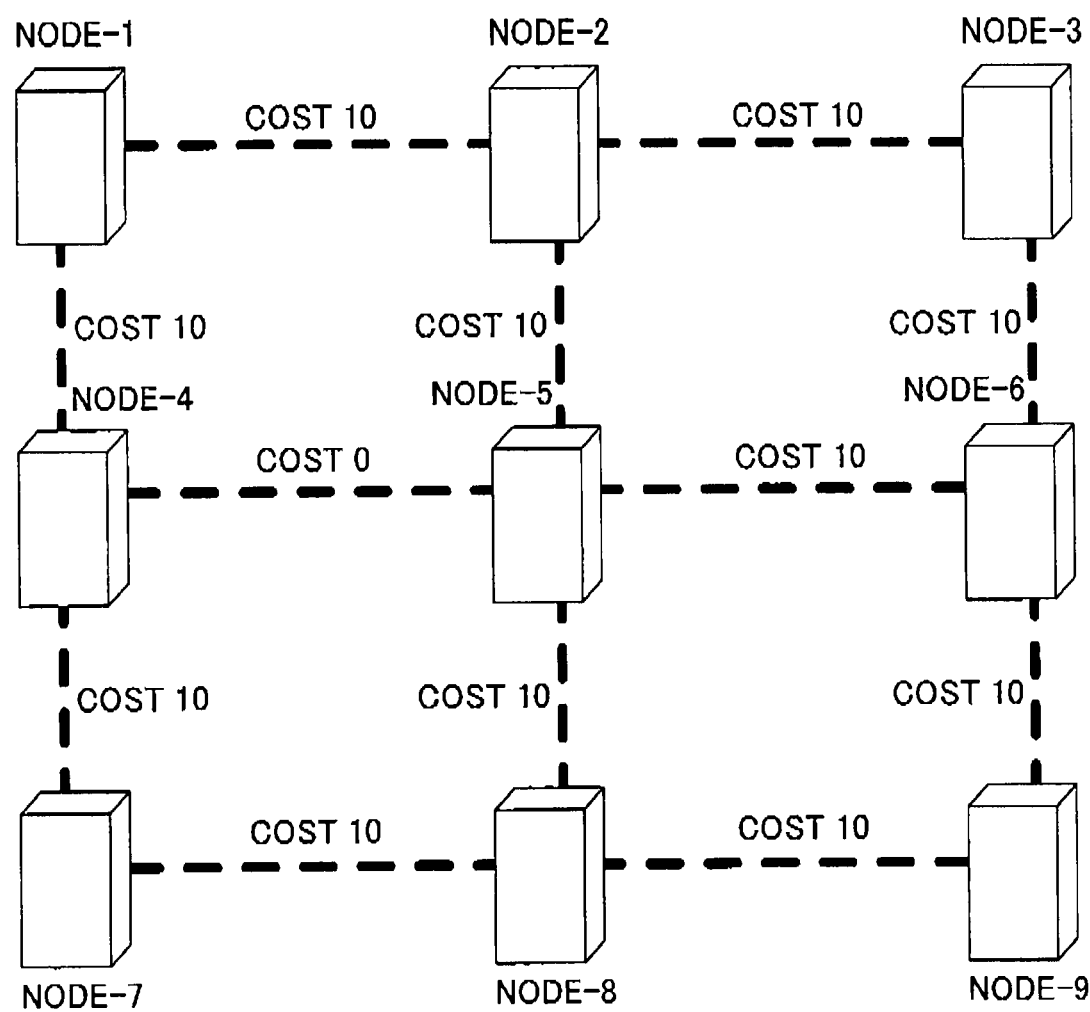
FIG. 50 is a diagram showing route calculation topology.

Triggered by detecting the failure, the node-6 calculates a route of a detour path. In the processing, the route calculation function unit included in the CSPF module 73 refers to the resource information data 75 collected by using a routing protocol, and identifies that a path of the path ID 200 can reuse resources of wavelength 1 of the link between the node-4 and the node-5 for its use, so that the route calculation function unit calculates the route of the path by setting the cost between the node-4 and the node-5 to be 0. Assuming that cost of all other links is 10, route calculation is performed based on the topology shown in FIG. 50.

In this topology, node-6→node-9→node-8→node-5→node4 is determined to be the route of the detour path from among minimum cost routes from the node-6 to the node-4. Accordingly, route calculation in which necessary resource reducing effect is used as a parameter can be performed.

Next, a detour path establishment message is sent over the determined route (node-6→node-9→node-8→node-5→node4) of the detour path (step 63). The path ID 200 that can reuse resources of the path 1 is set to be a group ID of the detour path. In addition, path 1 is assigned as a reuse subject path ID. The detour path establishment message includes the following information.
-Contents of Detour Path Establishment Control Message-
  Path ID: 2
  Group ID: 200
  Reuse subject path ID: 1
  Route of detour path As route information of the detour path, Explicit Route Object of RSVP-TE and the like can be used. The resource information data 75 is updated on the route (node-6→node-9→node-8→node-5→node4) of the detour path. In the link between the node-5 and the node-4, two conditions are satisfied in which one condition is that belonging group of the path 2 is a reuse permitted group designated by the path 1, and another condition is that reuse subject specified by the path 2 is the path 1. Thus, resources assigned to the path 1 is reused for assignment to the path 2 on the detour route. In addition, ID of the path 1 that originally used the resources is added as reuse available path ID. Also in the node-4, resource assignment is performed similarly. The resource information data 75 in the node-5 becomes as shown in FIG. 51.

A resource reuse occurrence notification message is sent from the node-5 to the node-6 (step 64). Contents of the resource reuse occurrence notification message is as follows.
-Contents of Resource Reuse Occurrence Notification Message-
　Communication node apparatus in which reuse occurred: node-5
　ID of link in which reuse occurred: link 45
　ID of path in which reuse occurred: path 1
　Reused resource: wavelength 1
　ID of path to which resource was passed: path 2
　ID of group to which resource was passed: group 200

An establishment check message is sent over the route (node-6→node-5→node-4) of the working path, so that information of the state before reuse or failure occurrence is stored (step 65). When failure elimination is detected by the node-6, the node-6 that detected the failure elimination sends a working path reestablishment message over the route of the path 1 that is a working path (step 66). The working path reestablishment message includes following information.
-Contents of Working Path Reestablishment Message-
　Path ID: 1
　Group ID: 100
　ID of path for which reuse is permitted: not designated
　ID of group for which reuse is permitted: 200
　ID of reuse subject path: 2

Each node that received the working path reestablishment message on the working path (node-6→node-5→node-4) updates the resource information data 75. In the node-5, two conditions are satisfied in which one condition is that path ID of the path 1 is the reuse permitted path ID designated by the path 2, and another condition is that reuse subject specified by the path 1 is the path 2. Thus, the wavelength 1 is assigned to the path 1, so that the reuse state is dissolved. In node-5, the resource information data 75 is updated as shown in FIG. 52.

A resource reuse dissolution notification message is sent from the node-5 to the node-6 (step 67). The message includes the following information.
-Contents of Resource Reuse Elimination Notification Message-
　Communication node apparatus in which reuse was dissolved: node-5
　ID of link in which reuse was dissolved: link 45
　ID of path for which reuse was dissolved: path 1
　Reused resource: wavelength 1
　ID of path which released resource: path 2
　ID of group which released resource: group 200

The node-6 that received the resource reuse dissolution message determines that the resource of the path 2 that is a detour path is passed to the path 1, and sends a detour path delete message over the detour path route (node-6→node-9→node-8→node-5→node4) (step 68).

In addition, in the present embodiment, similar operation is available even when the failed path is a backup path.

Tenth Embodiment

Figure 53:
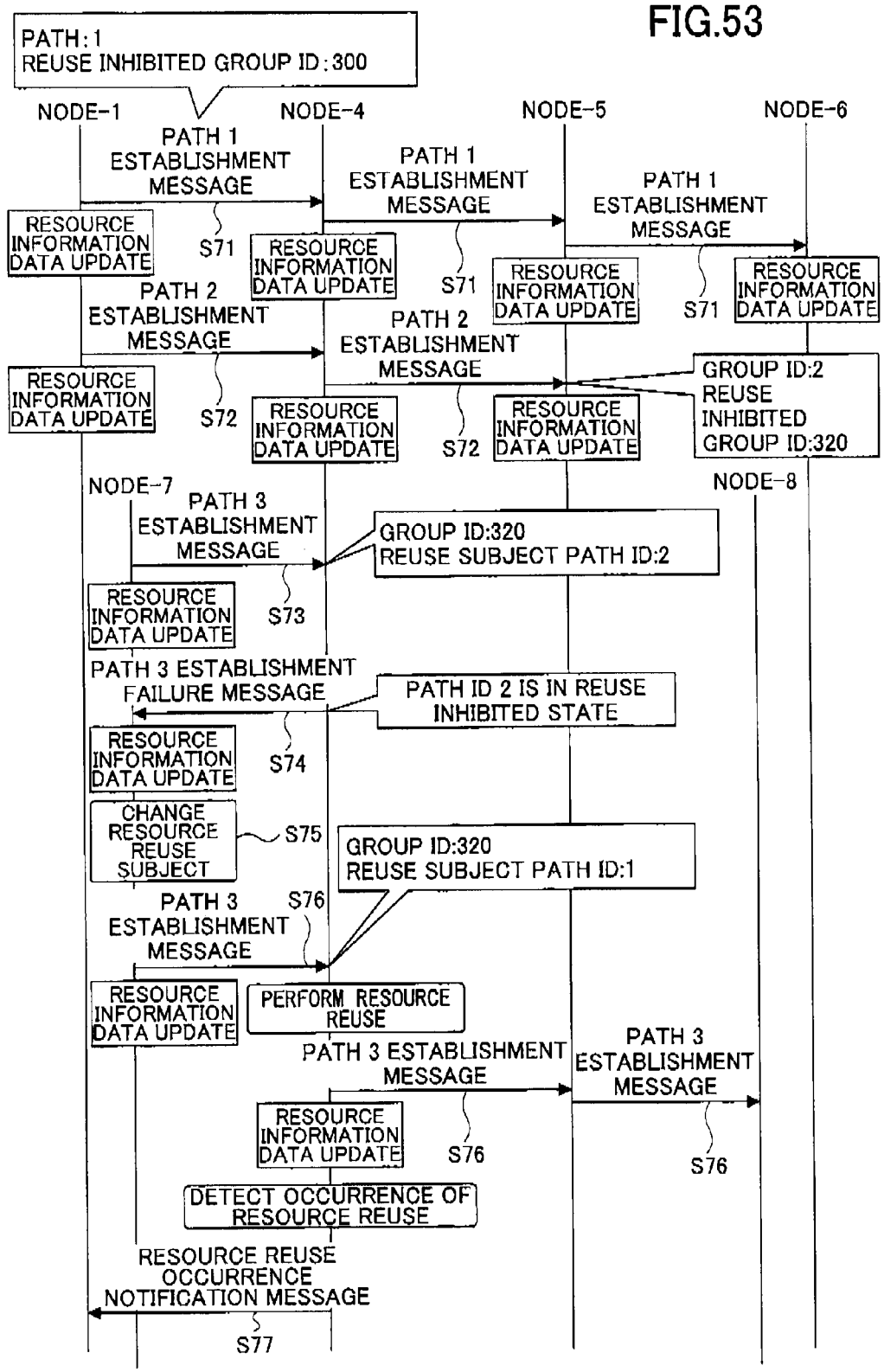
FIG. 53 is a diagram showing a sequence of resource reuse subject change example.

In the tenth embodiment, it becomes possible to change resource reuse availability information triggered by path establishment failure by using the present invention. Outline of the network in which this process can be performed is shown in FIGS. 11 and 12, and sequence outline of the control message is shown in FIG. 53. FIG. 53 shows the control message sequence outline in a case for establishing the path 1 (node-1→node-4→node-5→node-6), the path 2 (node-1→node-4→node-5) and the path 3 (node-7→node-4→node-5→node-8) as shown in FIG. 12 in the communication network shown in FIG. 11, and performing operation in which resource reuse is performed by using the configuration of the embodiment of the present invention.

In this example, before establishing the path 3, paths 1 and 2 are established, and the path 3 is established by reusing the resources of the path 1. Resources (wavelengths) of two wavelengths that are wavelength 1 and wavelength 2 are prepared between the node-4 and the node-5 as shown in FIG. 14.

A control message for establishing the path 1 over the route of node-1→node-4→node-5→node-6 is sent (step 71). In the present embodiment, the control message for the path 1 includes following control information.
-Contents of Path 1 Establishment Control Message-
　Path ID: 1
　Group ID: 100
　ID of path for which reuse is permitted: not designated
　ID of group for which reuse is inhibited: 300
　ID of reuse subject path: not designated
　ID of reuse subject group: not designated Resources are assigned in node-1→node-4→node-5→node-6, and the resource information data 75 is updated. In this process, wavelength resources between the node-4 and the node-5 are retrieved from available wavelengths by the resource management function unit 71 of the communication node apparatus. As a result, wavelength 1 is assigned. (A part of) reuse availability information in the node-4 becomes one shown in FIG. 54.

A control message for establishing the path 2 through the route of node-1→node-4→node-5 is sent (step 72), so that the path 2 is established. The control message for the path 2 includes the following control information,
-Contents of Path 2 Establishment Control Message-
　Path ID: 2
　Group ID: 100
　ID of path for which reuse is permitted: not designated
　ID of group for which reuse is inhibited: 320
　ID of reuse subject path: not designated
　ID of reuse subject group: not designated Resources are assigned to node-1→node-4→node-5, so that the resource information data 75 is updated. In this process, wavelength resources between the node-4 and the node-5 are retrieved and determined from available wavelengths by the resource management function unit 71 of the communication node apparatus, so that the wavelength 2 is assigned. (A part of) reuse availability information in the node-4 becomes as shown in FIG. 55.

Next, by command input from the CLS 77 by an operator, or by a control message from other communication node apparatus, setting condition of the path 3 is set such that the path 3 reuses resources of the path 2 for its own use. Then, a control message for establishing the path 3 over the route of node-7→node-4→node-5→node-8 is sent (step 73). The path 3 establishment control message includes the following control information.
-Contents of Path 3 Establishment Control Message-
　Path ID: 3
　Group ID: 320
　ID of path for which reuse is permitted: not designated
　ID of group for which reuse is inhibited: not designated ID of reuse subject path: 2
ID of reuse subject group: not designated In the communication node apparatus that received the path 3 establishment control message, the resource management function unit 71 refers to the resource information data 75 so as to retrieve wavelength that is assigned to the path designated by the reuse subject path ID. In the node-4, as a result of search processing, a resource assigned to path ID 100 is found in wavelengths existing in the downstream side link (link 45) of the node-4, that is, wavelength 2 is found.

Then, reuse availability information in the resource information data 75 is referred to, and it is checked whether group ID 320 which is the group ID of the path 3 is included in path IDs for which reuse of wavelength 2 is inhibited. Since ID 320 is included in the group ID for which reuse of wavelength 2 is inhibited, the wavelength 2 is excluded from assignment candidate. Since there is no other available wavelength, resource assignment for the path 3 fails.

The node-4 notifies the Ingress node of the path 3 that establishment of the path 3 fails by a path establishment failure notification message (step 74). The path establishment failure notification message describes that resources for the path ID 2 is not permitted to use. The resource reuse subject is changed to path 1 in the path 3 that received the path establishment failure notification (step 75).

A control message for establishing the path 3 through the route node-7→node-4→node-5→node-8 is sent again (step 76), so that the path 3 is established. The path 3 establishment control message includes the following control information.
-Contents of Path 3 Establishment Control message-
  Path ID: 3
  Group ID: 320
  ID of path for which reuse is permitted: not designated
  ID of group for which reuse is inhibited: not designated
  ID of reuse subject path: 1
  ID of reuse subject group: not designated In the node-4, the wavelength 1 that is assigned to the reuse subject path ID 1 is selected, and is assigned to the path 3. Also in the node-5, as a result of similar search processing, the wavelength 1 is also found in the upstream side link (link ID 45) of the node-5, and the wavelength 1 is reused as a resource for the path 3 and is assigned to the path 3. After the resource is assigned, the resource information data 75 is updated in each communication node apparatus of node-7→node-4→node-5→node-8.

In the node-4, even after the wavelength 1 that was a resource for the path 1 is reused as a resource for the path 3, information indicating that the resource that was originally used by the path 1 is reused is recorded in resource information data 75 by the resource management function unit 71.

The node-4 sends a control message to the node-1 that is the Ingress node (start point node) of the reused path 1 notifying the node-1 of information such as path, link ID and wavelength ID for which reuse occurred (step 77). The reuse occurrence notification message includes the following control information.
-Contents of Resource Reuse Occurrence Notification Message-
  Communication node apparatus in which reuse occurred: node-4
  ID of link in which reuse occurred: link 45
  ID of path in which reuse occurred: path 1
  Reused resource: wavelength 1
  ID of path to which resource was passed: path 3
  ID of group to which resource was passed: group 320

The path in the present embodiment may be either a working path or a backup path. In addition, in the present embodiment, the reason of path establishment failure can be a failure of the network. In addition, in the present embodiment, the path establishment route after the change of resource reuse subject can be different from the route through which the path is established initially.

In addition, the present embodiment can be carried out even when resource reuse subject is not designated in initial path establishment.

Eleventh Embodiment

Figure 57:
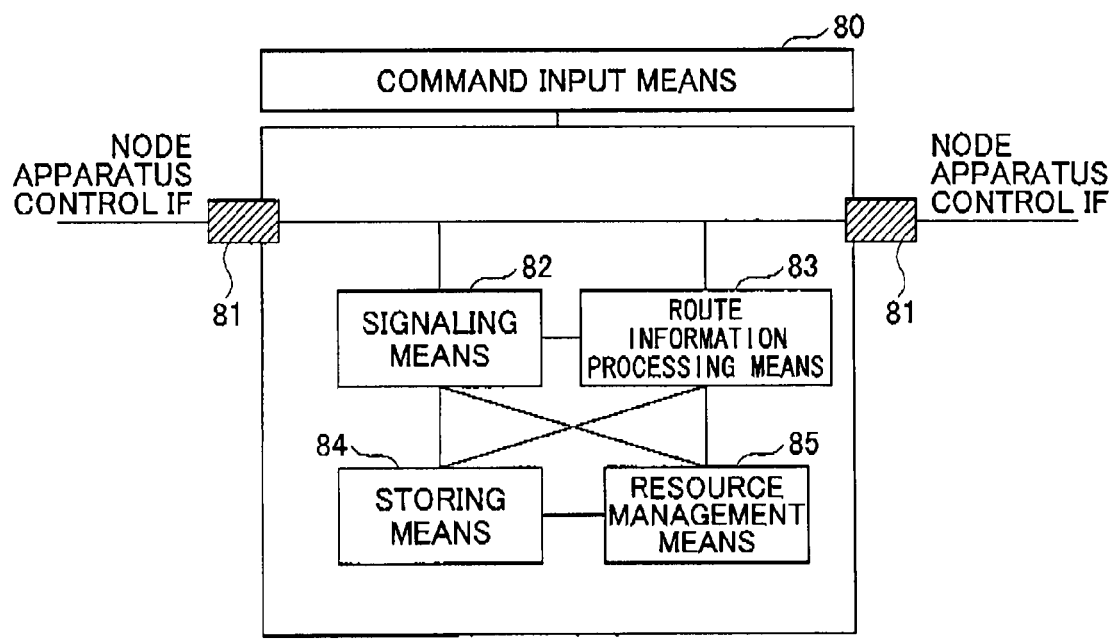
FIG. 57 is a function block configuration diagram of the centralized management apparatus.

It is possible to perform establishment of paths described in the above-mentioned embodiments by using a centralized management apparatus having a function block shown in FIG. 57. Similar to the communication node apparatus, software equal to that shown in FIG. 8 is installed in the centralized management apparatus, and similar to the communication apparatus, the centralized management apparatus includes a command input unit 80 (corresponding to CL177), signaling means 82 (corresponding to RSVP-TE protocol function unit 70, OSPF-TE protocol function unit 72, and GSMP protocol function unit 74), route information processing means 83 (corresponding to the resource management function unit 71, and the CSPF module 73), and storage means 84 (storing data corresponding to the resource information data 75 and the route information data 76), and a node apparatus control IF 81 for communicating with communication node apparatuses.

Figure 58:
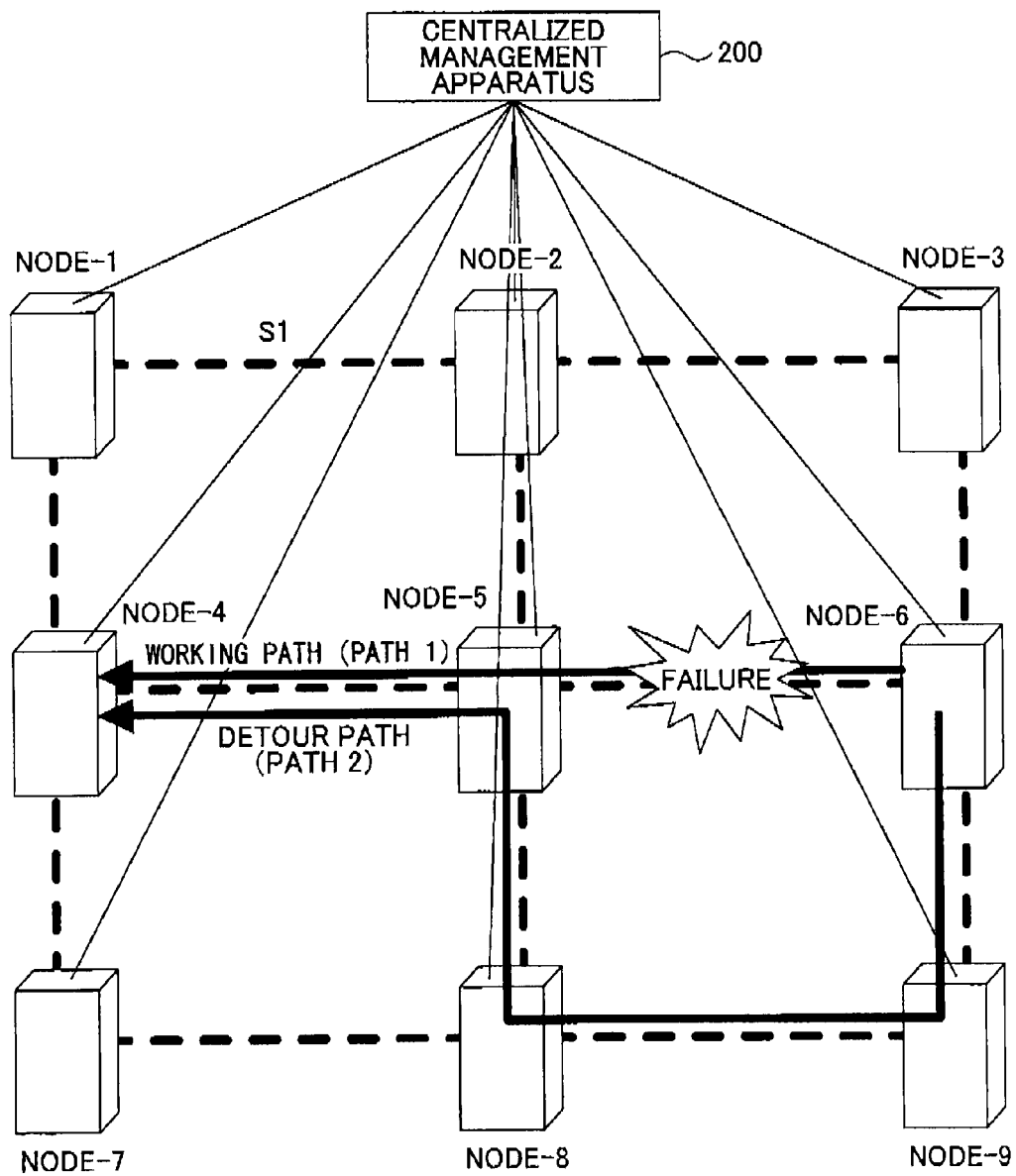
FIG. 58 is a diagram showing a communication apparatus including the centralized management apparatus.
Figure 59:
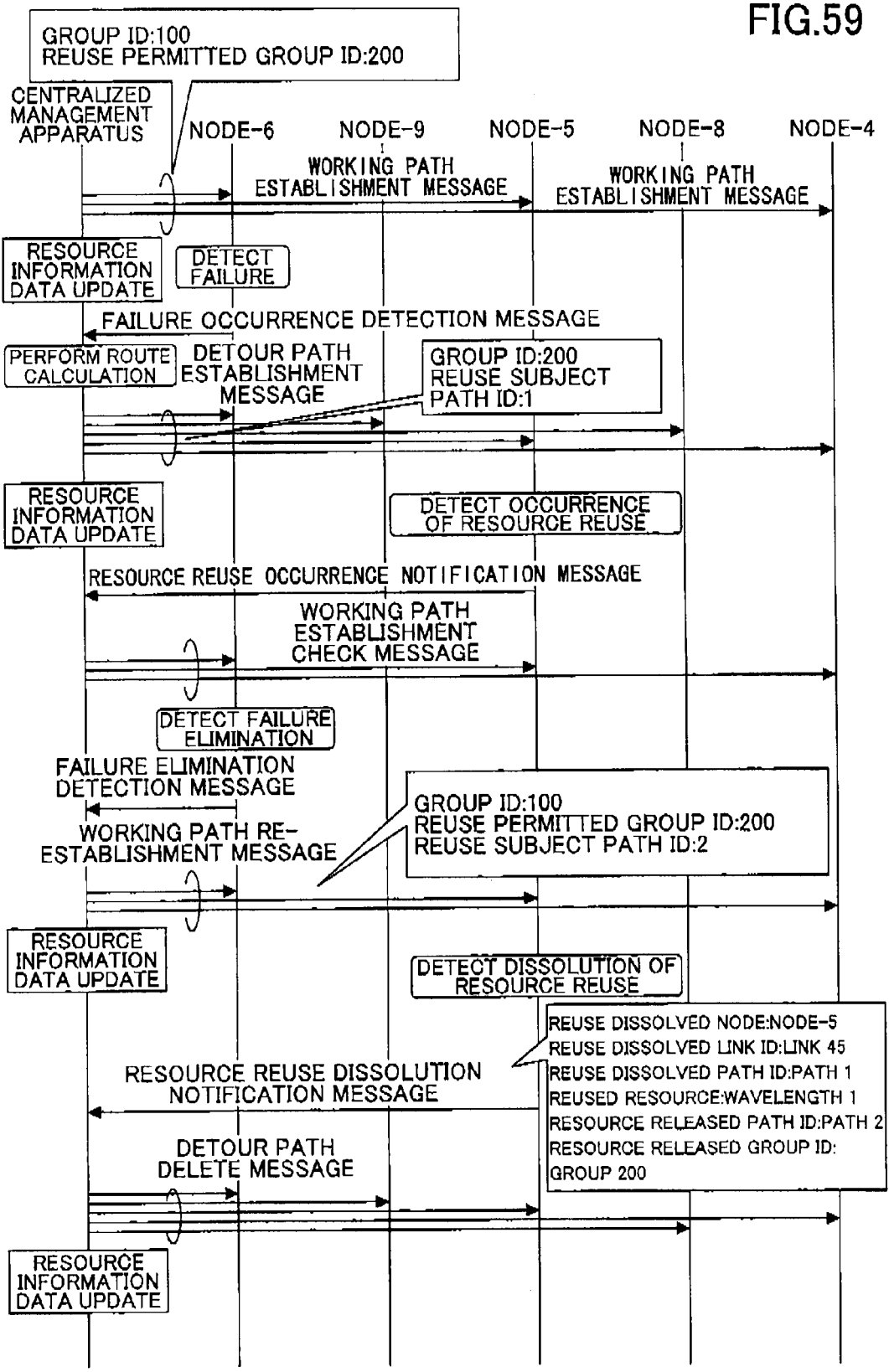
FIG. 59 is a diagram showing a sequence of path control processing by the centralized management apparatus.

For example, path control processing similar to that of the ninth embodiment shown in FIG. 48 can be controlled as shown in FIG. 59 in the communication network shown in FIG. 58. That is, in the path control processing shown in FIG. 59, the centralized management apparatus 200 collectively processes messages that were sent and received by the node-6 for other communication node apparatuses in the path control processing shown in FIG. 48. Since the path control processing shown in FIG. 59 is basically similar to control processing in the ninth embodiment described by FIG. 48, detailed description is not given.

Twelfth Embodiment

This embodiment describes operation in which a resource reuse availability information issuing apparatus issues reuse availability information for a path establishment request sent from a user apparatus to an optical cross connect switch (an example of a communication node apparatus) existing in a communication network realized in the before-mentioned first to eleventh embodiments.

Figure 60:
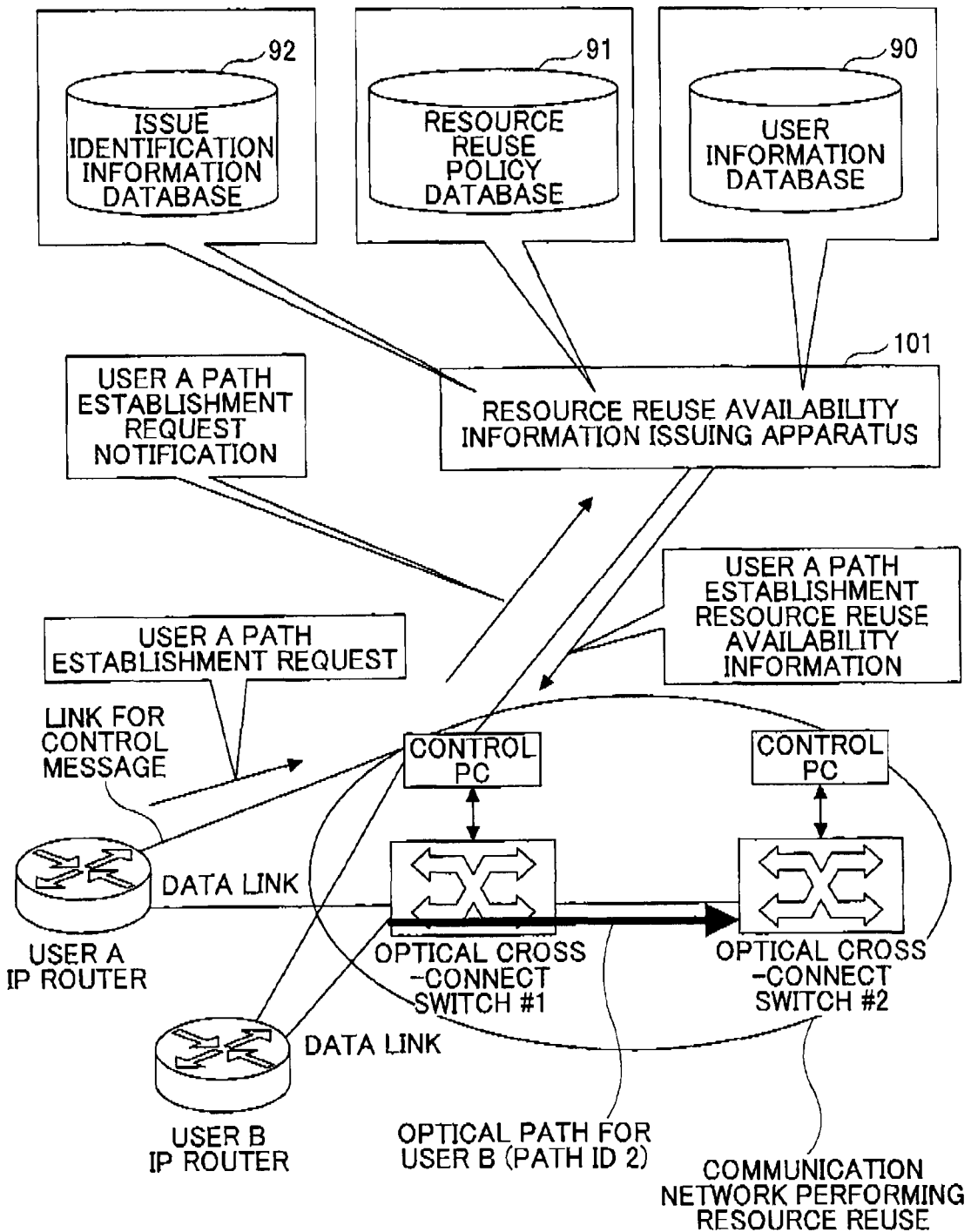
FIG. 60 is a diagram for explaining a resource availability information issuing example using the resource reuse availability issuing apparatus.

FIG. 60 shows an apparatus connection configuration in the present embodiment. As shown in FIG. 60, an IP router of user A and an IP router of user B are connected to an optical cross connect apparatus #1 in the communication network performing resource reuse of the present embodiment. In addition, based on a path establishment request from the user B, a path of ID 2 for the user B is established from the optical cross connect apparatus #1 to the optical cross connect apparatus #2.

The user information database 90 of the resource reuse availability information issuing apparatus 101 stores identification information of the user A and the user B, and path identification information that can be issued for path establishment requested by the user A and the user B respectively. The resource reuse policy database 91 stores resource availability relationship of the user A and the user B. In this embodiment, the issue identification information database 92 stores path identification information that can be issued for the user A and the user B as shown in FIG. 61.

The reuse availability relationship of the user A and the user B are stored in the resource reuse policy database 91 as shown in FIG. 62.

In this embodiment, the user apparatus A sends a new path establishment request to the optical cross connect switch #1. Then, the optical cross connect switch #1 notifies the resource reuse availability information issuing apparatus 101 of information indicating that a path establishment request occurs from the user A with user information.

The resource reuse availability information issuing apparatus 101 that received the notification searches the issue identification information database 92 for a path ID that can be assigned to the path A, so that ID 1 and group ID 100 that are the assignable IDs are retrieved and assigned.

In addition, at the same time, the resource reuse availability information issuing apparatus 101 refers to the resource reuse policy database 91 to refer to each of a user from which the user A can reuse resources, a user for which reuse is inhibited, a user for which reuse is permitted, setup priority, and holding priority. In addition, the resource reuse availability information issuing apparatus 101 refers to the issue identification database 92 to refer to path ID and group ID of related users. Identification information and resource reuse availability information to be assigned to the path A are determined as follows based on the referred reuse availability information and identification information.

-Information Provided to the Path Requested by the User A-
  Path ID: 1
  Group ID: 100
  ID of path for which reuse is permitted: not designated
  ID of group for which reuse is permitted: not designated
  ID of path for which reuse is inhibited: 2-7
  ID of group for which reuse is inhibited: 200
  Reuse subject path ID: 2-7
  Reuse subject group ID: 200
  set up priority: 8
  holding priority: 1

The identification information determined by the resource reuse availability information issuing apparatus 101 is sent to the optical cross connect switch #1, and the optical cross connect switch #1 establishes the path of the user A based on information received from the resource reuse availability information issuing apparatus 101.

The "user" in the present embodiment may be a service instance for distinguishing a particular service in a network providing a plurality of services. In the present embodiment, identification information of a user may be VPN-id identifying VPN. In the present embodiment, identification information of a user may be identification information of UNI that is an interface between the user communication network and the service provider side. In the present embodiment, the resource reuse availability information issuing apparatus 101 may be provided in a communication node apparatus.

In the present embodiment, the user apparatus may be an IP router, and in addition to that, may be an optical cross connect switch, a TDM cross connect switch, an ATM apparatus, a layer 2 switch, a layer 3 switch, or a general computer.

Thirteenth Embodiment

The thirteenth embodiment is an embodiment for notifying a communication apparatus of failure occurrence or failure elimination of a control link on a backup path, or occurrence of resource exhaustion or elimination of resource exhaustion on the backup path. When the communication node apparatus that received the notification detects occurrence of failure of a control link on the backup path based on the contents of the notification, switching to the backup path is prohibited even when a working path fails.

Figure 63:
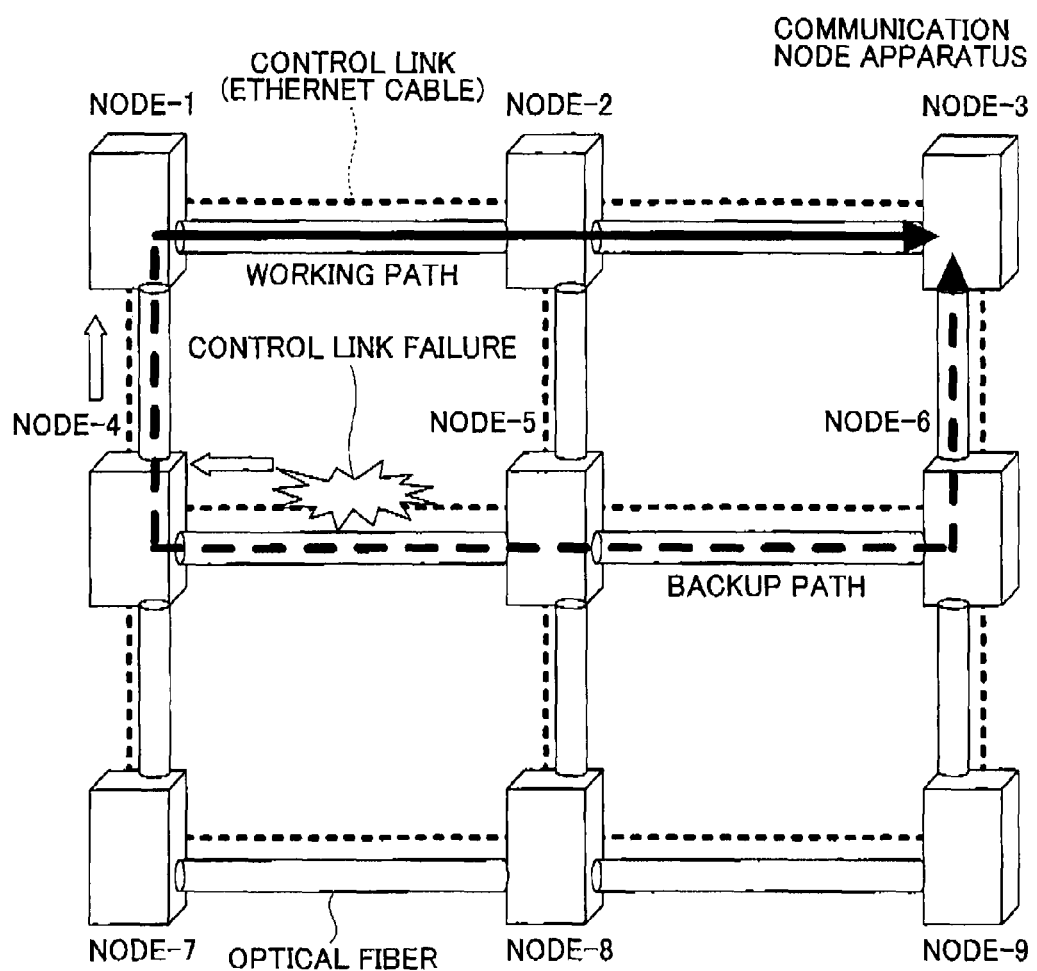
FIG. 63 is a diagram showing an example of the communication network in which control link of a backup path fails.
Figure 64:
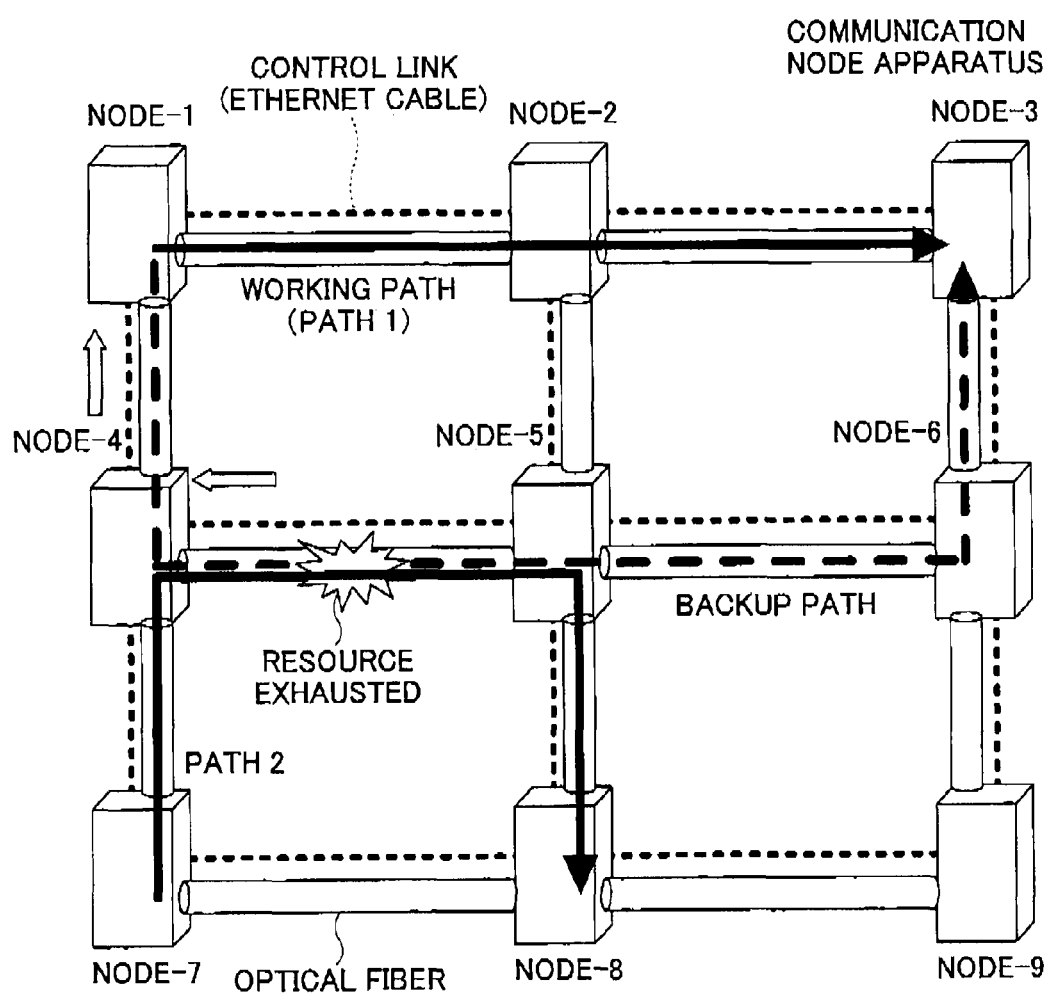
FIG. 64 is a diagram showing an example of the communication network in which resource exhaustion of a backup path occurs.

An example of a communication network in which the control link of the backup path is failed is shown in FIG. 63. An example of a communication network in which resource exhaustion of the backup path occurs is shown in FIG. 64. For example, a situation is assumed in which a working path is established through node-1→node-2→node-3 and a backup path is established through node-1→node-4→node-5→node-6→node-3 in FIG. 63.

When failure occurs in a control link between the node-4 and the node-5, the node-4 detects failure of the control link, and notifies the node-1 that is a start point node of the failure. The node-1 that received the notification enters in a state in which switching to the backup path is inhibited. Thus, the node-1 stops switching to the backup path even when the working path fails.

In addition, when the control link failure is eliminated, the node-4 notifies the node-1 of the elimination so as to release the switching stop state In addition, for example, in FIG. 64, it is assumed that a working path is established through node-1→node-2→node-3 (path 1), and a backup path is established through node-1→node-4→node-5→node-6.

In this situation, when a new path (path 2) is established through node-7→node-4→node-5→node-8, and as a result, when available resources are exhausted in the link between the node-4 and the node-5, the node-4 detects it and notifies the node-1 of it.

The node-1 that received the notification enters in a state in which switching to a backup path is inhibited, so the node-1 does not perform switching to a backup path even when failure of a working path occurs. When the path 2 is deleted so that resource exhaustion is eliminated, the node-1 that is the start point node is notified of it and releases the switch stop state.

Embodiment of a Program

Processing on message sending and receiving executed by the communication node apparatus in the embodiments described so far is executed by the switching HW control function unit 25 shown in FIG. 3. The switching HW control function unit 25 may be realized either by a hardware circuit or by installing a program for realizing the processing into a general information processing apparatus such as a computer having a CPU and a storage device and the like.

In addition, the resource reuse availability information issuing apparatus 101 may be realized either by a hardware circuit or by installing a program for realizing the processing described in embodiments into a general information processing apparatus such as a computer.

The program of the present embodiment is recorded in recording medium so that the general information processing apparatus can install the program using the recording medium. Or, the program of the present embodiment can be also directly installed in the general information processing apparatus from a server holding the program of the present embodiment via a network.

The program of the present embodiment includes not only a program that can be directly executed by the general information processing apparatus but also a program that becomes executable by being installed into a hard disk and the like. In addition, the program includes one that is compressed or encrypted.

Summary of Embodiments

In the path establishment procedure shown in the first to tenth embodiments, execution order of the two processes of the message sending process and the update process for the resource information data is not limited to that example, and it is also possible to adopt a procedure for sending the message after updating the resource information data.

In addition, other messages exchanged between communication node apparatuses such as a setting change message can be substituted for the failure occurrence or elimination notification message and resource reuse occurrence or dissolution notification message described in the first to tenth embodiments. For example, Refresh message, Notify message and Path_Err message of RSVP-TE are examples of the other messages.

In addition, path ID in the first to eleventh embodiment is not necessarily a numeric value, and it may be a character string that can identify a path, or a specific bit series of a control message. And, path ID may be in a predetermined range of a numerical value.

In addition, group ID in the first to eleventh embodiment is not necessarily a numeric value, and it may be a character string that can identify a path, or a specific bit series of a control message. And, the group ID may be a feature that can substantially perform grouping (value of specific bits, data length of message, format of message, data that is processed within a specific time). And, group ID may be in a predetermined range of a numerical value.

Figure 65:
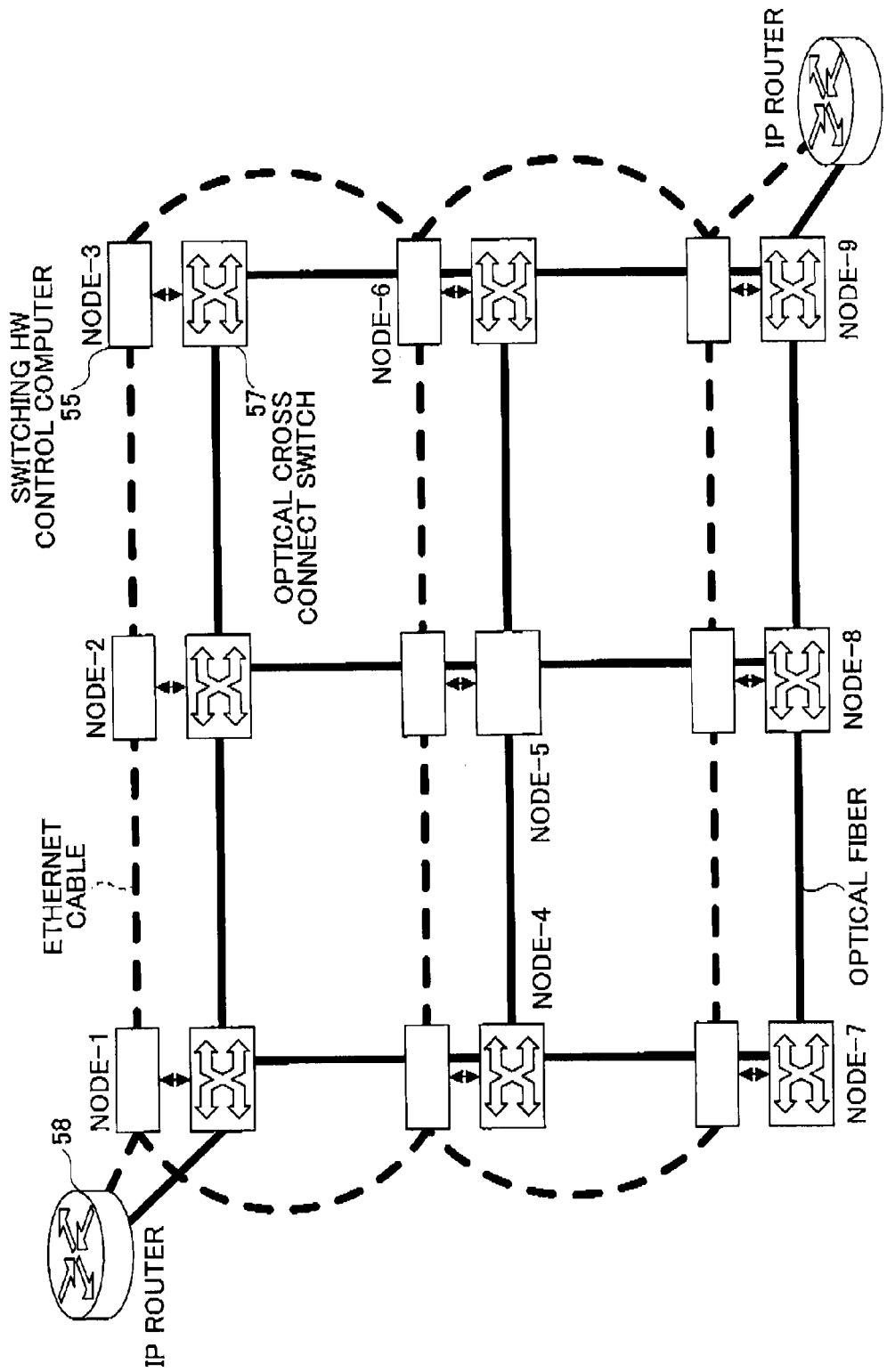
FIG. 65 is a diagram showing an example of a communication network.

In addition, the communication network for carrying out the first to eleventh embodiments is not limited to the communication network based on the optical cross connect switch 57 shown in FIG. 7. For example, the present invention can be also applied to a network in which optical cross connect switch 57 and the IP router 58 are connected shown in FIG. 65.

Figure 66:
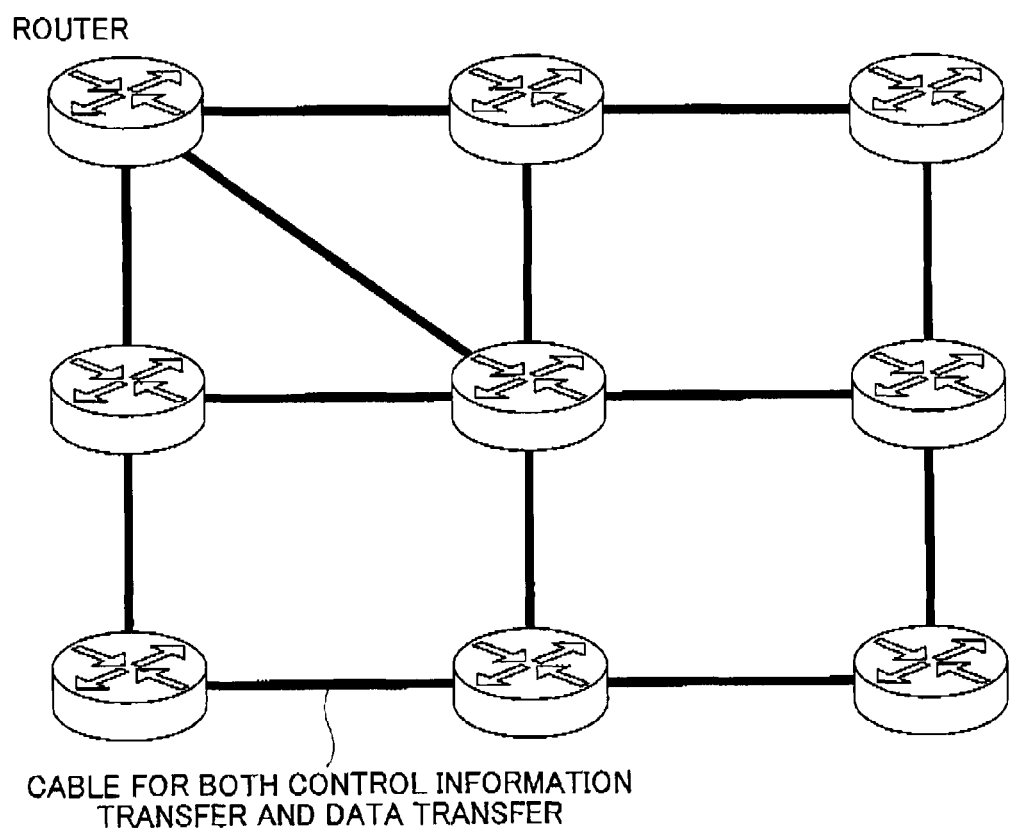
FIG. 66 is a diagram showing a communication network.

In addition, in a communication network in which routers are connects as shown in FIG. 66, the control message transfer link and the data transfer link can be operated as a same physical link.

Figure 67:
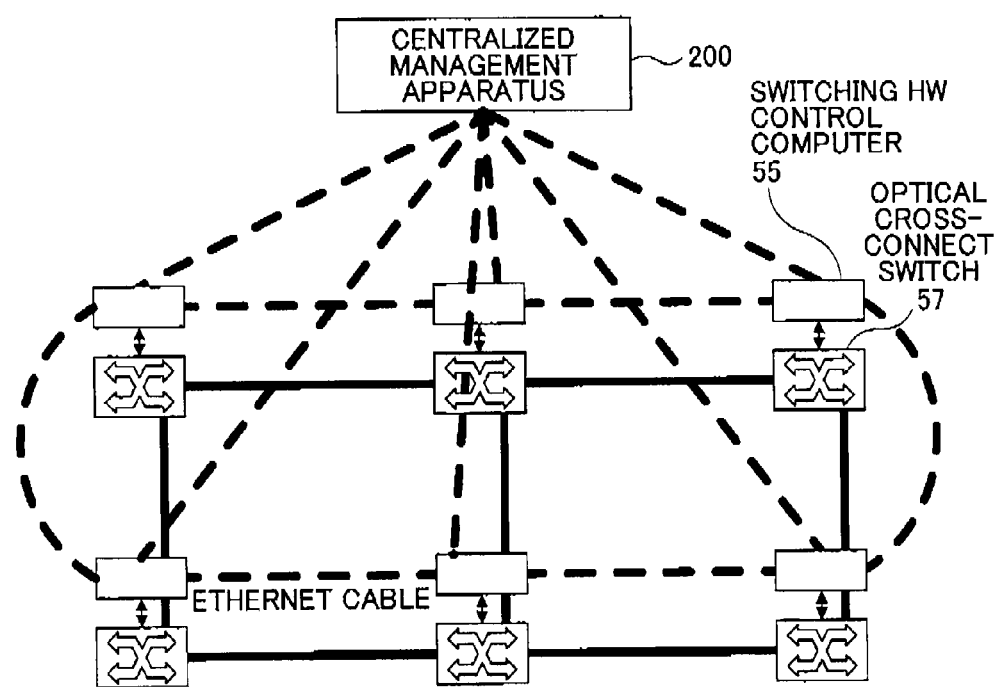
FIG. 67 is a diagram showing an example of a communication network.

In addition, the present invention can be also applied to a communication network in which the centralized management apparatus 200 for managing a plurality of communication node apparatuses is provided as shown in FIG. 67. The centralized managements apparatus 200 corresponds to an accommodation design engine for performing route calculation, PCE (Path Computation element), or a resource management and scheduling server or the like.

Figure 68:
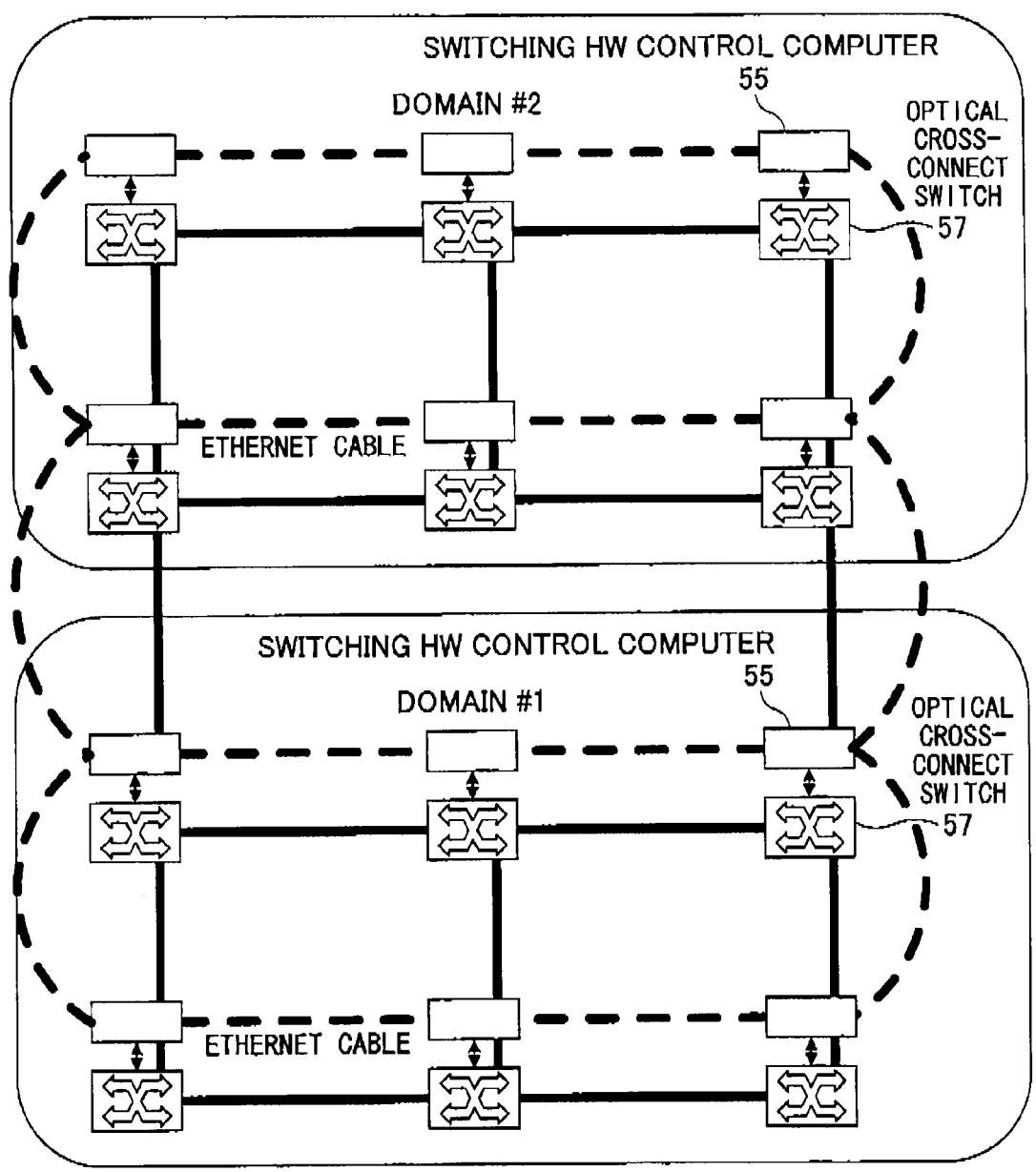
FIG. 68 is a diagram showing an example of a communication network.

In addition, as shown in FIG. 68, the present invention can be applied to a multi-domain network or a multi-carrier network for connecting two different management domains.

Figure 69:
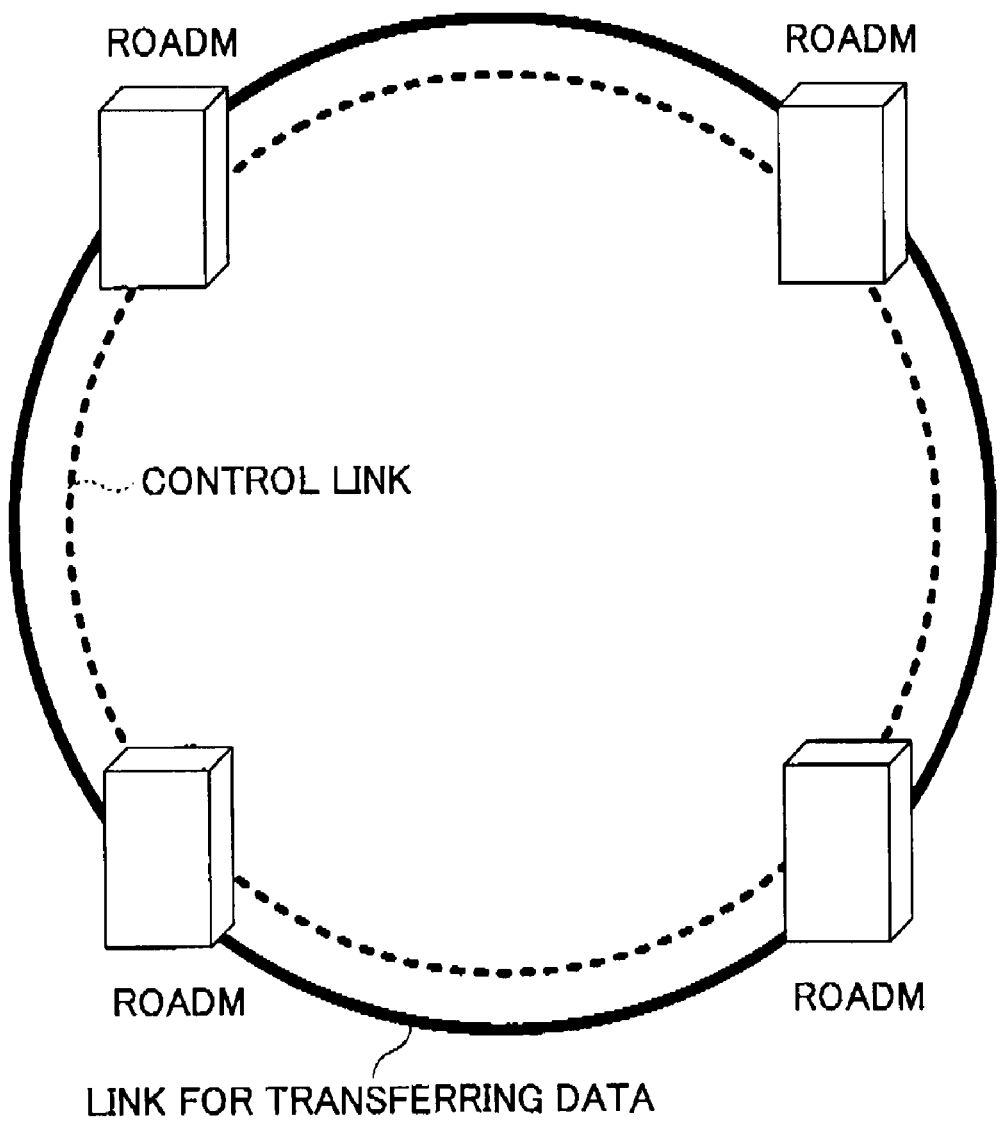
FIG. 69 is a diagram showing an example of a communication network.

In addition, as shown in FIG. 69, the present invention can be applied to a ring network in which ROADMs (Reconfigurable Optical Add Drop Multiplexer) are connected.

Figure 70:
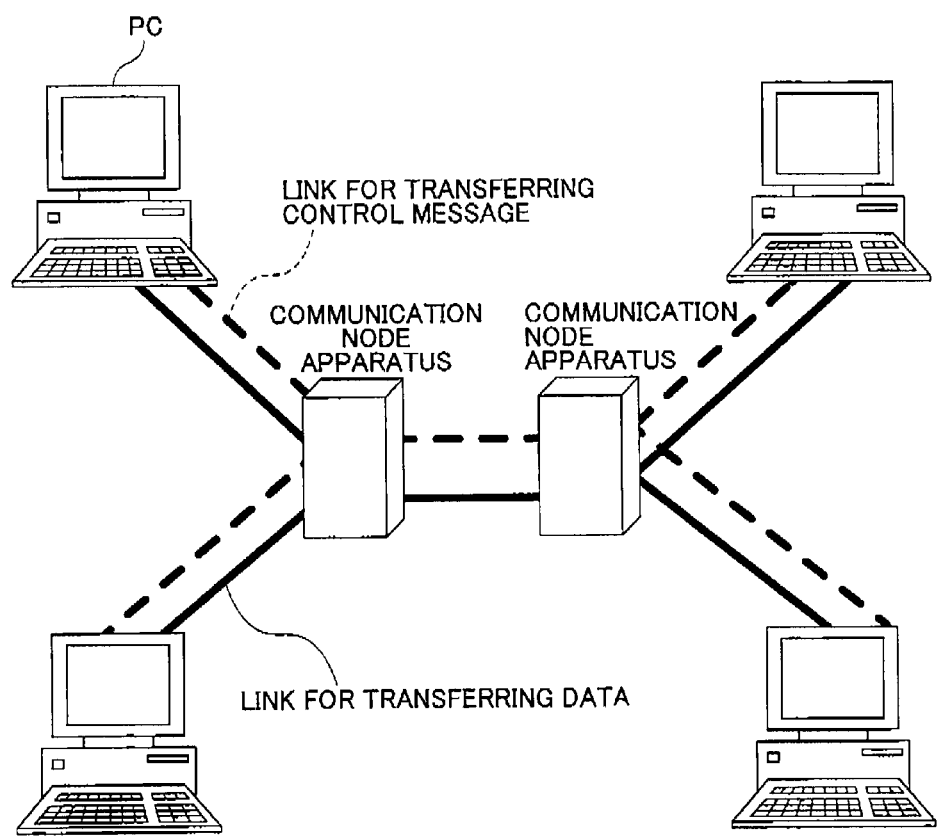
FIG. 70 is a diagram showing an example of a communication network.

In addition, as shown in FIG. 70, the present invention can be also applied to a communication network for establishing a path using a signaling protocol sent from a PC connected to communication node apparatuses.

Resources in the first to eleventh embodiments are not limited to wavelengths of the optical cross connect switch and the ROADM and the like. The resources may be fibers, IFs, or ports of an IP router, a TDM switch, or L2 switch or the like, or may be switching capacity of an IP router or a L2 switch, or timeslots of a TDM switch, or may be wavelength bands in which wavelengths of the optical cross connect switch are grouped.

In addition, resources are not limited to resources currently being used. It is possible to regard future resource use authority as resources in a scheduling table in which reservation is performed and management is performed by a scheduler, and to apply the present resource reuse function to the future resource use authority.

According to the configuration of the above-mentioned embodiments, it becomes possible to efficiently utilize communication network resources and to perform flexible operation with small load. Thus, equipment cost and operation cost for the communication network can be reduced.

More particularly, when necessary resources are decreased by reusing resources, the number of interfaces of routers and optical cross connect switches can be reduced, which leads to large reduction of equipment cost. In addition, since it becomes possible to operate paths with fewer resources, redundant configuration can be easily adopted, so that reliability improves.

In addition, automatic path switch processing is realized using mechanisms for detection or notification of failure occurrence or elimination, for notification of resource reuse occurrence or dissolution, and for storing setting information of switching hardware in software. Thus, operation cost can be reduced.

As described in the patent documents 1-3 and the like, there are many conventional techniques adopting concepts of resource reuse, preemption, and priority. But, there is no conventional technique having the function for performing resource reuse in an autonomous and distributed manner by using identification information in units of paths and by exchange information on the resource reuse among a plurality of apparatuses.

INDUSTRIAL APPLICABILITY

According to embodiments of the present invention, it becomes possible to utilize communication resources efficiently, and amount of apparatus or equipment necessary for path operation can be reduced. Thus, the embodiments can contribute to efficient network operation for network operators. In addition, the embodiments can contribute to improvement of service quality for network users.

The present invention is not limited to the specifically disclosed embodiments, and variations and modifications may be made without departing from the scope of the present invention.

The present international application claims priority based on Japanese patent application No. 2006-274592, filed in the JPO on Oct. 6, 2006 and the entire contents of the Japanese patent application No. 2006-274592 is incorporated herein by reference.

The invention claimed is:

1. A communication node apparatus for establishing a path for communication in a communication network by exchanging a control message between the communication node apparatus and another communication node apparatus and by setting switching information, comprising:

a first unit configured to include, into a control message to be sent to the other communication node apparatus for establishing a path, path identification information or group identification information of a path for which reusing resources of the path to be established is permitted or inhibited, or to include, into the control message, path identification information or group identification information of a path from which resources can be reused by the path to be established, and to send the control message, wherein the other communication node apparatus that receives the control message from the communication node apparatus stores information included in the control message in a resource reuse availability information table as reuse availability information, and when the other communication node apparatus receives a control message from the communication node apparatus for establishing a new path, including path identification information of a path from which resources can be reused or group identification information of a group from which resources can be reused, the other communication node apparatus retrieves reuse availability information corresponding to the path identification information or the group identification information from the resource reuse availability information table to determine resource reuse availability by determining whether the reuse availability information includes the new path or a group to which the new path belongs as a path or a group permitted to reuse resources, and when it is determined that reuse of the resources is permitted, the other communication node apparatus reuses and assigns resources of the path from which resources can be reused as resources for establishing the new path, and to establish the new path.

2. The communication node apparatus as claimed in claim 1, further comprising:

a second unit configured to include, into the control message for changing information on a path, in addition to the path identification information of the path, path identification or group identification information of a new path for which reusing resources assigned to the path is permitted or inhibited, new group identification information of the path, or new priority information of the path, and to send the control message.

3. The communication node apparatus as claimed in claim 1, further comprising:

a detecting unit configured to detect an occurrence or a dissolution state of resource reuse of an established path or to detect a failure occurrence or a failure elimination state for the established path; and a changing unit configured, being triggered by detection of the occurrence or the dissolution state of resource reuse of the established path or detection of the failure occurrence or the failure elimination state of the established path, to change priority information of the path set in the communication node apparatus, and include changed priority information of the path, in addition to path identification information of the path, into the control message to be transmitted to the other communication node apparatus, and to send the control message.

4. A communication node apparatus for establishing a path for communication in a communication network by exchanging a control message between the communication node apparatus and another communication node apparatus and by setting switching information, comprising:

a unit configured to include, into a control message to be sent to the other communication node apparatus for establishing a path, path identification information of a path for which reusing resources of the path to be established is permitted or inhibited, or to include, into the control message, path identification information or group identification information of a path from which resources can be reused by the path to be established, and to send the control message, wherein, when reuse of resources occurs, the communication node apparatus holds setting information of the path from which the resources have been reused; and a sending unit configured to, when receiving a control message reporting dissolution of reuse state of the path from which the resources have been reused, send a control message including the held setting information of the path to the other communication node in order to re-assign the resources to a new path before the resources are reused.

5. A communication node apparatus for establishing a path for communication in a communication network by exchanging a control message between the communication node apparatus and another communication node apparatus and by setting switching information, comprising:

a unit configured to include, into a control message to be sent to the other communication node apparatus for establishing a path, path identification information or group identification information of a path for which reusing resources of the path to be established is permitted or inhibited, or to include, into the control message, path identification information or group identification information of a path from which resources can be reused by the path to be established, and to send the control message, wherein a working path and a backup path are provided;

a switch control unit configured to, when the working path fails while the working path is in operation, switch the working path to the backup path; and a notifying unit configured to notify the switch control unit of failure occurrence or failure elimination of a control link on the backup path to be used when the working path fails while the working path is in operation or to notify the switch control unit of exhaustion occurrence or exhaustion elimination of resources of the backup path.

6. The communication node apparatus as claimed in claim 5, wherein, when detecting failure occurrence of the control link on the backup path based on notification information of the notifying unit, the switch control unit inhibits switching to the backup path even when the working path fails.

7. A communication node apparatus for establishing a path for communication in a communication network by exchanging a control message between the communication node apparatus and another communication node apparatus and setting switching information, comprising:

a first unit configured to receive a control message from the other communication apparatus for establishing a path, and storing, into a resource reuse availability information table, path identification information or group identification information of a path for which reusing resources of the path to be established is permitted or inhibited, or path identification information or group identification information of a path from which resources can be reused by the path to be established, which are included in the control message;

a second unit configured to receive a control message, for establishing a new path, including path identification information of a path from which resources can be reused or group identification information of a group from which resources can be reused, and retrieve reuse availability information corresponding to the path identification information or the group identification information from the resource reuse availability information table to determine resource reuse availability by determining whether the reuse availability information includes the new path or a group to which the new path belongs as a path or a group permitted to reuse resources; and a reuse unit configured, when it is determined that reuse of the resources is permitted, to reuse and assign resources of the path from which resources can be reused as resources for establishing the new path, and to establish the new path.

8. The communication node apparatus as claimed in claim 7, further comprising:
   a rewriting unit configured to rewrite information in the resource reuse availability information table based on information included in the control message for changing information on the path,
   wherein the information included in the control message for changing the information on the path includes, in addition to the path identification information of the path, path identification or group identification information of a new path for which reusing resources assigned to the path is permitted or inhibited, new group identification information of the path, or new priority information of the path.

9. The communication node apparatus as claimed in claim 7, further comprising:
   a sending unit configured to, when resource reuse occurs, send path identification information of a path from which resources have been reused and send information on a path including path identification information of the path that has reused the resources to a communication node apparatus that is a start point of the path from which resources have been reused or to a monitoring apparatus.

10. A communication node apparatus for establishing a path for communication in a communication network by exchanging a control message between the communication node apparatus and another communication node apparatus and setting switching information, comprising:
    a unit configured to receive a control message from the other communication apparatus for establishing a path, and storing, into a resource reuse availability information table, path identification information or group identification information of a path for which reusing resources of the path to be established is permitted or inhibited, or path identification information or group identification information of a path from which resources can be reused by the path to be established, which are included in the control message,
    wherein, when reuse of resources occurs, the communication node apparatus holds switching information set for configuring a path from which the resources have been reused; and
    an identifying unit configured to, when detecting dissolution of reuse state of the path from which the resources have been reused, identify another communication node apparatus on a route of the path from which the resources have been reused based on the held switching information so as to send the control message to the other communication node apparatus for notifying the other communication node apparatus of dissolution of reuse state.

11. A communication node apparatus for establishing a path for communication in a communication network by exchanging a control message between the communication node apparatus and another communication node apparatus and setting switching information, comprising:
    a unit configured to receive a control message from the other communication apparatus for establishing a path, and storing, into a resource reuse availability information table, path identification information or group identification information of a path for which reusing resources of the path to be established is permitted or inhibited, or path identification information or group identification information of a path from which resources can be reused by the path to be established, which are included in the control message,
    wherein, when reuse of resources occurs, the communication node apparatus holds setting information of a path from which the resources have been reused; and
    a sending unit configured to, when receiving a control message reporting dissolution of reuse state of the path from which the resources have been reused, send a control message including the held setting information of the path to the other communication node in order to re-assign the resources to a new path before the resources are reused.

12. The communication node apparatus as claimed in any one of claims 7-11, wherein a working path and a backup path are provided, the communication node apparatus further comprising:
    a switch control unit configured to, when the working path fails while the working path is in operation, switch the working path to the backup path; and
    a notifying unit configured to notify the switch control unit of failure occurrence or failure elimination of a control link on the backup path used when the working path fails while the working path is in operation or to notify the switch control unit of exhaustion occurrence or exhaustion elimination of resources of the backup path.

13. A communication node apparatus, for establishing a path for communication in a communication network by exchanging a control message between the communication node apparatus and another communication node apparatus and setting switching information, comprising:
    a unit configured to receive a control message from the other communication apparatus for establishing a path, and storing, into a resource reuse availability information table, path identification information or group identification information of a path for which reusing resources of the path to be established is permitted or inhibited, or path identification information or group identification information of a path from which resources can be reused by the path to be established, which are included in the control message,
    wherein a working path and a backup path are provided;
    a switch control unit configured to, when the working path fails while the working path is in operation, switch the working path to the backup path; and
    a notifying unit configured to notify the switch control unit of failure occurrence or failure elimination of a control link on the backup path used when the working path fails while the working path is in operation or to notify the switch control unit of exhaustion occurrence or exhaustion elimination of resources of the backup path,
    wherein, when detecting failure occurrence of the control link on the backup path based on notification information from the notifying unit, the switch control unit inhibits switching to the backup path even when the working path fails.

14. A communication node apparatus for establishing a path for communication in a communication network by exchanging a control message between the communication node apparatus and another communication node apparatus, advertising resource information of the communication node apparatus to the other communication node apparatus and setting switching information, comprising;
  a managing unit configured to manage resource amount for each of path identification information and group identification information for resources assigned to paths; and
  an adding unit configured to, when advertising information of the resource amount managed by the managing unit configured to manage using a routing protocol, add ID information and group ID information of a path to which the resources are assigned and identification information of a path or a group that can use or cannot use the resources to the information of the resource amount to be advertised, and to include the information into a control message or a resource advertising message of the routing protocol so as to advertise information of resources.

15. The communication node apparatus as claimed in claim 14, further comprising;
  a route calculation unit configured to calculate a route of a detour path when a path fails, wherein the route calculation unit performs route calculation by using, as a parameter, necessary resource reduction effect obtained by resource reuse of a normal section of the failed path.

16. A non-transitory computer readable storage medium having stored thereon a computer program that includes instructions which when executed on a communication node apparatus for establishing a path for communication in a communication network by exchanging a control message between the communication node apparatus and another communication node apparatus and by setting switching information, causes the communication node apparatus to perform a method comprising:
  including, into a control message to be sent to the other communication node for establishing a path, path identification information or group identification information of a path for which reusing resources of the path to be established is permitted or inhibited, or to include, into the control message, path identification information or group identification information of a path from which resources can be reused by the path to be established, and to send the control message,
  wherein the other communication node apparatus that receives the control message from the communication node apparatus stores information included in the control message in a resource reuse availability information table as reuse availability information, and
  when the other communication node apparatus receives a control message from the communication node apparatus for establishing a new path, including path identification information of a path from which resources can be reused or group identification information of a group from which resources can be reused, the other communication node apparatus retrieves reuse availability information corresponding to the path identification information or the group identification information from the resource reuse availability information table to determine resource reuse availability by determining whether the reuse availability information includes the new path or a group to which the new path belongs as a path or a group permitted to reuse resources, and when it is determined that reuse of the resources is permitted, the other communication node apparatus reuses and assigns resources of the path from which resources can be reused as resources for establishing the new path, and to establish the new path.

17. A non-transitory computer readable storage medium having stored thereon a computer program that includes instructions which when executed on a communication node apparatus for establishing a path for communication in a communication network by exchanging a control message between the communication node apparatus and another communication node apparatus and by setting switching information causes the communication node apparatus to perform a method comprising:
  receiving a control message from the other communication apparatus for establishing a path, and storing, into a resource reuse availability information table, path identification information or group identification information of a path for which reusing resources of the path to be established is permitted or inhibited, or path identification information or group identification information of a path from which resources can be reused by the path to be established, which are included in the control message;
  receiving a control message, for establishing a new path, including path identification information of a path from which resources can be reused or group identification information of a group from which resources can be reused, and retrieve reuse availability information corresponding to the path identification information or the group identification information from the resource reuse availability information table to determine resource reuse availability by determining whether the reuse availability information includes the new path or a group to which the new path belongs as a path or a group permitted to reuse resources; and
  when it is determined that reuse of the resources is permitted, reusing and assigning resources of the retrieved path as resources for establishing a new path.

18. A non-transitory computer readable storage medium having stored thereon a computer program that includes instructions which when executed on a communication node apparatus for establishing a path for communication in a communication network by exchanging a control message between the communication node apparatus and another communication node apparatus, advertising resource information of the communication node apparatus to the other communication node apparatus and setting switching information causes the communication node apparatus to perform a method comprising:
  managing resource amount for each of path identification information and group identification information for resources assigned to paths; and
  adding, when advertising information of the resource amount managed by the step of managing using a routing protocol, ID information and group ID information of a path to which the resources are assigned and identification information of a path or a group that can use or cannot use the resources to the information of the resource amount to be advertised, and to include the information into a control message or a resource advertising message of the routing protocol so as to advertise information of resources.

19. A communication system comprising a first communication node apparatus and a second communication node apparatus exchanging a control message between them to set switching information for establishing a path for communication in a communication network,
  the first communication node apparatus comprising:
  a first unit configured to include, into a control message to be sent to the second communication node apparatus for establishing a path, path identification information or group identification information of a path for which reusing resources of the path to be established is permitted or inhibited, or to include, into the control message, path identification information or group identification information of a path from which resources can be reused by the path to be established, and to send the control message, the second communication node apparatus comprising:

a second unit configured to store information included in the control message received from the first communication node apparatus in a resource reuse availability information table as reuse availability information;

a third unit configured to receive a control message from the first communication node apparatus, for establishing a new path, including path identification information of a path from which resources can be reused or group identification information of a group from which resources can be reused, and retrieve reuse availability information corresponding to the path identification information or the group identification information from the resource reuse availability information table to determine resource reuse availability by determining whether the reuse availability information includes the new path or a group to which the new path belongs as a path or a group permitted to reuse resources; and a fourth unit configured, when it is determined that reuse of the resources is permitted, to reuse and assign resources of the path from which resources can be reused as resources for establishing the new path, and to establish the new path.

20. A communication system comprising a first communication node apparatus and a second communication node apparatus in which resource information of a communication node apparatus is advertised to another communication node to set switching information for establishing a path for communication in a communication network, the first communication node apparatus comprising:

a first unit configured to manage resource amount for each of path identification information and group identification information for resources assigned to paths; and a second unit configured to, when advertising information of the resource amount managed by the first unit configured to manage using a routing protocol, add path identification information and group identification information of a path to which the resources are assigned and identification information of a path or a group that is permitted to reuse or is prohibited to reuse the resources to the information of the resource amount to be advertised, and to include the information into a control message or a resource advertising message of the routing protocol so as to advertise information of resources, the second communication node apparatus comprising:

a third unit configured to store the information of the resources advertised by the first communication node apparatus in a resource reuse availability information table as reuse availability information;

a fourth unit configured to receive a control message from the first communication node apparatus, for establishing a new path, including path identification information of a path from which resources can be reused or group identification information of a group from which resources can be reused, and retrieve reuse availability information corresponding to the path identification information or the group identification information from the resource reuse availability information table to determine resource reuse availability by determining whether the reuse availability information includes the new path or a group to which the new path belongs as a path or a group permitted to reuse resources; and a fifth unit configured, when it is determined that reuse of the resources is permitted, to reuse and assign resources of the path from which resources can be reused as resources for establishing the new path, and to establish the new path.

21. A communication method, implemented on a communication system comprising a first communication node apparatus and a second communication node apparatus exchanging a control message between them to set switching information for establishing a path for communication in a communication network, comprising:

including into a control message to be sent to the second communication node apparatus for establishing a path, at the first communication node apparatus, path identification information or group identification information of a path for which reusing resources of the path to be established is permitted or inhibited, or to include, into the control message, path identification information or group identification information of a path from which resources can be reused by the path to be established, and to send the control message, storing, at the second communication node apparatus, information included in the control message received from the first communication node apparatus in a resource reuse availability information table as reuse availability information;

receiving, at the second communication node apparatus, a control message from the first communication node apparatus, for establishing a new path, including path identification information of a path from which resources can be reused or group identification information of a group from which resources can be reused, and retrieving reuse availability information corresponding to the path identification information or the group identification information from the resource reuse availability information table to determine resource reuse availability by determining whether the reuse availability information includes the new path or a group to which the new path belongs as a path or a group permitted to reuse resources; and reusing and assigning, at the second communication node apparatus, when it is determined that reuse of the resources is permitted, resources of the path from which resources can be reused as resources for establishing the new path, and establishing the new path.

22. A communication method, implemented on a communication system comprising a first communication node apparatus and a second communication node apparatus in which resource information of a communication node apparatus is advertised to another communication node to set switching information for establishing a path for communication in a communication network, comprising:

managing, at the first communication node apparatus, resource amount for each of path identification information and group identification information for resources assigned to paths;

adding, at the first communication node apparatus, when advertising information of the resource amount managed by the first unit configured to manage using a routing protocol, path identification information and group identification information of a path to which the resources are assigned and identification information of a path or a group that is permitted to reuse or is prohibited to reuse the resources to the information of the resource amount to be advertised, and including the information into a control message or a resource advertising message of the routing protocol so as to advertise information of resources, storing, at the second communication node apparatus, the information of the resources advertised by the first communication node apparatus in a resource reuse availability information table as reuse availability information;

receiving, at the second communication node apparatus, a control message from the first communication node apparatus, for establishing a new path, including path identification information of a path from which resources can be reused or group identification information of a group from which resources can be reused, and retrieving reuse availability information corresponding to the path identification information or the group identification information from the resource reuse availability information table to determine resource reuse availability by determining whether the reuse availability information includes the new path or a group to which the new path belongs as a path or a group permitted to reuse resources; and reusing and assigning, at the second communication node apparatus, when it is determined that reuse of the resources is permitted, resources of the path from which resources can be reused as resources for establishing the new path, and establishing the new path.

* * * * *